United States Patent
Carmona-Valdes et al.

(10) Patent No.: US 12,306,327 B2
(45) Date of Patent: *May 20, 2025

(54) MULTIPLEXED PHASED ARRAY MULTIBEAM SONAR

(71) Applicant: Johnson Outdoors Inc., Racine, WI (US)

(72) Inventors: Jesus Carmona-Valdes, Eufaula, AL (US); Gavin William Slay, Eufaula, AL (US); William Mark Gibson, Eufaula, AL (US); Per Oskar Pelin, Torslanda (SE)

(73) Assignee: Johnson Outdoors Inc., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,736

(22) Filed: Feb. 1, 2024

(65) Prior Publication Data

US 2024/0241213 A1 Jul. 18, 2024

Related U.S. Application Data

(63) Continuation of application No. 17/182,672, filed on Feb. 23, 2021, now Pat. No. 11,914,066.

(Continued)

(51) Int. Cl.
*G01S 7/00* (2006.01)
*G01S 7/521* (2006.01)
(Continued)

(52) U.S. Cl.
CPC .............. *G01S 7/003* (2013.01); *G01S 7/521* (2013.01); *G01S 7/534* (2013.01); *G01S 7/536* (2013.01); *G01S 7/6218* (2013.01); *G01S 15/96* (2013.01)

(58) Field of Classification Search
CPC .......... G01S 7/003; G01S 7/521; G01S 7/534; G01S 7/536; G01S 7/6218; G01S 15/96; G01S 15/104; G01S 7/52003
See application file for complete search history.

(56) References Cited

U.S. PATENT DOCUMENTS

| 3,389,372 A | 6/1968 | Halliday et al. |
| 4,546,459 A | 10/1985 | Congdon |

(Continued)

FOREIGN PATENT DOCUMENTS

| CA | 3107720 A1 | 8/2021 |
| CN | 109073750 A | 12/2018 |

(Continued)

OTHER PUBLICATIONS https://pressbooks.online.ucf.edu/phy2054ehk/chapter/the-electromagnetic-spectrum/; known prior to Feb. 23, 2021.

(Continued)

*Primary Examiner* — Isam A Alsomiri
*Assistant Examiner* — Joseph C Fritchman
(74) *Attorney, Agent, or Firm* — Reinhart Boerner Van Deuren P.C.

(57) ABSTRACT

Multiplexed phased array sonar systems and methods for consumer fishfinders are described herein. A transducer unit for such a system includes a transmit (TX) element that generates a sonar ping, a receive (RX) array configured to receive sonar echoes resulting from the sonar ping contacting targets, a digital signal processor (DSP) that processes the sonar echoes into sonar display information, and multiplexers (MUXs) coupled between the RX array and the DSP. The MUXs are configured to couple a portion of the RX array to the DSP during a first time and a second portion of the RX array during a second time such that the MUXs couple an entirety of the RX array to the DSP during each (Continued)

transmit-receive cycle. A method of preventing distortions in the sonar display information selects the elements of the RX array to be sampled in accordance with a predetermined multiplexing pattern.

25 Claims, 33 Drawing Sheets

Related U.S. Application Data

(60) Provisional application No. 62/985,609, filed on Mar. 5, 2020.

(51) Int. Cl.
*G01S 7/534* (2006.01)
*G01S 7/536* (2006.01)
*G01S 7/62* (2006.01)
*G01S 15/96* (2006.01)

(56) References Cited

U.S. PATENT DOCUMENTS

| | | |
|---|---|---|
| 4,692,722 A | 9/1987 | Reichel et al. |
| 5,013,979 A | 5/1991 | Birleson |
| 5,916,210 A | 6/1999 | Winston |
| 5,923,617 A | 7/1999 | Thompson et al. |
| 6,292,433 B1 | 9/2001 | Gilbert et al. |
| 6,445,646 B1 | 9/2002 | Handa et al. |
| 6,661,739 B1 | 12/2003 | Benjamin et al. |
| 6,678,210 B2 | 1/2004 | Rowe |
| 6,821,251 B2 | 11/2004 | Alexandru |
| 7,542,376 B1 | 6/2009 | Thompson et al. |
| 7,606,114 B2 | 10/2009 | Bachelor et al. |
| 7,889,600 B2 | 2/2011 | Thompson et al. |
| 8,390,300 B2 | 3/2013 | Ems et al. |
| 8,463,458 B2 | 6/2013 | Wood et al. |
| 8,593,903 B2 | 11/2013 | Pocwiardowski |
| 8,606,432 B1 | 12/2013 | Wood et al. |
| 8,638,362 B1 | 1/2014 | Thompson et al. |
| 8,811,120 B2 | 8/2014 | Bachelor et al. |
| RE45,379 E | 2/2015 | Rowe |
| 8,964,507 B2 | 2/2015 | Bachelor et al. |
| 9,523,770 B1 | 12/2016 | Ruffa |
| 9,664,783 B2 | 5/2017 | Brown et al. |
| 9,739,884 B2 | 8/2017 | Proctor et al. |
| 9,766,328 B2 | 9/2017 | Black et al. |
| 9,784,825 B2 | 10/2017 | Brown et al. |
| 9,784,826 B2 | 10/2017 | Matson et al. |
| 9,784,832 B2 | 10/2017 | Proctor et al. |
| 9,812,118 B2 | 11/2017 | Matson et al. |
| 9,846,232 B1 | 12/2017 | Thompson et al. |
| 10,018,719 B2 | 7/2018 | Proctor et al. |
| 10,067,228 B1 | 9/2018 | Steenstrup et al. |
| 10,191,153 B2 | 1/2019 | Gatland |
| 10,197,674 B2 | 2/2019 | Thompson et al. |
| 10,247,822 B2 | 4/2019 | Proctor et al. |
| 10,310,062 B2 | 6/2019 | Coleman et al. |
| 10,338,195 B2 | 7/2019 | Stokes et al. |
| 10,454,398 B2 | 10/2019 | Hanseler et al. |
| 10,545,226 B2 | 1/2020 | Wigh et al. |
| 10,677,921 B2 | 6/2020 | Murphy et al. |
| 10,719,077 B2 | 7/2020 | Clark et al. |
| 10,764,342 B2 | 9/2020 | Daniel et al. |
| 10,802,141 B2 | 10/2020 | Stokes |
| 10,852,428 B2 | 12/2020 | Stokes et al. |
| 10,852,429 B2 | 12/2020 | Gatland |
| 10,890,660 B2 | 1/2021 | Wigh et al. |
| 10,914,810 B2 | 2/2021 | Laster et al. |
| 10,942,027 B2 | 3/2021 | Johnson et al. |
| 10,942,028 B2 | 3/2021 | Johnson et al. |
| 10,989,537 B2 | 4/2021 | Stokes et al. |
| 11,022,687 B2 | 6/2021 | Darrow |
| 11,054,521 B2 | 7/2021 | Steenstrup et al. |
| 11,181,637 B2 | 11/2021 | Gatland et al. |
| 11,204,416 B2 | 12/2021 | Matson et al. |
| 11,226,412 B2 | 1/2022 | Thompson et al. |
| 11,250,615 B2 | 2/2022 | Stokes |
| 11,372,102 B2 | 6/2022 | Proctor et al. |
| 11,435,427 B2 | 9/2022 | Laster et al. |
| 11,500,054 B2 | 11/2022 | Clark |
| 11,525,907 B2 | 12/2022 | Wigh et al. |
| 11,536,820 B2 | 12/2022 | Wigh et al. |
| 11,585,921 B2 | 2/2023 | Proctor et al. |
| 11,630,198 B2 | 4/2023 | Rivers et al. |
| 11,668,820 B2 | 6/2023 | Steenstrup et al. |
| 11,703,560 B2 | 7/2023 | Clark |
| 11,796,661 B2 | 10/2023 | Caspall |
| 2003/0223310 A1 | 12/2003 | Benjamin et al. |
| 2006/0050615 A1 | 3/2006 | Swisher |
| 2008/0114239 A1 | 5/2008 | Randall et al. |
| 2009/0027271 A1* | 1/2009 | Banker ............... G01S 5/06 342/387 |
| 2010/0225303 A1 | 9/2010 | Min et al. |
| 2011/0013485 A1 | 1/2011 | Maguire |
| 2011/0249125 A1 | 10/2011 | Wallack et al. |
| 2014/0269191 A1 | 9/2014 | Iverson et al. |
| 2015/0265253 A1 | 9/2015 | Kim et al. |
| 2016/0049143 A1* | 2/2016 | Matson ............... G01S 15/06 367/103 |
| 2016/0259050 A1 | 9/2016 | Proctor et al. |
| 2017/0123062 A1 | 5/2017 | Coleman et al. |
| 2017/0212230 A1 | 7/2017 | Wigh et al. |
| 2017/0343655 A1* | 11/2017 | Solek ............... G01S 15/8918 |
| 2018/0100922 A1 | 4/2018 | Wigh et al. |
| 2018/0217244 A1 | 8/2018 | Coleman et al. |
| 2019/0072951 A1 | 3/2019 | Clark et al. |
| 2019/0079185 A1 | 3/2019 | Steenstrup et al. |
| 2019/0188365 A1 | 6/2019 | Gurin et al. |
| 2019/0242994 A1 | 8/2019 | Wanis et al. |
| 2019/0265354 A1 | 8/2019 | Antao et al. |
| 2019/0268390 A1 | 8/2019 | Daniel et al. |
| 2019/0277806 A1 | 9/2019 | Huang |
| 2020/0072953 A1 | 3/2020 | Wigh et al. |
| 2020/0103512 A1 | 4/2020 | Brown et al. |
| 2020/0127631 A1 | 4/2020 | Chayat et al. |
| 2020/0158842 A1 | 5/2020 | Wigh et al. |
| 2020/0256967 A1 | 8/2020 | Wigh et al. |
| 2020/0292701 A1 | 9/2020 | Darrow |
| 2020/0341463 A1 | 10/2020 | Clark et al. |
| 2020/0400801 A1 | 12/2020 | Sloss |
| 2021/0085290 A1 | 3/2021 | Martin et al. |
| 2021/0096244 A1 | 4/2021 | Wigh et al. |
| 2021/0165086 A1* | 6/2021 | Chen ............... G01S 15/96 |
| 2021/0206459 A1 | 7/2021 | Johnson et al. |
| 2021/0255627 A1 | 8/2021 | Snyder et al. |
| 2021/0286074 A1 | 9/2021 | Steenstrup et al. |
| 2022/0035026 A1 | 2/2022 | Proctor |
| 2022/0035027 A1 | 2/2022 | Proctor |
| 2022/0171043 A1 | 6/2022 | Neumann et al. |
| 2022/0268926 A1 | 8/2022 | Hooper |
| 2022/0268927 A1 | 8/2022 | Hooper |
| 2022/0326018 A1 | 10/2022 | Rivers et al. |
| 2022/0373662 A1 | 11/2022 | Crawford et al. |
| 2022/0373678 A1 | 11/2022 | Combs et al. |
| 2023/0074053 A1 | 3/2023 | Wigh et al. |
| 2023/0088987 A1 | 3/2023 | Brown et al. |
| 2023/0111196 A1 | 4/2023 | Proctor et al. |
| 2023/0251375 A1 | 8/2023 | Wigh et al. |
| 2023/0358885 A1 | 11/2023 | Laster |
| 2023/0367008 A1 | 11/2023 | Freeman et al. |

FOREIGN PATENT DOCUMENTS

| | | |
|---|---|---|
| CN | 109073752 A | 12/2018 |
| EP | 4043915 A1 | 8/2022 |
| GB | 2569160 A | 6/2019 |

(56) References Cited

FOREIGN PATENT DOCUMENTS

WO    WO 2018/140645 A1    8/2018
WO    WO 2019/010022 A1    1/2019

OTHER PUBLICATIONS https://www.chegg.com/homework-help/questions-and-answers/sort-modulation-happening-electromagnetic-wave-graph-amplitude-modulation-frequency-modula-q28592736; known prior to Feb. 23, 2021.

https://www.allaboutcircuits.com/technical-articles/dsp-basics-of-digital-down-conversion-digital-signal-processing/; known prior to Feb. 23, 2021.

https://www.electronicdesign.com/technologies/analog/article/21798689/choose-the-right-fft-window-function-when-evaluating-precision-adcs; known prior to Feb. 23, 2021.

R. L. Thompson, J. Seawall and T. Josserand, "Two dimensional and three dimensional imaging results using blazed arrays," *MTS/IEEE Oceans 2001. An Ocean Odyssey. Conference Proceedings (IEEE Cat. No.01CH37295)*, Honolulu, Hi, USA, 2001, pp. 985-988 vol. 2, doi: 10.1109/OCEANS.2001.968250.

https://en.wikipedia.org/wiki/Undersampling#/media/File:Bandpass_sampling_depiction.svg; known prior to Feb. 23, 2021.

https://en.wikipedia.org/wiki/Spectrogram#/media/File:Waterfall_plot_of_a_whistle.png; known prior to Feb. 23, 2021.

https://mathworld.wolfram.com/SphericalWedge.html; known prior to Feb. 23, 2021.

https://www.researchgate.net/figure/Short-time-Fourier-transform-STFT-with-envelope-and-two-sample-overlap_fig7 231828310; known prior to Feb. 23, 2021.

H Li et al 2015, Piezoelectric transducer design for a miniaturized injectable acoustic transmitter, Smart Mater. Struct. 24 115010 (Year: 2015).

J. Salinas and W. R. Bernecky, "Real-time sonar beamforming on a MasPar architecture," Proceedings of SPDP '96: 8th IEEE Symposium on Parallel and Distributed Processing, New Orleans, LA, USA, 1996, pp. 226-229 (Year: 1996).

Tan, Li, "Digital Signal Processing, Fundamentals and Applications: Chapter 12", pp. 557-615, Academic Press (Year: 2008).

Texas Instruments, "8-Line to 1-Lin Data Selector/Multiplexor", SN? 4HC151-O1 (Year: 2008).

Texas Instruments, "AFE5818 16-Chennel, Ultrasound, Analog Front-End" (Year: 2015).

Tan, Li, "Multirate DSP, part 1: Upsampling and downsampling", https://www.eetimes.com/multirate-dsp-part-1-upsampling-and-downsampling/ (Year: 2008).

He Z, Zheng F, Ma Y, Kim H H, Zhou Q, Shung KK. A sidelobe suppressing near-field beamforming approach for ultrasound array imaging. J Acoust Soc Am. May 2015; 137(5):2785-90. doi: 10.1121/1.4919318. PMID: 25994706; PMCID: PMC5392098. (Year: 2015).

U.S. Appl. No. 17/182,672, filed Feb. 23, 2021.

\* cited by examiner

CONTROL HEAD

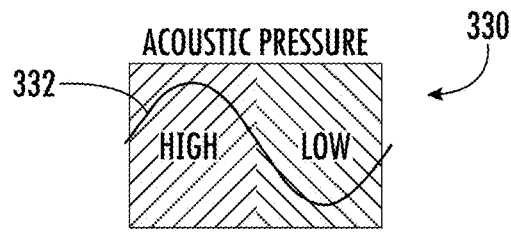
FIG. 48
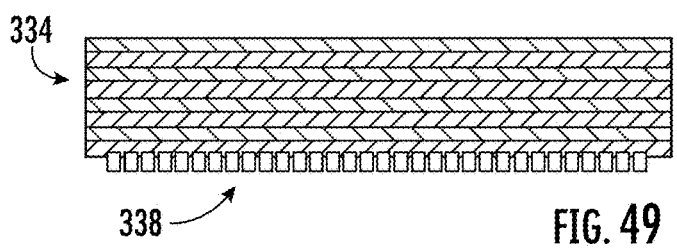
FIG. 49
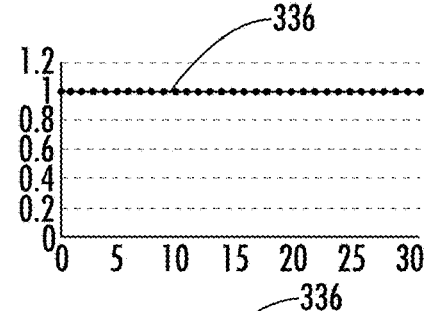
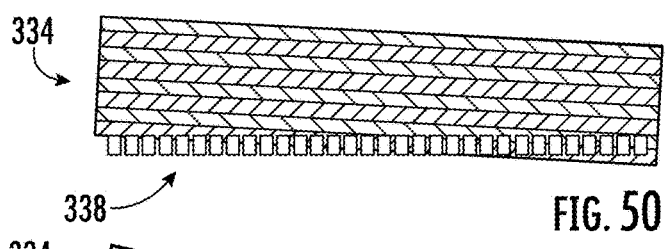
FIG. 50
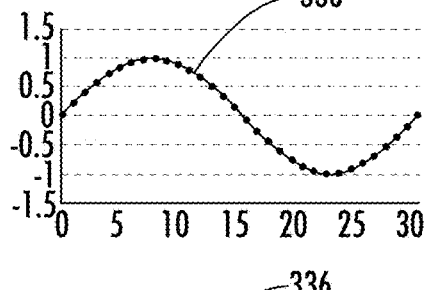
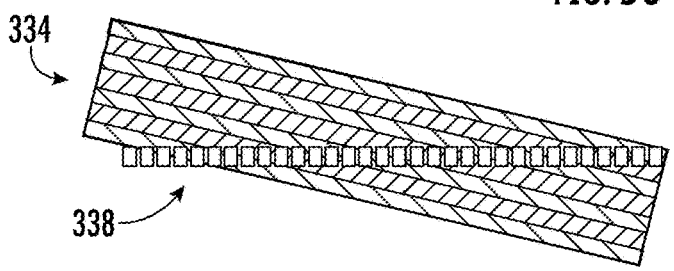
FIG. 51
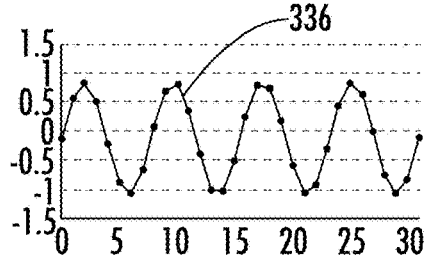
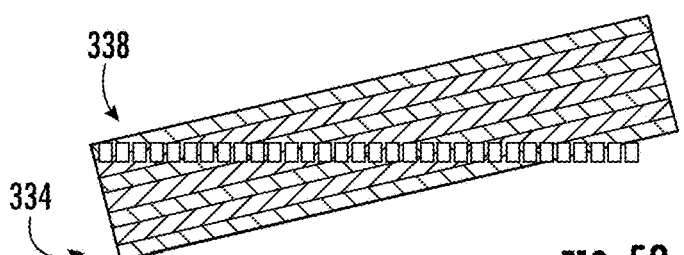
FIG. 52
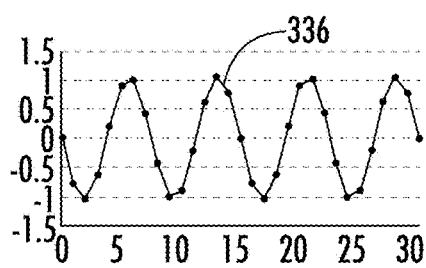
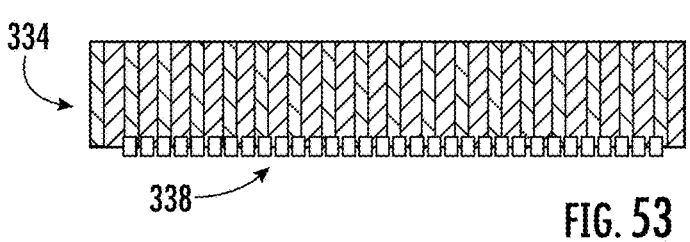
FIG. 53
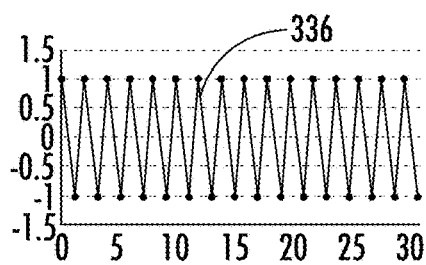

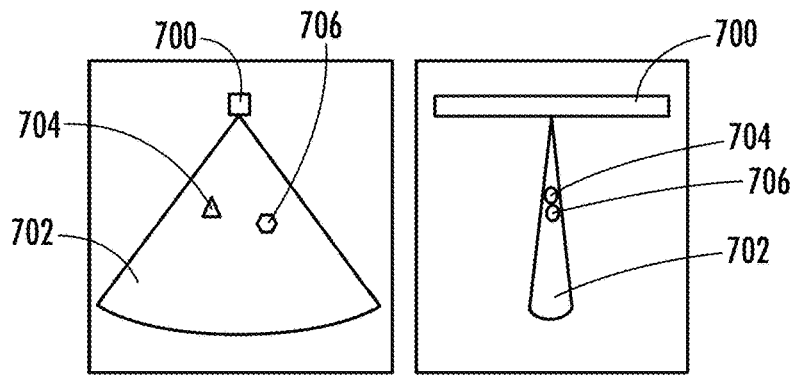
FIG. 71
(PRIOR ART)
FIG. 72
(PRIOR ART)
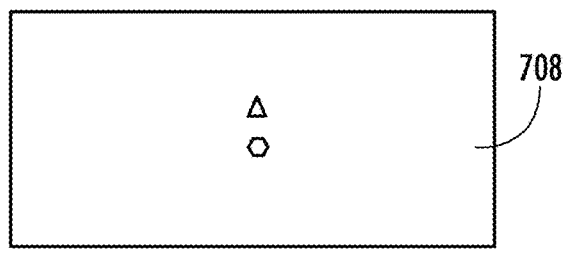
FIG. 73
(PRIOR ART)
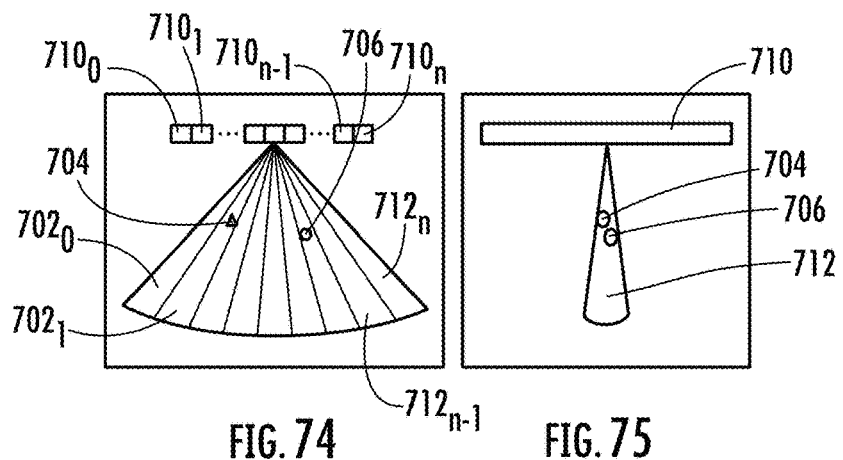
FIG. 74
FIG. 75
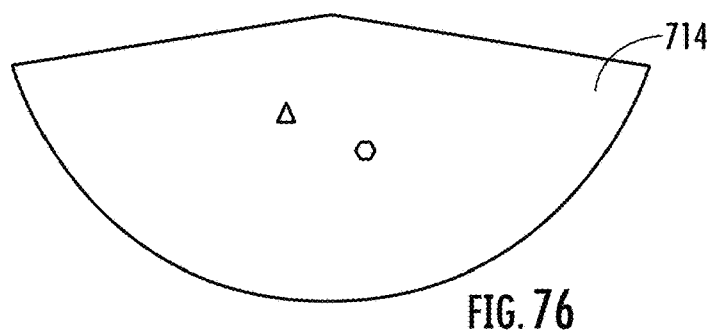
FIG. 76

MULTIPLEXED PHASED ARRAY MULTIBEAM SONAR

CROSS-REFERENCE TO RELATED PATENT APPLICATIONS

This patent application is a continuation of co-pending U.S. patent application Ser. No. 17/182,672, filed Feb. 23, 2021, which claims the benefit of U.S. Provisional Patent Application No. 62/985,609, filed Mar. 5, 2020, the entire teachings and disclosure of which are incorporated herein by reference thereto.

FIELD OF THE INVENTION

This invention generally relates to consumer fishfinder systems, and more particularly to multibeam phased array sonar systems.

BACKGROUND OF THE INVENTION

Consumer anglers have been using fishfinder sonar systems to successfully locate, and hopefully catch, fish since at least 1970 when a radiologist in Eufaula, Alabama, began modifying Heath Kit depth sounders to shield them from electrical noise from other equipment on the watercraft, leading ultimately to the start of the Humminbird® brand of consumer fishfinders. As the technology used in such consumer fishfinders progressed over the past half century from relatively simple two-dimensional (2D) sonar displays to Side Imaging®, 360°, and MEGA Imaging all available from the assignee of the present application, so too has the sophistication and demands of the anglers who use such equipment. Indeed, the technology, resolution, and imaging has advanced to a degree that many anglers have a difficult time distinguishing the current images generated by such equipment from actual underwater pictures.

In an effort to continue such advancement in underwater sonar imaging for consumer fishfinders, methods of using frequency swept sonar or blazed arrays are being introduced. This technology utilizes a relatively broadband input signal to drive a transmit (TX) transducer, i.e. the TX pulse is a signal that sweeps a frequency range. The transducer acts much like a prism to white light, separating the different frequencies (colors) in different angular directions. For frequency swept sonar, the phase in the TX elements is arranged so that transmit-beams are fanned out at angles proportional to frequency as shown in FIG. 69. Returning echoes are filtered out by frequency (see FIG. 70), where each frequency band corresponds to a direction. This allows the target that caused the reflected wave to be properly placed angularly on the fishfinder display.

Unfortunately, the spread of the different frequency beams generated by the transducer only covers typically a fraction of the area of interest for an angler, i.e., the volume of water in which the fish may be swimming. As such, typically multiple transducers are required that are mechanically mounted at angles relative to one another to provide the coverage required of the water volume to satisfy the needs of modern anglers. Such mechanical constraints often lead to large packaging requirements to house the transducers. Such packaging produces drag when in the water that is not particularly desirable on the watercraft.

The use of multiple TX transducers in such frequency swept sonar systems also complicates the frequency discrimination of the target's location. This is because the same frequency is sent out at multiple different angles from the multiple different angled TX transducers needed to cover the required water volume. Such may result in the improper placement of a target on the display, often referred to as ghosts.

A further problem with such frequency swept sonar systems relates to the resolution differences of the different frequency beams. That is, a lower frequency sonar wave provides a lower resolution of the target than a higher frequency wave. However, because different frequencies are required to allow the TX transducer to generate the different sonar beams, the resulting resolution from the different frequency returns vary in resolution. This can lead to poor resolution on the display for different areas, frustrating the anglers who may be lead to believe that there is something wrong with their display or system.

There is a need, therefore, for a multibeam sonar system for consumer fishfinders that overcomes these and other problems existing in the art. Embodiments of the present invention provides such a multibeam sonar system for a consumer fishfinder. These and other advantages of the invention, as well as additional inventive features, will be apparent from the description of the invention provided herein.

BRIEF SUMMARY OF THE INVENTION

Embodiments of the present invention provide multiplexed phased array multibeam sonar systems and methods for consumer fishfinders as shown in the accompanying drawings and described in various embodiments herein. Such embodiments should be taken by way of example and not by way of limitation.

In one embodiment, the multiplexed phased array multibeam sonar system includes a control head having a user display and a transducer unit coupled via a high-speed data link to the control head. The transducer unit includes a transmit (TX) element configured to generate a sonar ping to ensonify an ensonification cone of water in which the transducer unit is deployed. The transducer unit also includes a receive (RX) array configured to receive sonar echoes resulting from the sonar ping contacting targets in the ensonification cone. A digital signal processor (DSP) that is configured to process the sonar echoes into sonar display information is also included in the transducer unit, along with a multiplexer (MUX) coupled between the RX array and the DSP. The MUX is configured to selectively couple at least a first portion of the RX array to the DSP during a first time and a second portion of the RX array during a second time. The transducer unit communicates the sonar display information via the high-speed data link to the control head, and the control head plots the sonar display information received from the transducer unit on the user display.

In an embodiment the TX element is a curved ultrasonic transducer, and preferably a curved lead zirconate titanate (PZT) ultrasonic transducer tube. In an embodiment the TX element includes a curved reflector affixed thereto configured to provide directionality of ultrasonic energy of the sonar ping. In a preferred embodiment the TX element is configured to generate the sonar ping at 1.05 MHz carrier frequency ($f_c$). The sonar ping is a compressed high intensity radiated pulse (CHIRP) having a bandwidth ($S_{BW}$) of less than 50 KHz, preferably 35 KHz, in certain embodiments. In other embodiments the sonar ping is a continuous wave (CW) signal at 1.05 MHz carrier frequency ($f_c$) of a predetermined length. In certain embodiments the MUX has a sampling frequency $f_s>2\ S_{BW}$ and $f_s<f_c$, and preferably the MUX sampling frequency $f_s$ is 720 KHz.

In an embodiment, the RX array includes a plurality of RX elements to enable resolution of a plurality of beams. In certain embodiments there are 128 RX elements to enable resolution of 128 beams. In an embodiment the transducer unit further includes a 16-channel analog front end (AFE) configured to condition the sonar echoes and convert them to digital for processing by the DSP that is coupled between the MUX and the DSP. In one embodiment the MUX comprises a bank of sixteen 8-1 multiplexers to provide the sonar echoes from the 128 RX elements to the 16 channels of the AFE at a sampling rate of 5 MHz.

Preferably, the DSP is configured to perform base banding and down sampling of the digital sonar echoes to effectively reduce data rate without losing sonar information. In such embodiments a down sampling factor is configurable from 4 to more than 40. In one embodiment the down sampling factor is one of 4 or 5 to generate a low factor decimation signal, and the DSP is configured to perform CHIRP correlation on the low factor decimation signal to generate a bandlimited spectrum. In a preferred embodiment the DSP is configured to perform high factor decimation on the bandlimited spectrum with a down sampling factor of 10.

In an embodiment the DSP is configured to process the sonar echoes into sonar display information for each of the plurality of beams via beamforming filtering, which preferably pulls down sonar echo data that lies outside of a usable dynamic range into a common system noise floor to suppress side lobe noise.

In certain embodiments the MUX selects the RX elements to be read in accordance with a predetermined multiplexing pattern. In certain embodiments the predetermined multiplexing pattern is pseudo-random. In certain embodiments the predetermined multiplexing pattern is controlled by the multiplexer connection order of the channel select lines for each multiplexer of the bank. In such an embodiment, preferably the predetermined multiplexing pattern is further controlled by changing a switching order of the channel select lines of the multiplexer connection order.

In an embodiment of the present invention, the multiplexed phased array multibeam sonar system includes a TX element that is configured to generate the sonar ping at 1.05 MHz and a RX array that includes 128 RX elements spaced at slightly less than $\lambda/2$ for the 1.05 MHz sonar ping to provide resolution of 128 beams having an angular resolution of 1.25°. In an embodiment the DSP utilizes a mixer vector to compensate for phase shift of the sonar echoes that occurs between the first time and the second time.

In other embodiments of the present invention, a method of generating a sonar image on the user display of a control head of a consumer sonar system having a transducer unit coupled via a high speed data link to the control head, the transducer unit including a transmit (TX) element, a receive (RX) array, a digital signal processor (DSP), and a multiplexer (MUX) coupled between the RX array and the DSP, is provided. The method includes in an embodiment the steps of generating a sonar ping by the TX element to ensonify an ensonification cone of water in which the transducer unit is deployed, receiving sonar echoes by the RX array resulting from the sonar ping contacting targets in the ensonification cone, selectively coupling by the MUX at least a first portion of the RX array to the DSP during a first time and a second portion of the RX array during a second time, processing by the DSP the sonar echoes into sonar display information, communicating by the transducer unit the sonar display information via the high speed data link to the control head, and plotting the sonar display information received from the transducer unit on the user display.

In an embodiment the step of generating a sonar ping includes generating the sonar ping at 1.05 MHz carrier frequency ($f_c$). In one embodiment, the step of generating the sonar ping at 1.05 MHz carrier frequency ($f_c$) comprises the step of generating a compressed high intensity radiated pulse (CHIRP) having a bandwidth ($S_{BW}$) of less than 50 KHz. Certain embodiments may include the step of sampling the RX array by the MUX at a sampling frequency $f_s>2\ S_{BW}$ and $f_s<<f_c$. In another embodiment the step of generating the sonar ping comprises the step of generating a continuous wave (CW) signal at 1.05 MHz carrier frequency ($f_c$) of a predetermined length.

In an embodiment the step of processing by the DSP includes the steps of base banding and down sampling of the sonar echoes to effectively reduce data rate without losing sonar information, and wherein the step of down sampling utilizes a down sampling factor configurable from 4 to more than 40. In one embodiment the down sampling factor is 4 to generate a low factor decimation signal, and wherein the step of processing further includes the step of generating a bandlimited spectrum by performing CHIRP correlation on the low factor decimation signal. In a preferred embodiment the step of processing further includes the step of performing high factor decimation on the bandlimited spectrum with a down sampling factor of 10.

In one embodiment where the RX array includes 128 RX elements to enable resolution of 128 beams, the step of processing includes the step of beamforming filtering each of the 128 beams by pulling down sonar echo data that lies outside of a usable dynamic range into a common system noise floor to suppress side lobe noise.

In an embodiment the step of selectively coupling includes the step of selectively coupling in accordance with a predetermined multiplexing pattern, and in certain embodiments in accordance with a pseudo-random predetermined multiplexing pattern. In an embodiment the step of selective coupling in accordance with the predetermined multiplexing pattern is controlled by the multiplexer connection order of the channel select lines for each multiplexer of the bank. In an embodiment, the step of processing includes the step of compensating for phase shift of the sonar echoes that occurs between the first time and the second time by utilizing a mixer vector.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 48 is a graphical illustration of an acoustic wave pressure analogy useful in understanding a frequency to direction analogy for the RX array used in various embodiments of the present invention;

FIGS. 49-53 are graphical illustrations of the receipt of reflected waves from various directions and the corresponding pressure level pattern for each element of the RX array in accordance with an embodiment of the present invention;

FIG. 71 is a graphical representation of a prior art single beam sonar system showing a front end prospective of the transducer and two targets;

FIG. 72 is a graphical representation of the prior art single beam sonar system of FIG. 71 showing a side view prospective of the transducer and the two targets;

FIG. 73 is an exemplary display of the sonar rendering of the targets in the prior art single beam sonar system of FIG. 71;

FIG. 74 is a graphical representation of an embodiment of a multi-beam sonar system showing a front end prospective of the receive transducer array and two targets;

FIG. 75 is a graphical representation of the embodiment of a multi-beam sonar system of FIG. 74 showing a side view prospective of the receive transducer array and the two targets; and FIG. 76 is an exemplary display of the sonar rendering of the targets in the embodiment of a multi-beam sonar system of FIG. 74.

Figure 1:
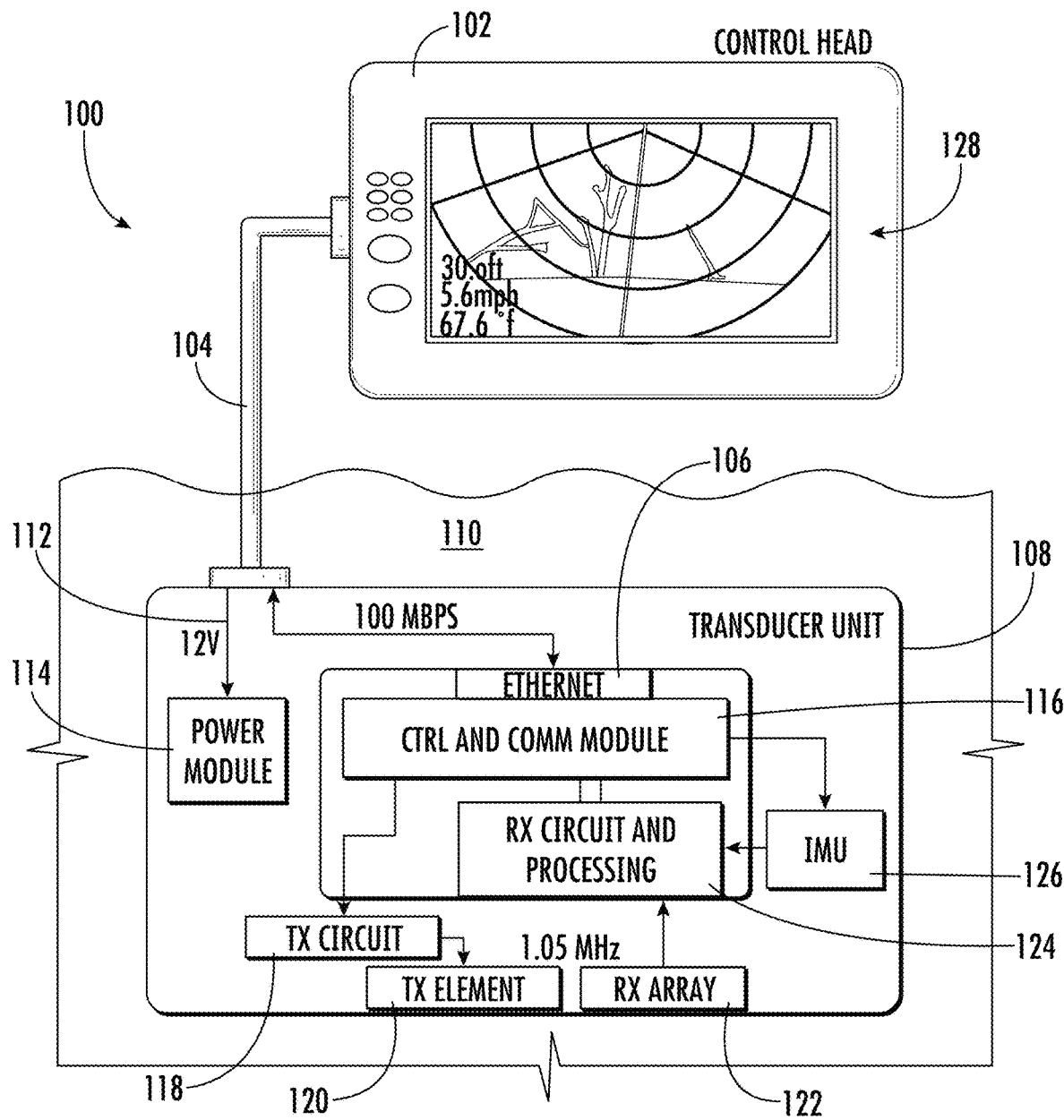
FIG. 1 is a simplified block diagram of an embodiment of a multiplexed phased array multibeam sonar system for use in a consumer fish finder constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are illustrated various embodiments of the present invention along with graphical, pictorial, and other illustrations of the manner and modes by which the objects of the present invention are achieved and through which those skilled in the art will come to appreciate and understand the full scope of the inventive features of the various embodiments of the present invention. However, these drawings should be taken by way as example and not by way of limitation.

As discussed briefly above, the use of multibeam sonar systems for consumer fish finders greatly simplifies and enables angular location of the acoustic returns, e.g., fish swimming in the water. In a single beam sonar system, the distance to target is easily determined based on time from transmit of the sonar signal until receipt of the sonar reflection as shown, e.g., in FIG. 72 illustrating a side view of the sonar transducer 700 and single sonar beam 702 with two targets 704, 706 at different distances. However, as shown in FIG. 71, the angular location of the targets 704, 706, while within the width of the sonar beam 702 shown from a front side perspective of the transducer 700 and sonar beam 702, is not possible to determine based solely on the time from transmit to receive. As a result, as shown in FIG. 73 no angular information is displayed to the angler on the fish finder display 708.

In a multibeam fish finding sonar system such as schematically illustrated in corresponding front (FIG. 74) and side (FIG. 75) perspectives, however, there are more input (receive or RX) transducers $710_0, 710_1, \ldots 710_{n-1}, 710_n$ that enable such angular location (in addition to distance to target based on time). This angular discrimination is possible by combining the phase from each receive transducer's signals using a beamforming algorithm. By looking at which receive transducer(s) $710_0, 710_1, \ldots 710_{n-1}, 710_n$ the return signal $712_0, 712_1, \ldots 712_{n-1}, 712_n$ is received (and the strength of the return at each transducer $710_0, 710_1, \ldots 710_{n-1}, 710_n$ as will be discussed more fully below), the angular location can be determined so that the target 704, 706 image may be properly placed on the user display 714 as shown in FIG. 76.

The challenges for multibeam fish finding sonar systems relate to these large numbers of input transducer channels. Indeed, depending on the desired accuracy, typically greater than sixteen channels are required. Processing this amount of sonar data requires intensive processing, typically in a digital signal processor (DSP). While commercial shipping industries often can afford such expensive processing power and size required for multibeam sonar systems, consumer fish finders are far more limited in their ability due to price point concerns, size of enclosures to enable such processing, and availability of lower cost alternatives to locate fish for the average consumer angler.

Recognizing these significant hurdles to incorporating such multibeam phased array sonar technology in a consumer fish finder and recognizing the increased demand for more lifelike real time imagery by more sophisticated consumer anglers, embodiments of the present invention provide a unique solution to be discussed more fully hereinbelow to provide a low cost, high resolution multibeam sonar for real time underwater imaging.

Indeed, FIG. 1 illustrates a simplified block diagram of one such embodiment 100. In such embodiment, the fish finder control head 102 typically mounted on the angler's watercraft for viewing while fishing is connected via a high-speed data link 104, e.g., an Ethernet link 106 capable of 100 Mbps transmission speeds, to the transducer unit 108 configured for usage in the water 110. The data link 104 is typically coupled with power lines 112 to provide the necessary power for operation of the transducer unit 108 via an internal power module 114. Control signals and data are communicated through a control and communications module 116 within the transducer unit 108.

This control and communications module 116 provides control signals to a transmit circuit 118 that controls the acoustic sonar signal generated by the transmit element 120 or elements. While various frequencies may be used in fish finding, one embodiment of the present invention generates a 1.05 MHz acoustic signal to provide enhanced resolution of the targets for the angler.

Acoustic returns are received by a separate receive array 122 and are processed in a receive circuit and processing module 124. Because the consumer fish finder 100 is deployed and used on an angler's watercraft, an inertial measurement unit (IMU) 126 is utilized to allow the receive circuit and processing module 124 to compensate for movement caused by wave action on the watercraft for stabilization of the displayed beam images 128. Once processed onboard of the transducer unit 108, the information is provided through the control and command module 116, via the high-speed data link 104, to the control head 102 for display to the angler.

Figure 2:
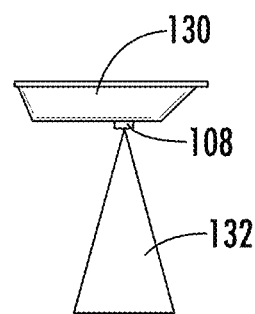
FIGS. 2-7 are side and front view graphical illustrations of exemplary mounting orientations for the transducers and the acoustic wave shape of various embodiments of the present invention that satisfy different fishing styles.
Figure 3:
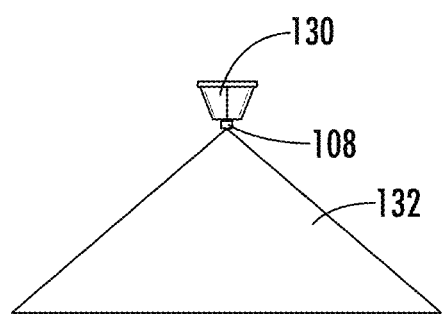
Figure 4:
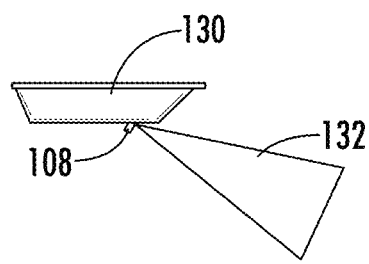
Figure 5:
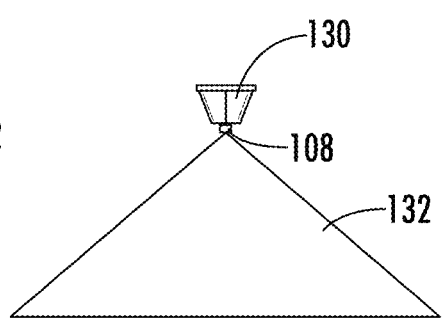
Figure 6:
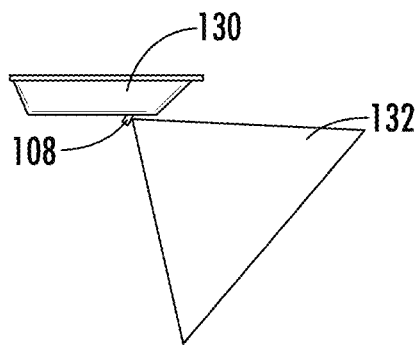
Figure 7:
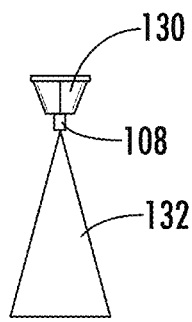

Because different anglers have different expectations based on their fishing style and quarry, the transducer unit 108 can be mounted in different ways on the watercraft 130 in order to project the acoustic wavefront 132 in different directions. While not limited thereto, FIGS. 2-7 illustrate three exemplary mounting orientations as illustrated from the side and front of the watercraft 130. Illustrated in FIGS. 2 and 3 is a down looking orientation to enable fish location under the watercraft 130. Illustrated in FIGS. 4 and 5 is a forward-wide scan orientation to enable fish location forward and to the sides of the watercraft 130. Finally, although not limited thereto, FIGS. 6 and 7 illustrate a forward-deep scan orientation to enable fish location forward and below the watercraft 130. Side (FIGS. 2, 4, and 6) and forward (FIGS. 3, 5, and 7) views for each of these orientations are provided to aid in understanding the differences of these three exemplary orientations.

Indeed, because many anglers utilize their watercraft for various types of fishing and may need to adjust their fishing style therebetween, some embodiments of the present invention provide adjustability, either manually or electronically, of the mounting orientation of the transducer assembly. Such adjustability may be provided in one embodiment by a 6-axis swivel, ratchet mounting, etc. to allow the angler to fully customize how the system is used. Other embodiments also or alternatively provide a motorized angular sweep of the orientation of the transducer unit to enable full 360° coverage around and/or below their watercraft. Control of the sweep may also, in other embodiments, allow for sector scanning of less than the full 360°.

Figure 8:
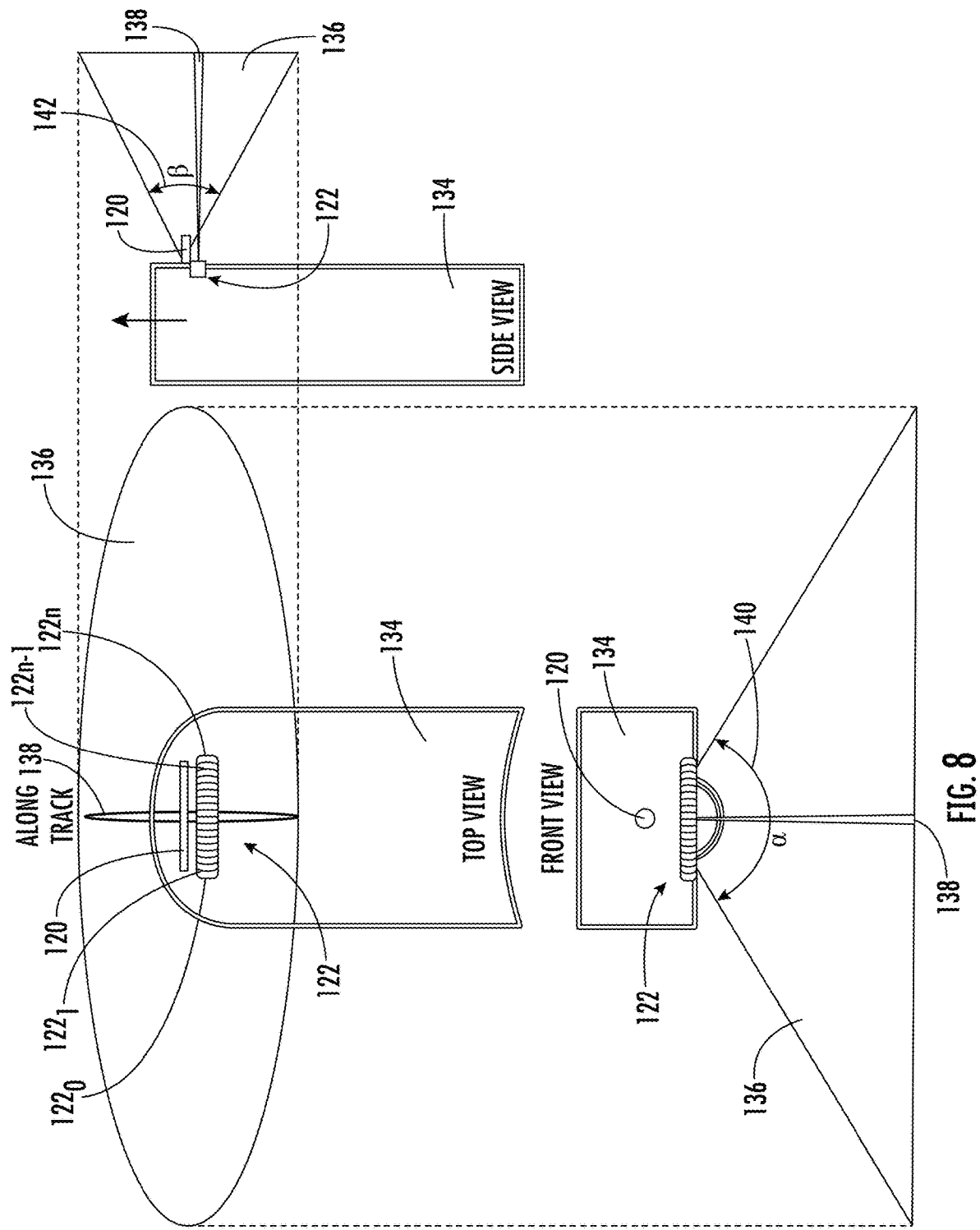
FIG. 8 is a three-view block diagram illustration showing the transmit and receive components of an embodiment of the present invention along with the transmit ensonification cone and one receive wedge resulting from beamforming in accordance with certain embodiments of the present invention.

FIG. 8 illustrates three views of the transmit (TX) and receive (RX) components of one embodiment of the present invention in top, front, and side view orientations. As may be seen, the transducer body 134 housing the electronics discussed above includes a TX element 120 and a RX array 122. The TX ensonification cone 136 is also illustrated, as is one of the RX slivers or wedges 138 (actually generated by the beam forming to be discussed more fully below since the reflected sonar signal may actually be received by multiple RX elements $122_0$, $122_1$, ... $122_{n-1}$, $122_n$ of the phased RX array 122, albeit at different times and magnitudes). Once resolved, each RX wedge ($138_0$, $138_1$, ... $138_{n-1}$, $138_n$, not shown) may be thought of as corresponding to one of the RX elements $122_0$, $122_1$, ... $122_{n-1}$, $122_n$ of the RX array 122 having a certain angular discrimination. As may be appreciated, the RX wedge 138 that is generated is only a very small fraction of the TX ensonification 136, which enables the accurate angular location of the acoustic sonar returns received by the RX array 122. This fractional RX wedge 138 is both a fraction of the TX ensonification spread 140 (represented by the angle α in the front view) and of the TX ensonification depth 142 (represented by the angle β in the side view).

Figure 9:
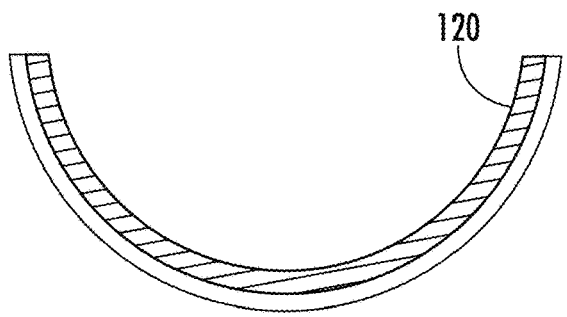
FIG. 9 is a simplified illustration of the single element, curved transmit element utilized in certain embodiments of the present invention.

In one embodiment as illustrated in FIG. 9, the TX element 120 is a single element curved TX element 120, which provides a much better TX ensonification of the water volume of interest to the angler than the typical rectangular sonar transducer shape. This separate TX transducer element 120 allows the system of the illustrated embodiment to increase the transmit sound pressure to be able to reach deeper depth performance versus using the multi-element array as the medical ultrasound and Non-Destructive Test (NDT) systems do. As mentioned above, in order to provide enhanced resolution, a 1.05 MHz signal is generated by the TX element 120.

Figure 10:
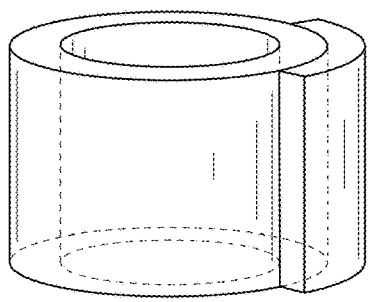
FIG. 10 illustrates the construction of an embodiment of the transmit element of FIG. 9, including an optional reflector used in certain embodiments to provide enhanced directionality of the ultrasonic energy.
Figure 11:
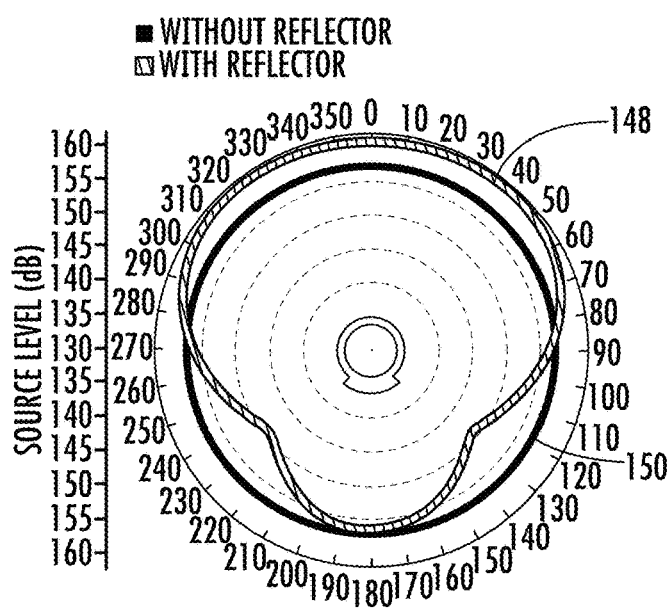
FIG. 11 is a simplified radiation pattern plot for embodiments of FIG. 10 with and without the optional reflector.

The curvature and construction of the TX element 120, as shown for one embodiment in FIG. 10, utilizes a lead zirconate titanate (PZT) ultrasonic transducer tube 144. In one embodiment, the PZT tube 144 includes a curved reflector 146 affixed thereto, which serves to provide directionality of the ultrasonic energy as shown in the radiation pattern plot of FIG. 11 (radiation pattern plot shown for embodiments with 148 and without 150 a reflector). This construction provides uniform ensonification not possible when using multiple angled rectangular transducers due to overlap of the acoustic signal from the multiple transducers required to ensonify the same volume of water. Further, more surface area is provided by the curved structure which allows for more TX energy with lower stress to the ceramic material of the transducer than the traditional rectangular configuration.

Figure 12:
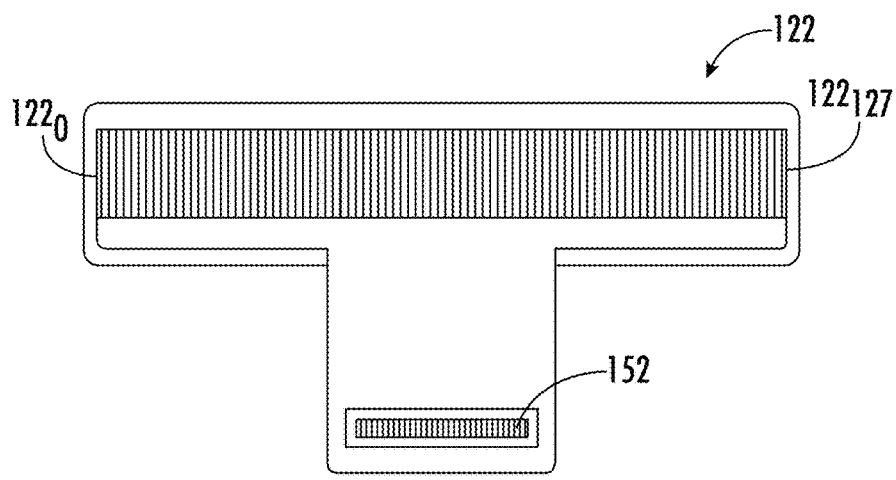
FIG. 12 is a simplified illustration of the receive array of one embodiment of the present invention utilizing a 128 element receive array.

As shown in FIG. 12, in one embodiment the RX array 122 utilizes a 128 element ($122_0$ ... $122_{127}$) RX array 122, the connections to which are provided by the connector 152 shown at the bottom of the illustrated embodiment. More or fewer elements may be used to increase or decrease the number of beams that may be resolved, and therefore increasing or decreasing the angular resolution. In the illustrated embodiment, the elements are spaced by slightly less than λ/2 for the 1.05 MHz signal used in one embodiment. Such configuration allows for resolution of at least 128 beams, providing an angular resolution of 1.25°.

Figure 13:
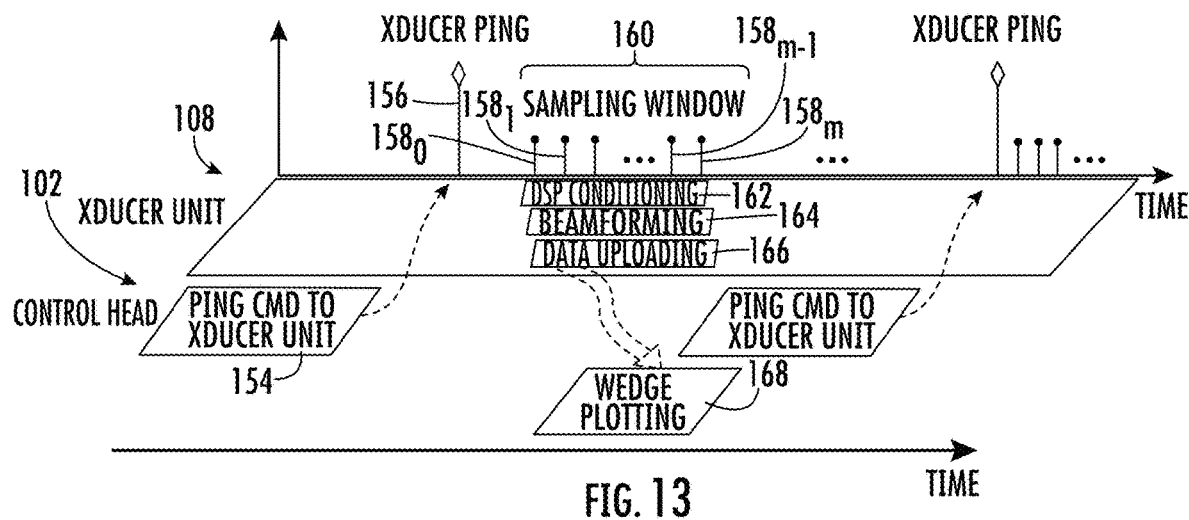
FIG. 13 illustrates simplified control and division of processing between the control head and the transducer unit during operation of an embodiment of the multiplexed phased array multibeam sonar system of FIG. 1.

FIG. 13 illustrates the basic control and division of processing between the control head 102 and the transducer unit 108 during operation of one embodiment, which may be referred to as the ping loop. In "ping cmd" 154 the control head 102 configures the transducer unit 108 with the start and stop of acquisition window, also referred to as the sampling window, the fixed amp gain, and the time variable gain (TVG). Upon receipt of the ping command 154 from the control head 102, the TX unit 108, and more particularly the TX element 120 (not shown), generates a transducer ping 156 to ensonify the water. Thereafter, at every sampling instant $158_0$, $158_1$, ... $158_{m-1}$, $158_m$ during each sampling window 160, the 128 RX transducer elements (not shown) are sampled and processed. As will be discussed more fully below, this processing includes DSP conditioning 162 and beamforming 164. This is a heavy processing load and takes place within the transducer unit 108.

Figure 14:
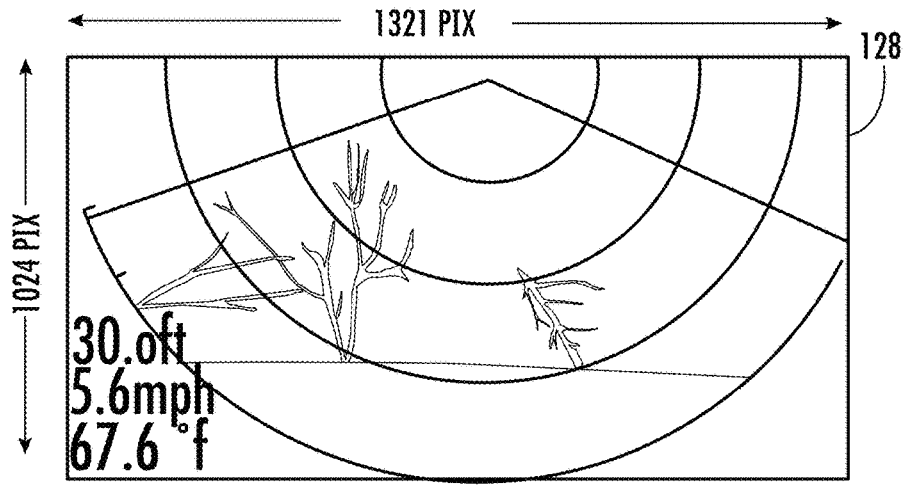
FIG. 14 is an exemplary display of the control head unit of FIG. 1.

Once the processing has been completed at each instant, output data is sent via the data uploading 166 to the control head 102. Only data that will be displayed is sent to the control head 102 to reduce total data throughput. Because of the display resolution, the data is heavily decimated at the source before it is transferred to the control head 102 for display via the wedge plotting 168. In one exemplary embodiment of a control head display 128 illustrated in FIG. 14, the display 128 includes, for example 1000 pixels per swath line and 256 swath lines (beams) in a 1024×1321 pix display, keeping the number of points per swath line constant.

Figure 15:
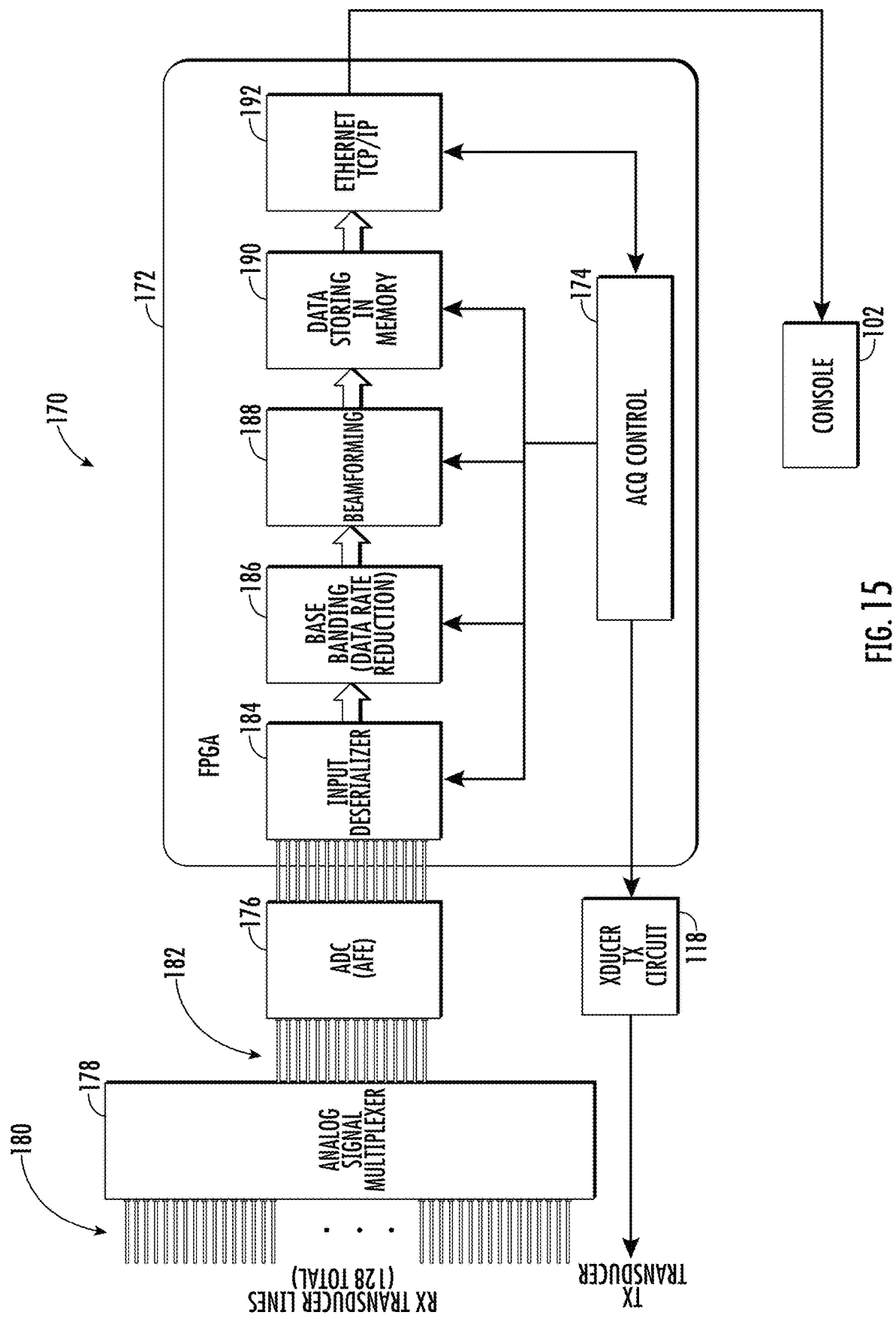
FIG. 15 is block diagram of the control and processing architecture of an embodiment of the multiplexed phased array multibeam sonar system of FIG. 1.

In order to handle in an efficient and cost-effective manner the heavy processing load required in the transducer unit 108 for sampling and processing the data generated, the control and processing architecture 170 illustrated in FIG. 15 is utilized in one embodiment. As illustrated, this embodiment utilizes a field programmable gate array (FPGA) 172 based solution because of the FPGA's ability to handle a large number of inputs/outputs (I/O), its configurable parallel and systolic processing, and its acquisition (ACQ) control 174.

In this embodiment the ACQ control 174 controls sampling signal and ping generation, start and stop of acquisition, and TVG. The analog front end (AFE) 176 includes signal conditioning and analog to digital conversion (ADC)

for the data received by the RX array in a single integrated circuit (IC). In the illustrated embodiment an analog signal multiplexer 178 is used to multiplex the received analog data 180 from the 128 RX transducers (each receiving the high frequency sonar reflection signals of 1.05 MHz in one embodiment) to the 16 serial data channels 182 of the AFE 176 at a sampling rate of 5 MHz. In one embodiment, a bank of sixteen 8-1 multiplexers is used to provide the 16 serial data channels of the AFE 176. Each of the 16 channels 182 of the AFE 176 includes programmable amplifiers, a configurable antialiasing low pass filter, a 14-bit ADC, and configurable DSP filtering on the output.

It should also be mentioned that there are some significant difficulties of high frequency multiplexing within one transmit-receive cycle. Unlike medical ultrasound operating in the "near-field" region, where distances and time delays are so short, they can multiplex between different transmit-receive cycles and still maintain good imagery, in "far-field" sonar that must operate in ranges of many feet instead of inches, multiplexing between different transmit-receive cycles is not possible. However, while this multiplexing of the received data increases the processing complexity, it greatly reduces the data load, thereby allowing for the achievement of the near real-time, high-resolution imagery in a size and price point that enables this technology to be employed in a consumer fish finder.

Once the data has been input to the FPGA 172 from the AFE 176, an input deserialization 184 occurs. With the 16 channels of the illustrated embodiment, the data has an input frequency calculated as 14 bits at a 5 MHz sampling rate, or an input frequency of 70 MHz. Each serial input sample is converted into a 14-bit parallel output, and all of this data is passed in parallel to the next module. In order to reduce the data rate without losing sonar information, this next module 186 of the FPGA 172 performs base banding and down sampling. The down sampling factor is configurable, is a function of the depth, and ranges from 4 to more than 40. This base banding and down sampling effectively reduce the input frequency from 5 MHz to an output frequency of 0.5 MHz.

As will be discussion in greater detail below, the output of this base banding and down sampling processing is a complex envelope having two values per input, real and imaginary. The complex components determine actual amplitude and phase of each sample. Because the complex output is low frequency, it can be down sampled without losing the sonar information needed in the beamforming process 188, similar to a typical digital heterodyne base banding process. This data is then stored in memory 190 and transmitted to the control head console via the high-speed link, illustrated as an Ethernet TCP/IP 192 transmission, ultimately to provide the high-resolution images demanded by modern anglers.

As may already be appreciate from the foregoing, the challenges for such an embodiment are related to the large number of inputs, i.e., the data 180 from the 128 RX element array with high frequency of 1.05 MHz for the ADC 176 to handle, which results in computationally intensive digital signal processing (DSP). However, through the use of an 8-1 analog signal multiplexer bank of sixteen multiplexers, the present embodiment is able to use a single 16-channel AFE (ADC) 176. The FPGA 170 has a large I/O bank as mentioned above that allows parallel and systolic processing.

What may not have been appreciated from the foregoing, however, is the multibeam sampling frequency problem with such a high-resolution sonar system as has been described. However, because the multibeam sonar signal utilizes a 1.05 MHz carrier ($f_c$) and a modulating frequency bandwidth $\approx 50$ KHz, the minimum Nyquist sampling frequency to properly detect or sample the carrier frequency would be taught to be 2.1 MHz. However, the presently illustrated embodiment utilizes 8-to-1 multiplexing having a multiplexer switching frequency of 8 MHz. Unfortunately, the current state of multiplexers is not capable of switching that fast. However, since the sonar signal has a very narrow bandwidth ($S_{BW} < 50$ KHz), it is possible to sample and reconstruct the signal using a low sampling frequency $f_s$ such that $2S_{BW} < f_s << f_c$. For example, with $f_s$ selected to be 720 KHz, the multiplexer switching frequency is reduced to only 5.8 MHz. This discovery enables implementation of the present embodiment with currently available technology.

Figure 16:
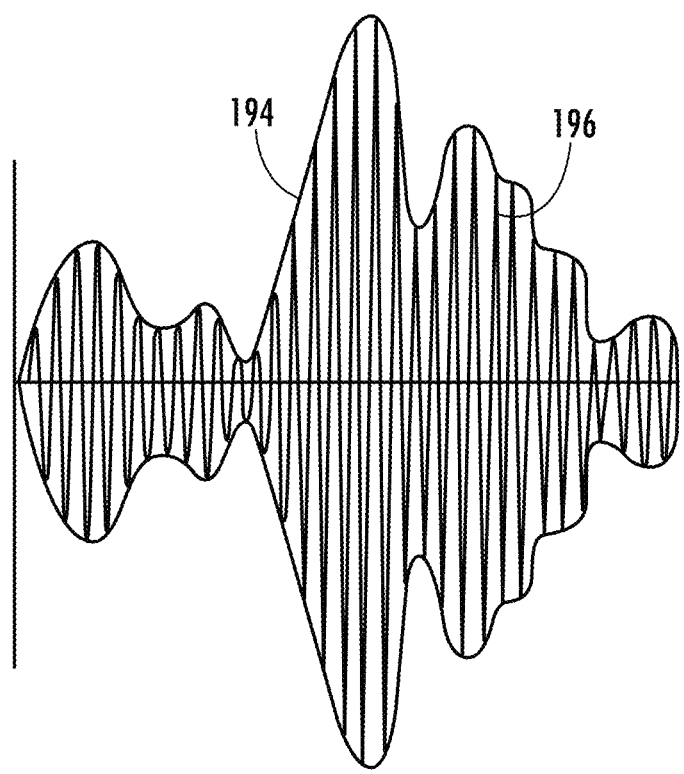
FIG. 16 is a graphical illustration of modulation of a signal carrier pulse $f_c$ by echoes produced by obstacles in the water.
Figure 17:
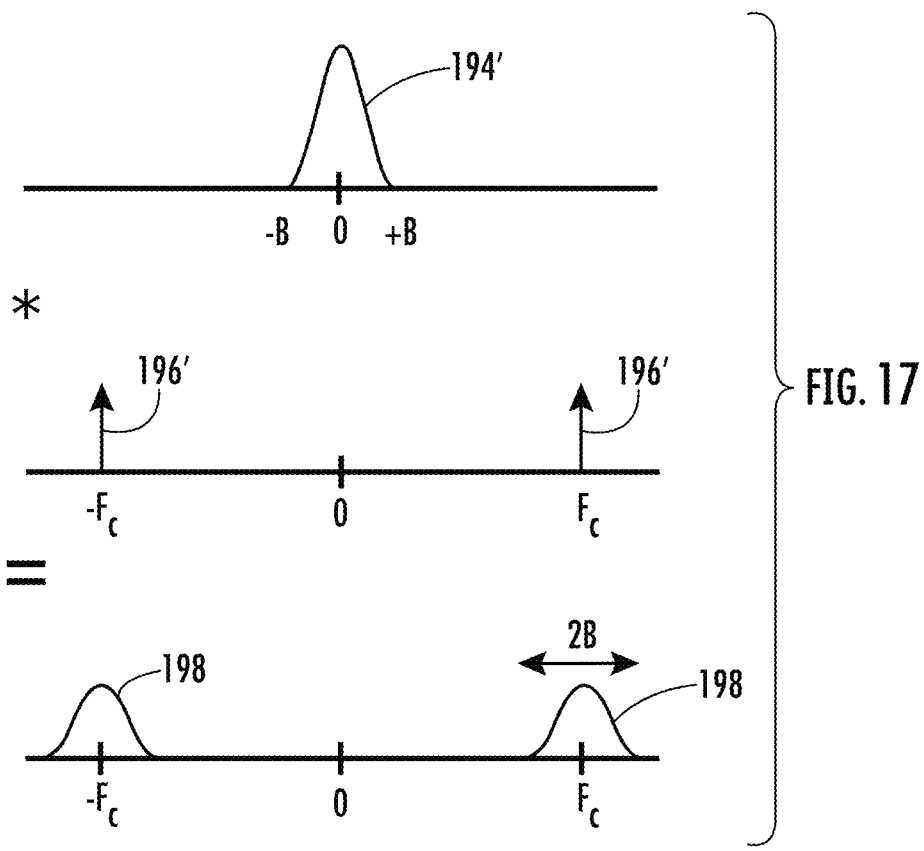
FIG. 17 is a graphical illustration of the signal multiplication of the baseband of the modulations and the modulated $F_c$.

To understand how this can be accomplished without a loss of fidelity of the sonar data, the following will describe the sonar ping process. The TX element transmits an interrogation pulse with carrier frequency of $f_c$. Echoes produced by obstacles results in modulation 194 of the carrier $f_c$ 194 as shown in FIG. 16 in the time domain. As shown in FIG. 17 in the frequency domain, the modulations 194' come on a base band of length B that depends on the length of the interrogation pulse (for continuous wave (CW)) or the bandwidth (for compressed high intensity radiated pulse (CHIRP)). The product 198 of the modulations 194' and the carrier $F_c$ 196' may be illustrated as the modulated $F_c$ of length 2B centered at $+/-F_c$. The main objective, of course, is to recover the base band modulation signal 194.

Figure 18:
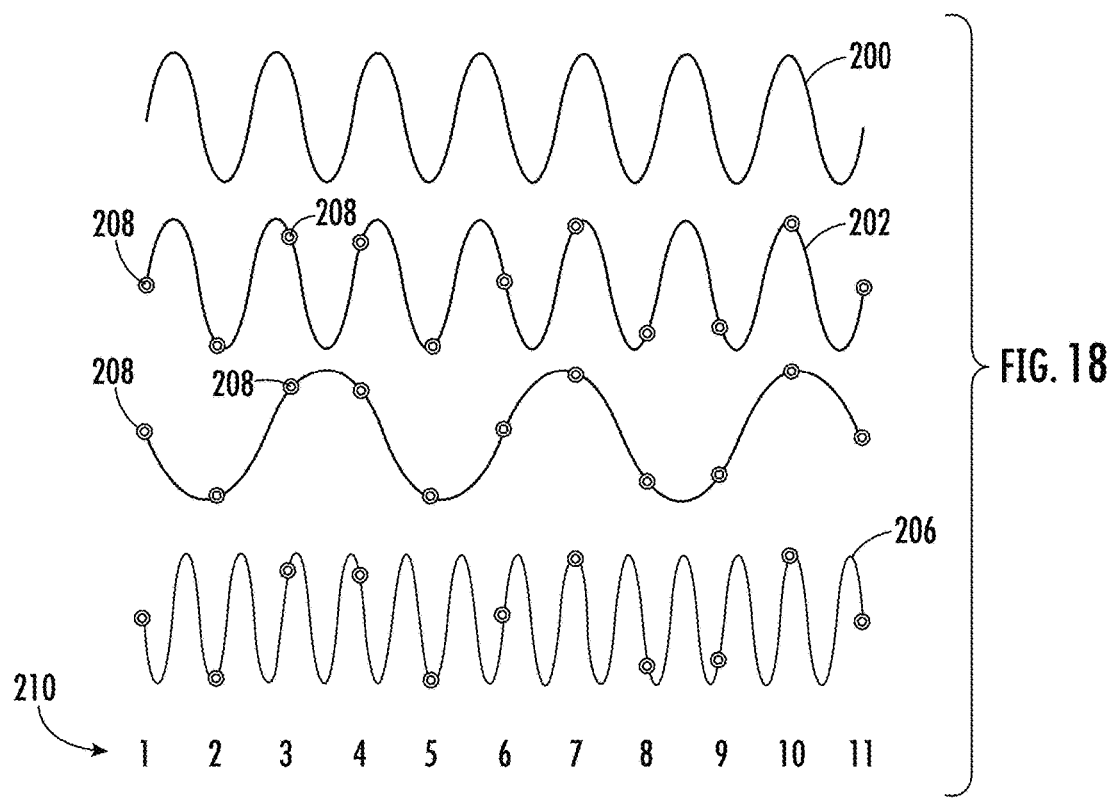
FIGS. 18-20 are signal diagrams illustrating the process of undersampling to recover a signal's baseband utilized in an embodiment of the present invention.
Figure 19:
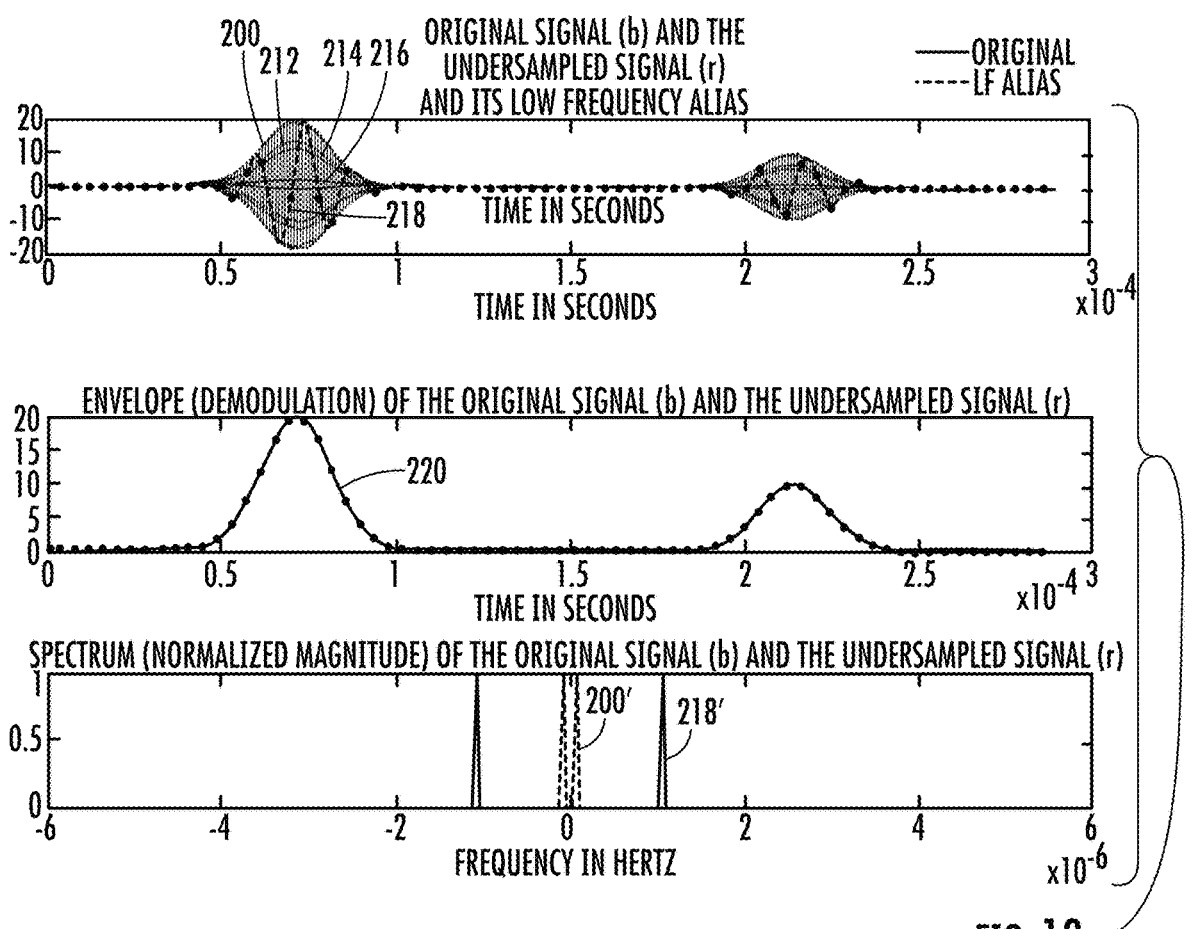
Figure 20:
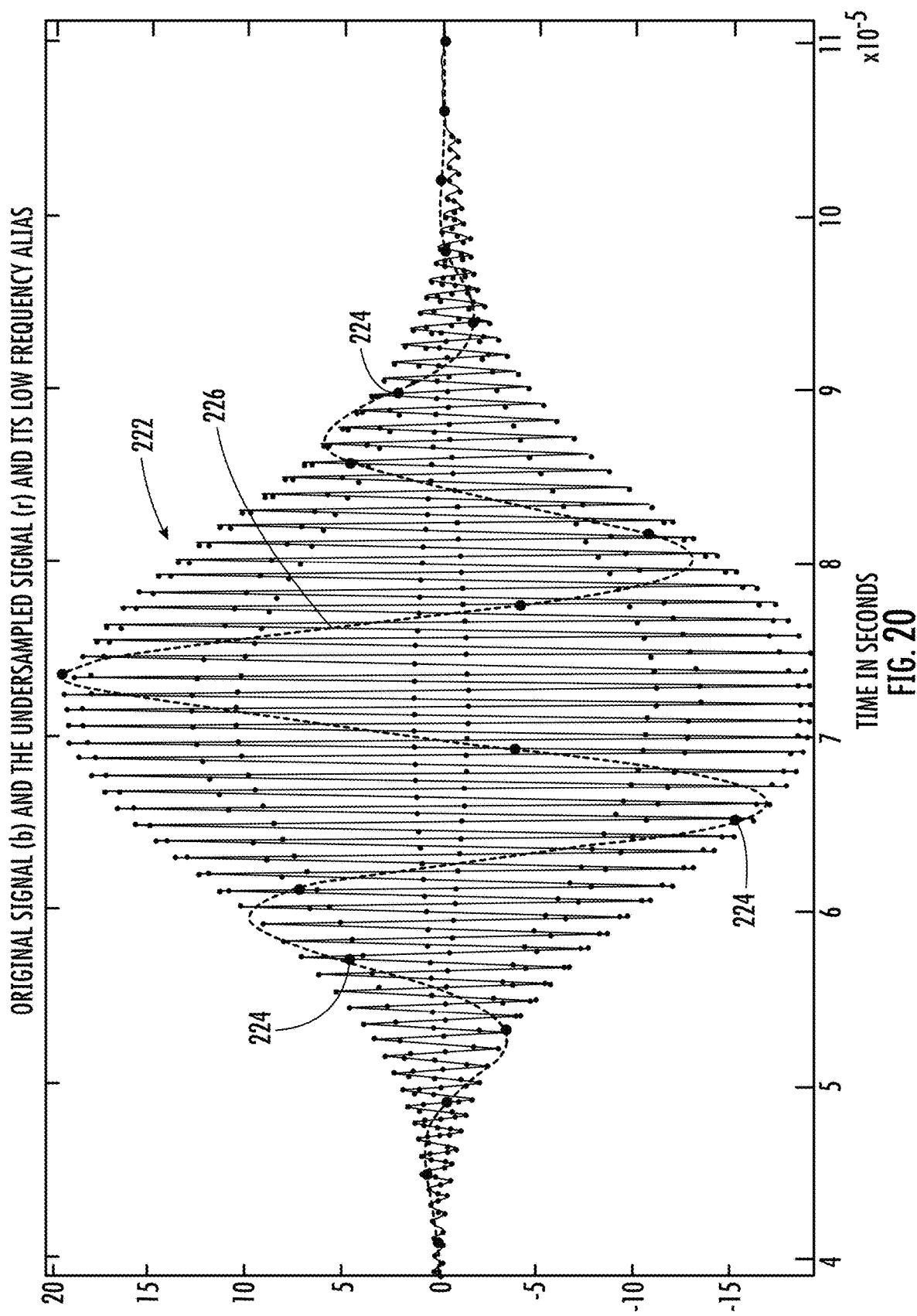

To understand the process of undersampling to recover the signal's baseband, reference is now made to FIGS. 18, 19, and 20. A set of samples 202, 204, 206 shown in FIG. 18 fits in all aliased frequency bands. If the original signal 200 has frequencies that fall within the range of an alias, then the sample-to-signal relation is ambiguous as shown by the values illustrated as dots 208 on the waveforms 202, 204, 206 at each sampling time 210. However, with reference to FIG. 19, with a carrier frequency (or transducer frequency) of 1.05 MHz with pulses having a bandwidth (BW) of 35 KHz, the plots 212, 214, 216, etc. illustrate a signal sampled at 10.5 MHz, and the plot 218 the signal sampled at only 245 KHz (or 7*BW). The undersampled (aliased) version shown in the plot 218 still captures all details of the original signal 200 with a minimum number of samples. Indeed, the envelope demodulation 220 of the original signal 200 and the undersampled signal 218 shown in the middle plot of FIG. 19 illustrates this point. The bottom plot of this FIG. 19 illustrates the frequency spectrum (normalized magnitude) of the original signal 200' and the undersampled signal 218'.

FIG. 20 illustrates one of the envelops 222 of the original modulated signal with the dots 224 illustrating the samples taken at the undersampling frequency of 245 KHz. The line 226 illustrates the interpolation of these samples, which is an alias or image of the original signal but at lower frequency. Despite sampling well below the Nyquist sampling frequency, the modulating information (baseband or envelope) is preserved in the undersampled version of the signal. By choosing the right undersampling frequency it is also possible to directly obtain the signal's envelope 222.

Figure 21:
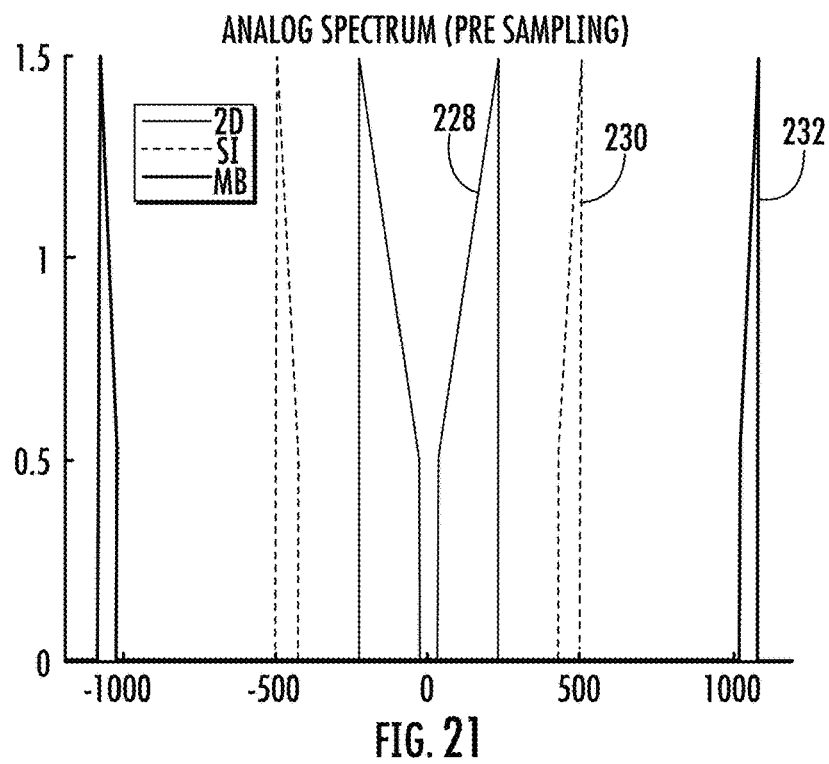
FIGS. 21 and 22 illustrate undersampling aliases that overlap other signals used by anglers in the analog and digital spectrums.
Figure 22:
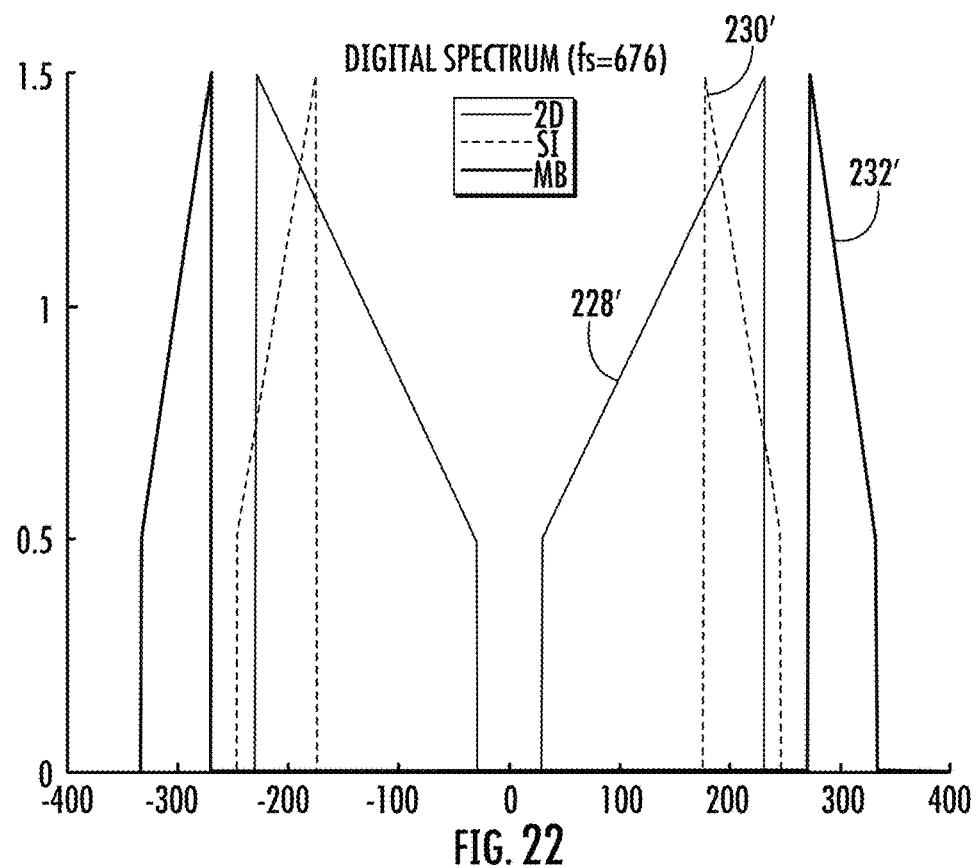

Of course, there are issues associated with undersampling that must be accounted for in order not to degrade the actual sonar data with extraneous information. That is, undersampling produces aliases that may overlap with other signals. As a result, the signal to noise ratio (SNR) degrades, especially if noise is within a band that overlaps the aliased spectrum. As such, the under-sampling frequency $F_{us}$ must be chosen such that the aliased band does not fall, e.g., within the bands of other sonar signals often used by anglers, as illustrated in FIGS. 21 (analog spectrum) and 22 (digital spectrum), such as the traditional two-dimensional (2D) sonar shown in line 228 or the side imaging sonar shown in line 230 (multibeam is shown in line 232). As an example, with a multibeam transducer virtual frequency of 300 kHz, the $f_{us}$ may be 676 kHz to avoid these problems.

Figure 23:
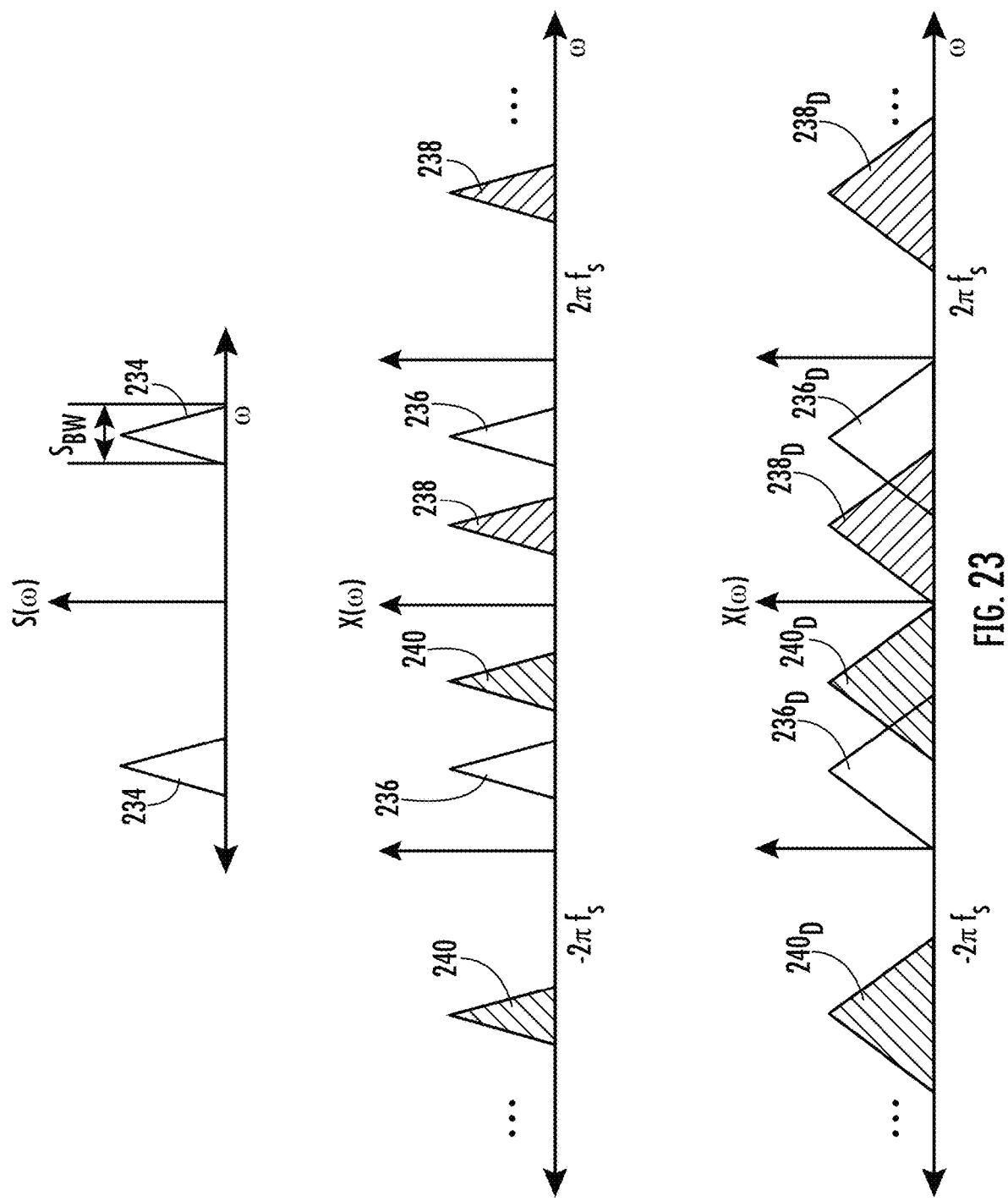
FIG. 23 is a graphical illustration of the processing of an undersampled signal from the original signal spectrum before sampling, a transducer virtual frequency spectrum after undersampling, and the stretching of the spectrum that may occur through high factor decimation to reduce hardware resources.

With these considerations in mind in the current embodiment of the present invention discussed above, processing the undersampled signal may be understood for such embodiment with reference to FIG. 23, which shows the original signal spectrum 234 before sampling in the top graphical illustration. Specifically, the undersampling frequency $F_{us}$ is selected so that its period is a multiple of the FPGA clock period. With the transducer original frequency ($f_{c_{orig}}$) of this embodiment being 1.05 MHz with a bandwidth ($S_{BW}$) of 35 KHz, the under-sampling frequency ($F_{us}$) is 735.29 kHz, giving a transducer virtual frequency ($fc_{vert}$) of 317.3 kHz, and a transducer virtual frequency spectrum 236 after undersampling as may be seen from the middle graphical illustration.

However, while the undersampling frequency is chosen to minimize overlap of frequency components 238, 240 and is effective at such as may be seen by the middle graphical illustration of FIG. 23, decimation is still required in order to reduce the hardware DSP resources. Indeed, decimation by large factors, such as 40, is utilized in one embodiment of the present invention to reduce the amount of data for deeper ranges, effectively reducing the DSP resources. Unfortunately, while the undersampling frequency was judicious chosen to avoid overlap as explained above, decimation "stretches" the signal spectrum $236_D$ as shown in the bottom graphical illustration of FIG. 23, such that its positive and negative frequency components may overlap other decimated frequency components $238_D$, $240_D$ nonetheless. Spectrum overlap results in "mirrored" images on an angler's display screen, which need to be eliminated so as not to confuse the angler.

Figure 24:
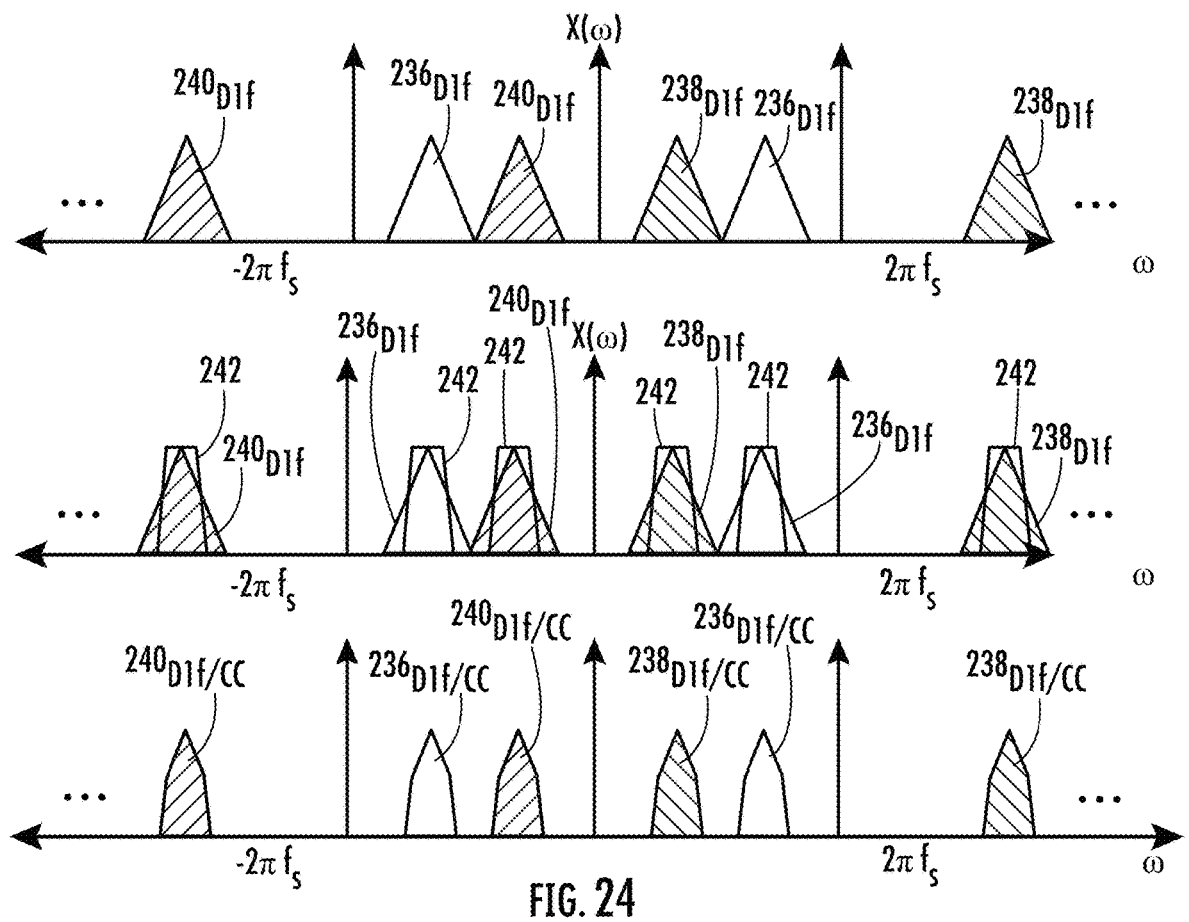
FIG. 24 is a graphical illustration of low factor decimation and CHIRP correlation affect on the signal spectrum of the undersampled signal utilized in an embodiment of the present invention.

To avoid this overlap resulting from high factor decimation of the undersampled signal, a prefilter can be used. CHIRP correlation is a good filter for this purpose; however, CHIRP correlation consumes many DSP resources, the minimization of which was why the signal was decimated in the first instance. To balance these effects so as to reduce the DSP resources and avoid mirrored images on the display, decimation at a low factor, e.g., 4 or 5, is used in order to minimize the stretching of the signal spectrum $236_{Dif}$, $238_{Dif}$, $240_{Dif}$ as shown in the top graphical image of FIG. 24. As may be seen, this low-rate decimation will not result in major overlap, as was the case with the decimation by large factors discussed above and shown in FIG. 23 (bottom illustration). After this low factor decimation, CHIRP correlation is performed, as illustrated in the middle graphical illustration of FIG. 24 with the CHIRP bandwidth shown in the rectangular boxes 242 around each of the low-decimated spectrum components $236_{Dif}$, $238_{Dif}$, $240_{Dif}$. The spectrum $236_{Dif CC}$, $238_{Dif CC}$, $240_{Dif CC}$ after the low decimation and CHIRP correlation is then shown in the bottom graphical illustration of FIG. 24. As this last illustration shows, the CHIRP correlation will make the width of the spectrum even narrower.

Figure 25:
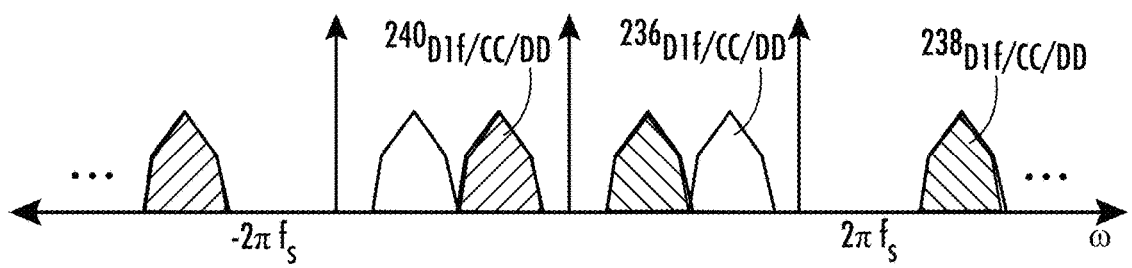
FIG. 25 is a graphical illustration comparing subsequent decimation of the bandlimited spectrum of FIG. 24 compared to high factor decimation of a non-CHIRP limited spectrum.
Figure 25:
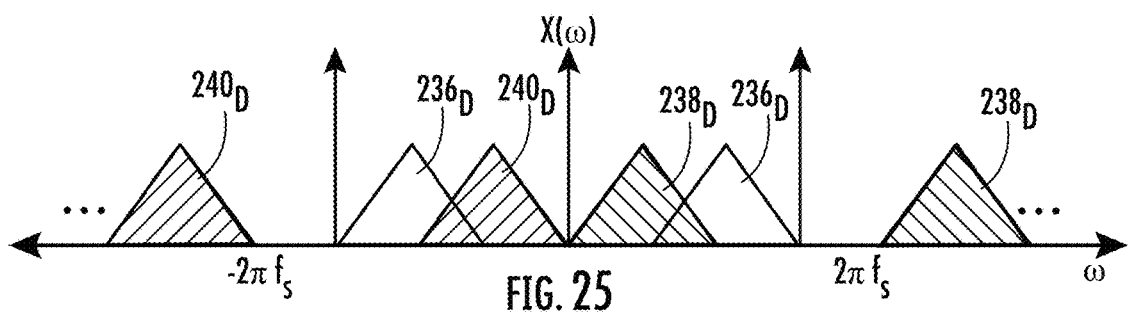

With such a narrow bandwidth of the spectrum after the low factor decimation and CHIRP correlation, i.e., once the CHIRP correlation has bandlimited the spectrum, it is then possible to reduce the DSP resource usage further by decimating this spectrum by a high factor, such as 10. While this second decimation will again stretch the (bandlimited) spectrum $236_{Dif CC/D}$, $238_{Dif CC/D}$, $240_{Dif CC/D}$, there is not any risk of any significant overlap as shown in the top graphic illustration of FIG. 25. For comparison, the bottom graphic illustration of this FIG. 25 shows the spectrum $236_D$, $238_D$, $240_D$ after high decimation without CHIRP correlation (see also FIG. 23 bottom illustration and associated discussion above).

Figure 26:
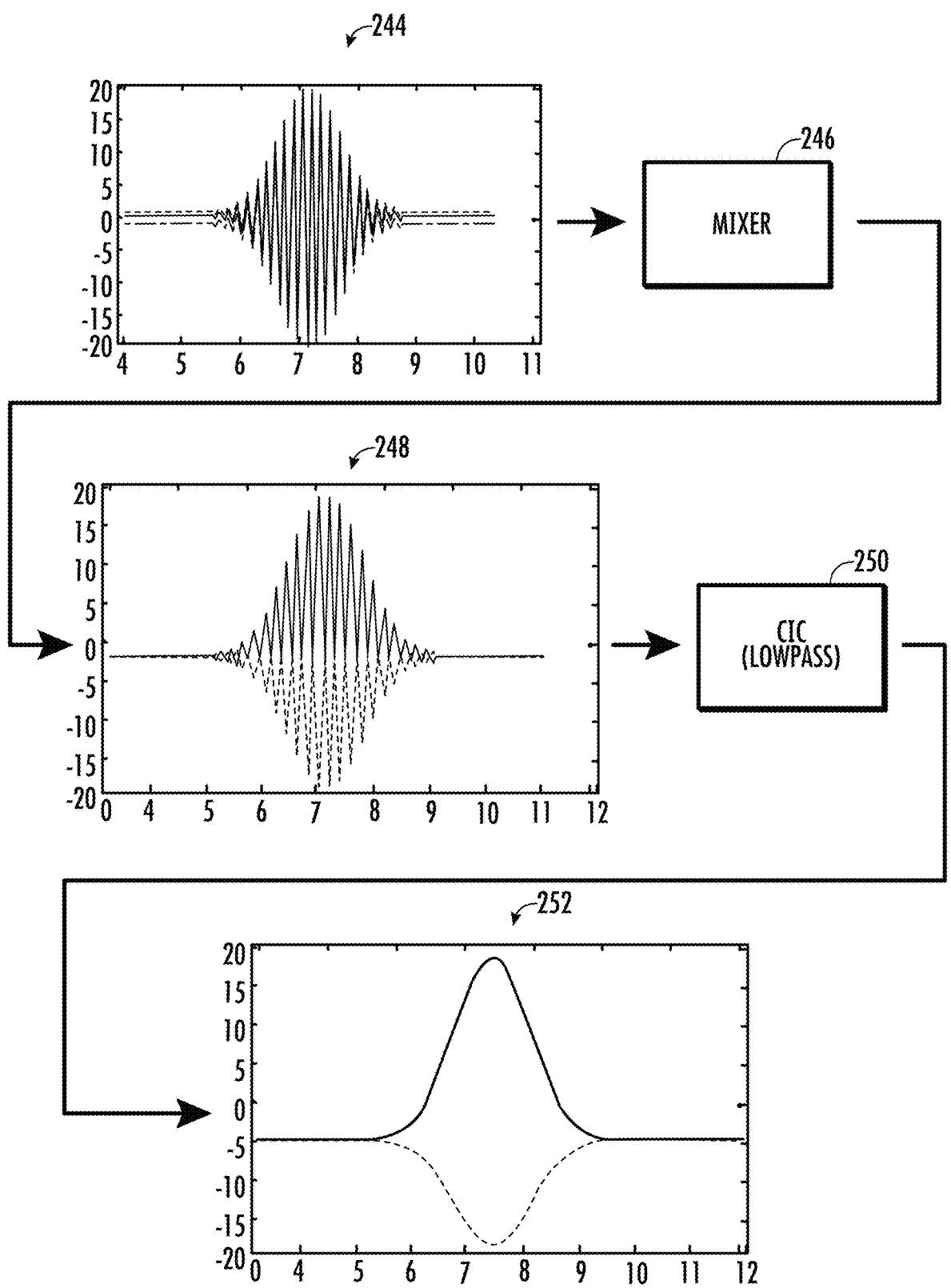
FIG. 26 is a graphical process illustrating of mixing to demodulate a sampled signal.
Figure 27:
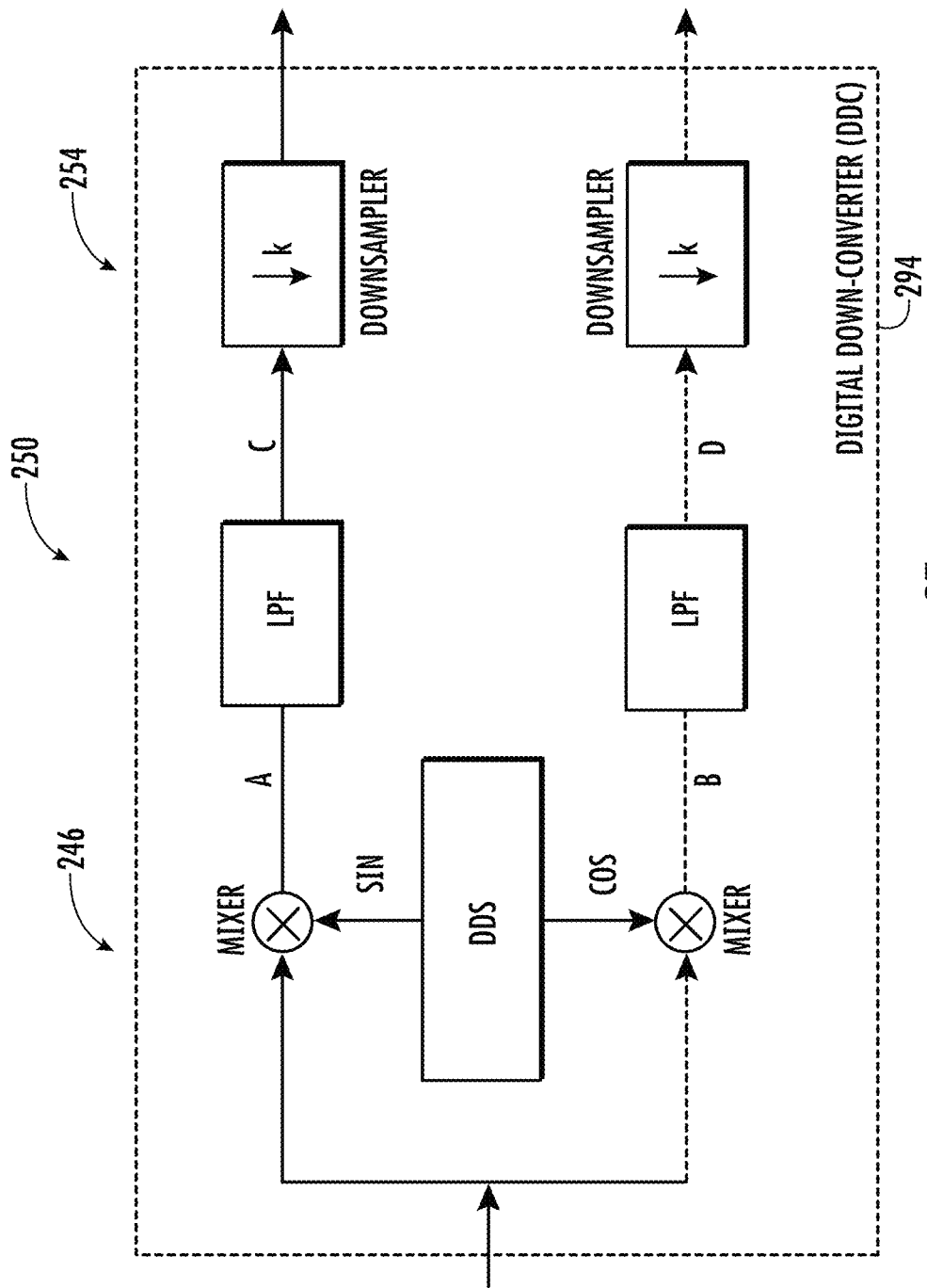
FIG. 27 is a block diagrammatic illustration of a digital downconverter (DDC) used in an embodiment of the present invention to output a complex signal carrying a wavefront's phase and amplitude information for each sample to be used for the beamforming stage in one embodiment.

Returning then to the discussion of base banding of the undersampled signal, and with reference to FIGS. 26 and 27, mixing is used to demodulate the sampled signal 244. That is, the signal 244 is multiplied by sinusoidals (mixing) to shift the main band to DC using a mixer 246 frequency that is the same as the modulating frequency. The mixing produces a high freq. image 248 at $2f_c$ (this is not an alias) at points A and B of the digital down converter (DDC) 294 in FIG. 27. This image 248 must be eliminated with a low pass filter 250 to yield the baseband component of the signal at points C and D. Thereafter, the lowpass filtered signal 252 can be down sampled 254. Usually, $f_s$ is such that it satisfies the Nyquist criterion $f_s \gg f_c$ and the output is a complex signal carrying wavefront's phase and amplitude information for each sample. This information is used for the beamforming stage (see FIG. 15).

Figure 28:
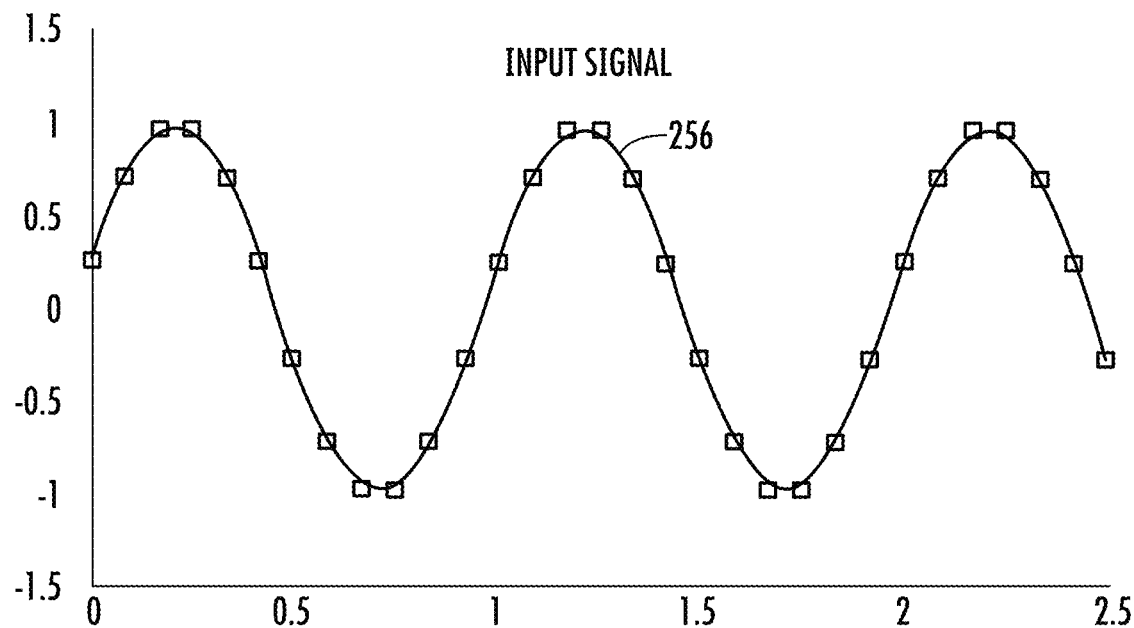
FIG. 28 is a graphical illustration of a sinusoidal input signal used to illustrate the demodulation thereof.
Figure 29:
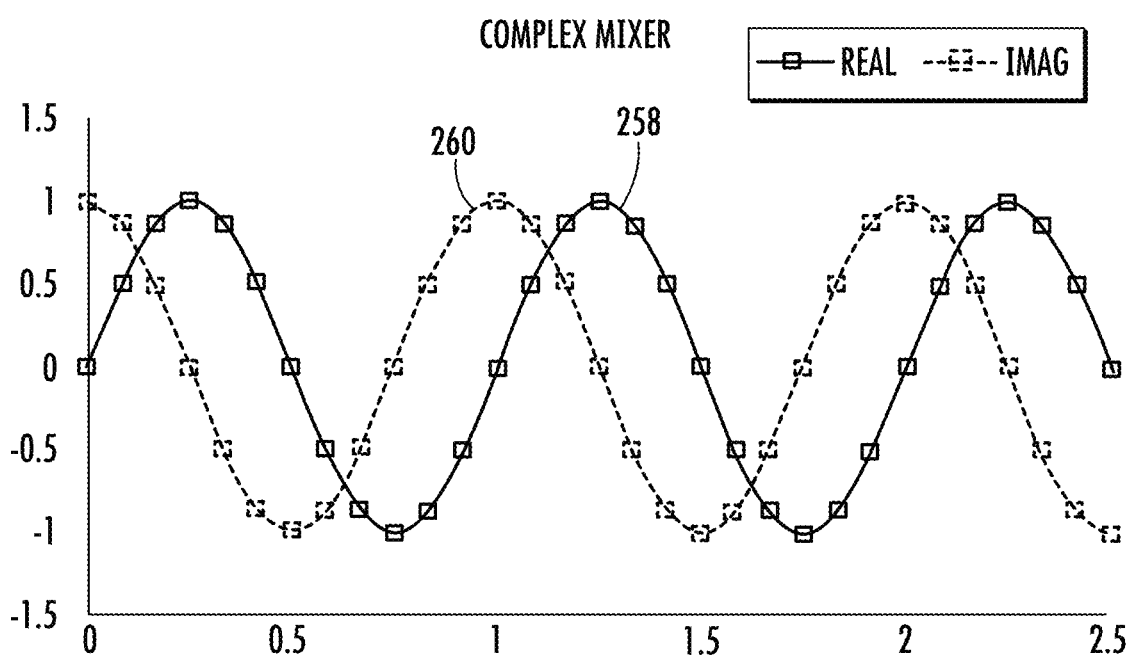
FIG. 29 is a graphical illustration of the signals for the complex mixer utilized with the input signal.
Figure 30:
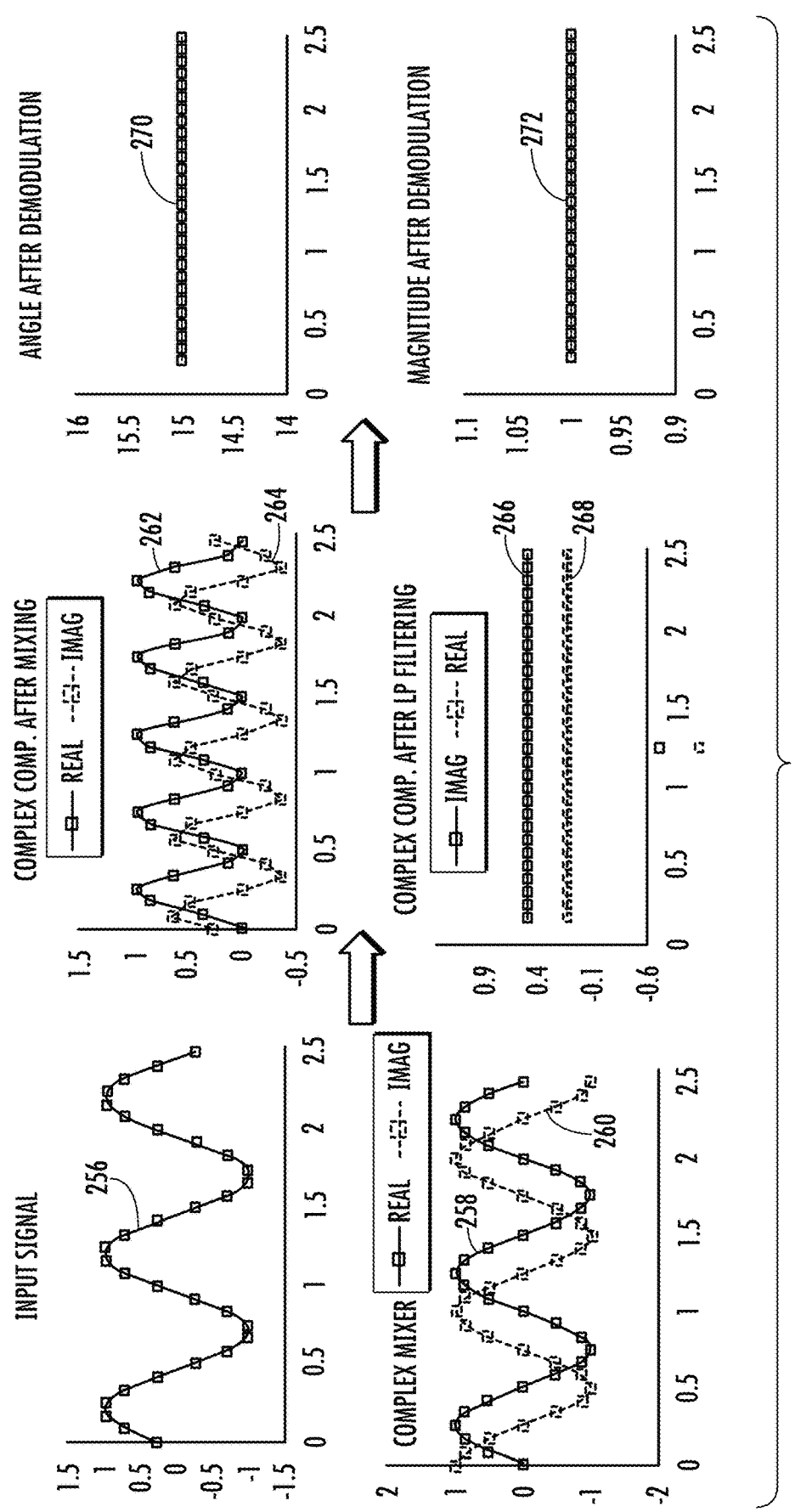
FIG. 30 is a graphical signal diagram illustrating the demodulation of the input signal of FIG. 28 using the signals for the complex mixer of FIG. 29.

To illustrate this process reference is now made to FIGS. 28 and 29 for an example of demodulation of a sinusoidal input signal. As may be seen in FIG. 28, the input signal 256 is shifted by an angle ϕ. The two sinusoids 258, 260 for the complex mixer have 0 phase shift. To perform the demodulation, as shown in FIG. 30, the input samples 256 are multiplied by those 258, 260 of the complex mixer, resulting in the complex components 262, 264 after mixing shown in the center top graph of FIG. 30. Thereafter, the low pass filtering is then applied, which results in the DC signals 266, 268 shown in the bottom center graph. Since the input is a constant sinusoidal signal 256, then after demodulation the resulting complex components must be constant too. The phase 270 and amplitude 272 of the demodulated signal is then obtained at every sample point of the demodulated signals. Phase 270 and magnitude 272 are derived from the complex components of each sample, and because the input sinusoidal 256 has constant phase shift, the phase 270 and magnitude 272 in the resulting demodulation samples are also constant.

Figure 31:
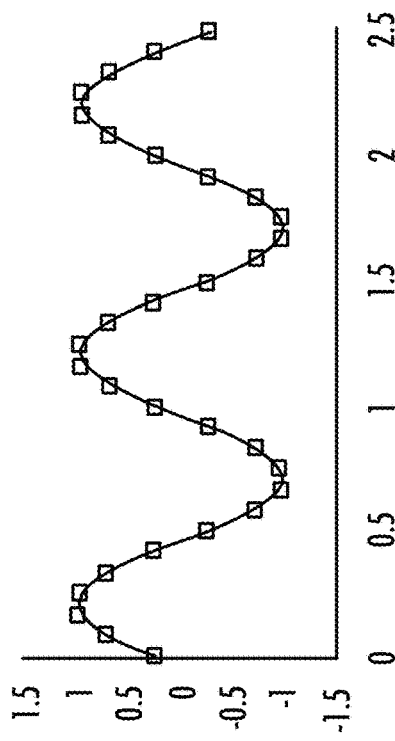
FIG. 31 is a graphical illustration showing the equivalence of demodulating of time multiplexed signals from two sensors with that of a single sensor.
Figure 31:
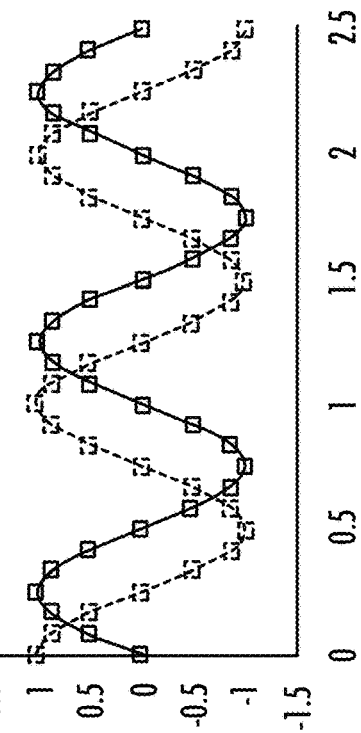
Figure 31:
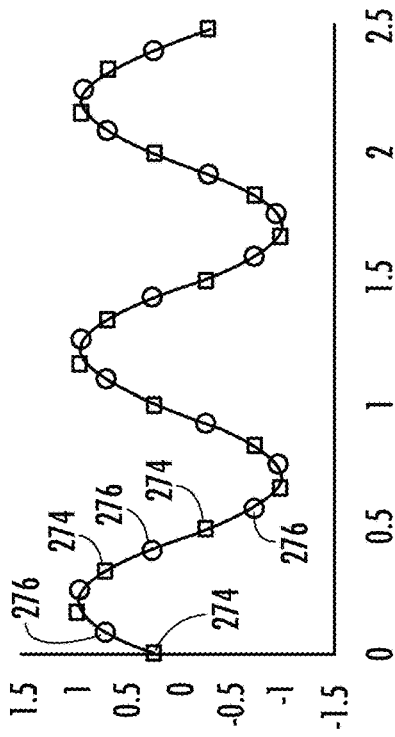
Figure 31:
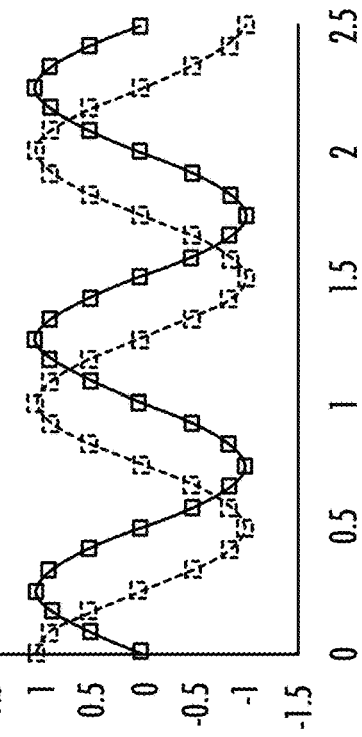

The forging assumed sampling to determine the input signal by a single sensor. However, some embodiments of the present invention utilize multiple sensors (RX array elements) that are multiplexed. To understand the effect of such multiplexed sensor inputs, the following will discuss demodulating time multiplexed signals. In this discussion it is assumed that a constant sinusoidal signal is sampled with 2 identical sensors located very close to each other. Assume that the sampling of the sensors is interleaved and at the same sampling rate ($F_{S1}=F_{S2}$). A graph of such samples 274, 276 is shown in the top left graph of FIG. 31. To demodulate this input, it may be assumed that it comes from a single sensor at twice the rate $2F_{S1}$ as shown on the equivalent graphs on the right side of this figure. With this assumption, a single complex mixer at that rate may be used. Since the mixer has 0 phase, the demodulated signal indicates phase and magnitude of the input sinusoidal at each sample. The design of the mixer accounts for the "interleaving delay' of the two sets of samples as will be discussed more fully below.

Figure 32:
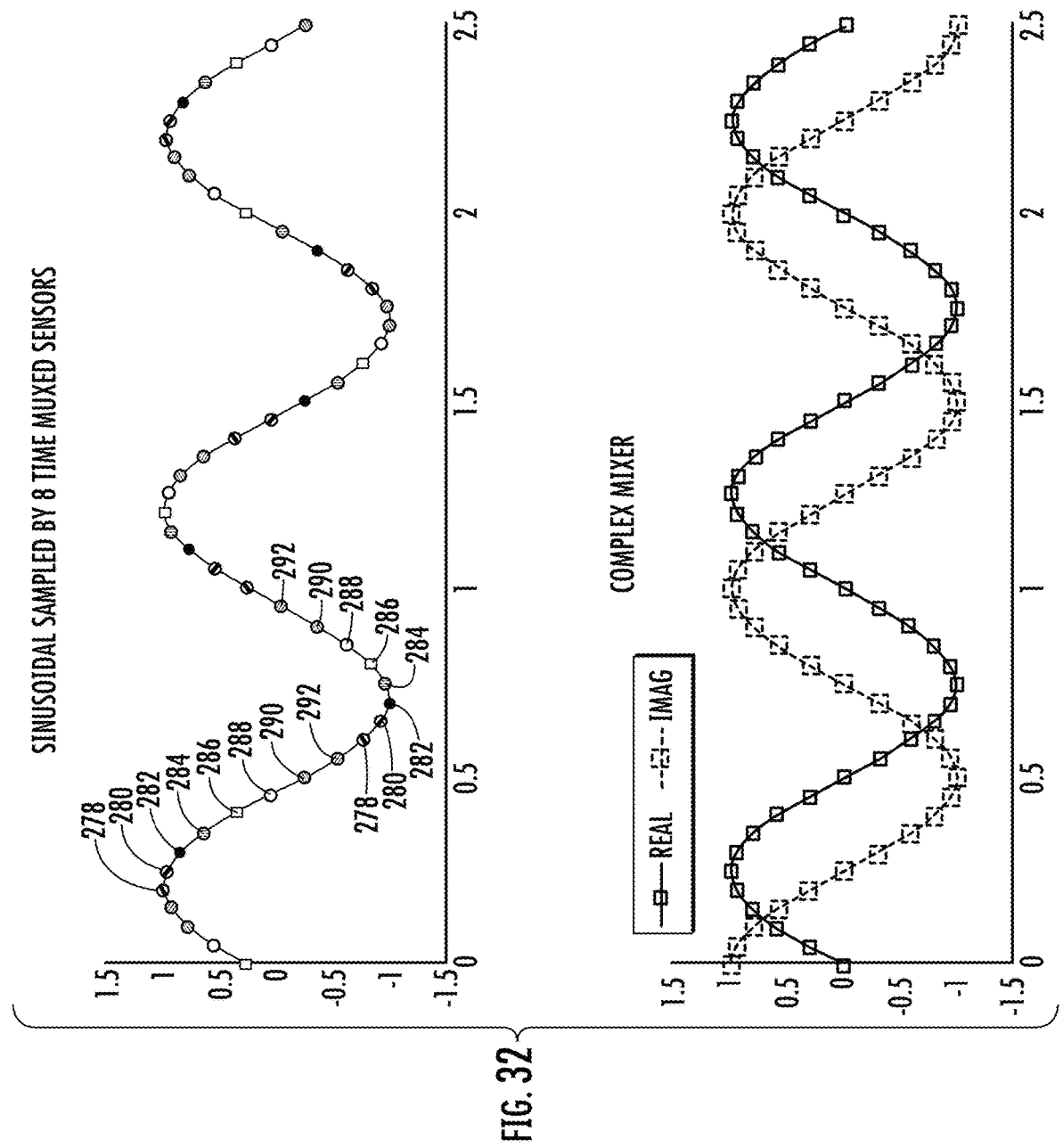
FIG. 32 is a graphical illustration of the sinusoidal input signal sampled by eight time multiplexed sensors and the signals for the complex mixing thereof.

This same methodology applies regardless of the number of sensors sampling the input signal. For example, this method can be used to demodulate a signal detected by eight sets of time multiplexed channels (eight samples 278, 280, 282, 284, 286, 288, 290, 292) as shown in FIG. 32. Of course, such application assumes certain conditions, to wit, that the input is unique and the same for all channels (sensors), that sampling is evenly interleaved and at a constant rate, that each sensor is sampled at a rate higher than the input's Nyquist limit., that the mixer has 0 phase, and the sampling rate is equal to multiplexing rate. After demodulation the phase angle and magnitude of the signal at each sample is known.

Figure 33:
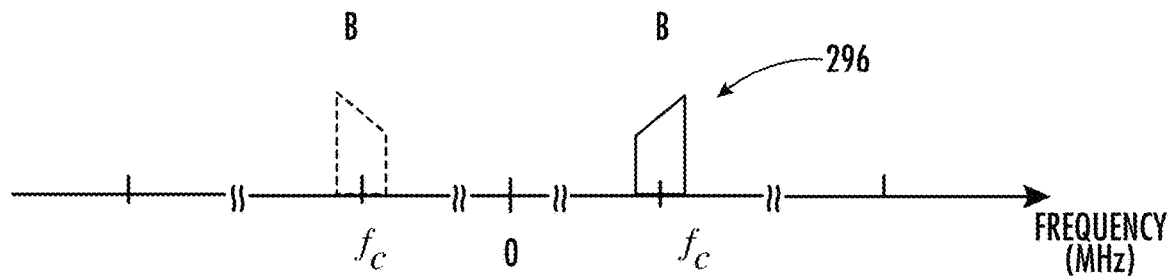
FIGS. 33-35 are signal spectrum illustrations of the received signal, the generation of high frequency images as a result of mixing, and the result of filtering to remove those high frequency images.
Figure 34:
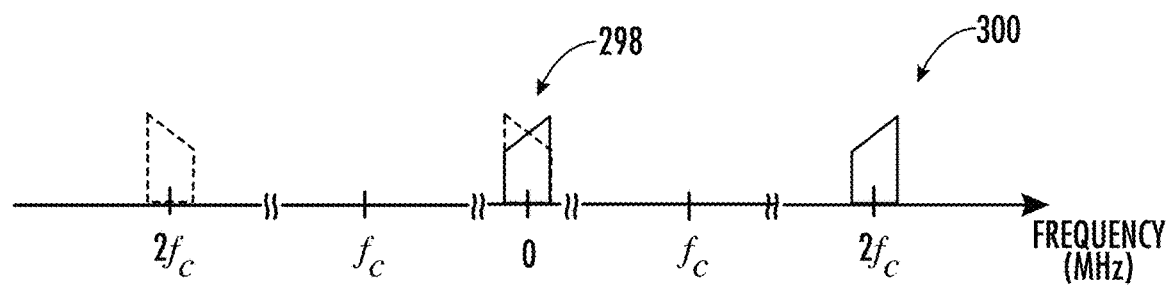
Figure 35:
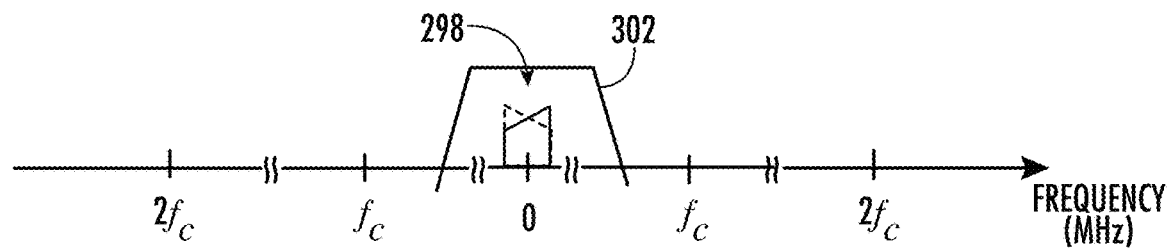

As shown in FIGS. 33, 34, and 35 (and with continuing reference to FIG. 27 showing the digital down converter (DDC) 294), the received signal spectrum 296 shown in FIG. 33 is multiplied by the sinusoidals (mixing) to shift the main band 298 to DC. The mixing produces a high frequency image 300 at $2f_c$ (this is not an alias) as shown in FIG. 34. This image 300 must be eliminated with a low pass filter 302 to yield the baseband component 298 of the signal shown in FIG. 35. Usually, $f_s$ is such that it satisfies the Nyquist criterion $f_s \gg f_c$.

Figure 36:
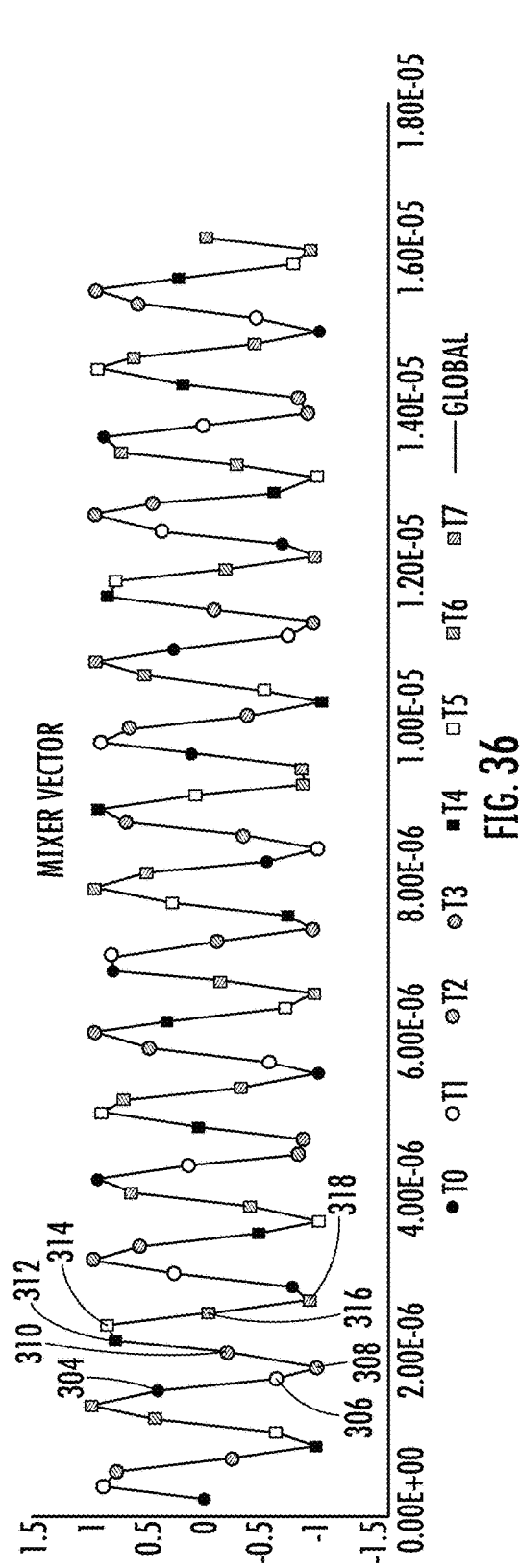
FIG. 36 is a mixer vector illustration for an embodiment of the system of the present invention having 128 RX elements in the RX array that are sampled (multiplexed) in 8 groups of 16.
Figure 37:
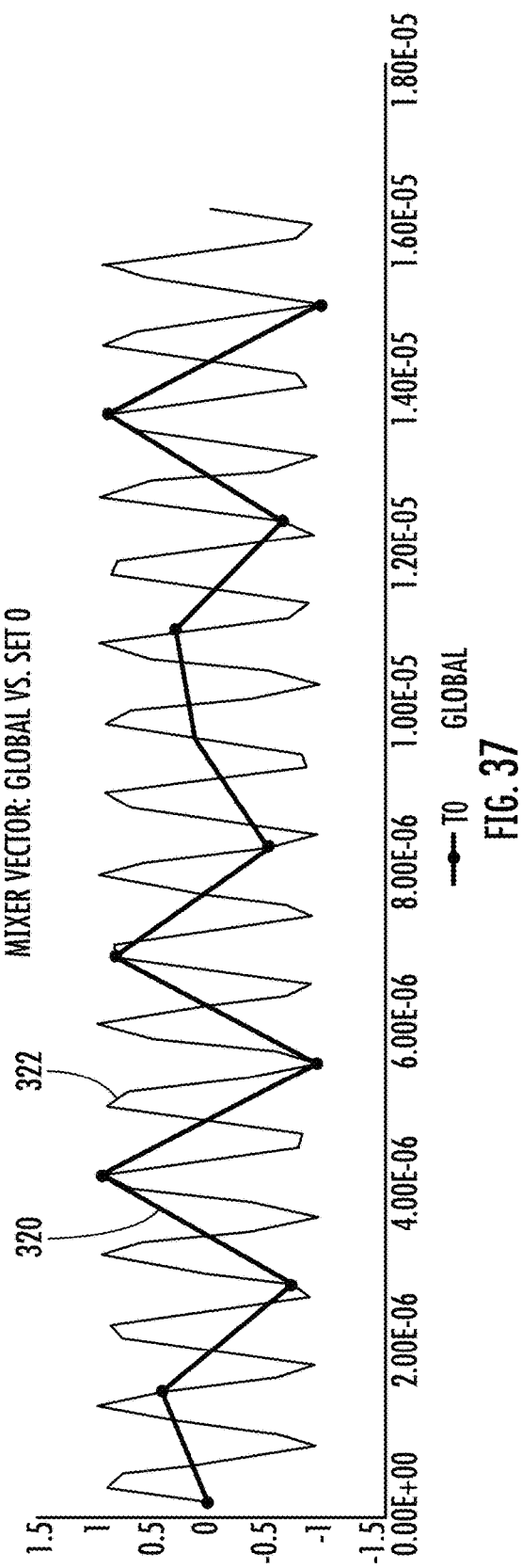
FIG. 37 is a mixer vector illustration illustrating one vector used by the mixer for the multiplexed set TO overlaid on the global mixer vector for all sets.

As mentioned briefly above, the design of the mixer accounts for the "interleaving delay' of the sets of samples. Specifically, because the reflected acoustic sonar signal is detected by the RX array whose elements are read in groups at different times in view of the multiplexing thereof in some embodiments, the mixer needs to compensate for the phase shift that has occurred in the signal during such time. In one embodiment having 128 RX elements in the RX array that are sampled (multiplexed) in 8 groups of 16, the mixer vector of each of these (designated T0-T7) 304, 306, 308, 310, 312, 314, 316, 318 is shown in FIG. 36. That is, the mixer utilizes these phase shifts to compensate for the delay introduced by multiplexing process for each set (T0-T7). FIG. 37 illustrates one such vector 320 used by the mixer for the multiplexed set T0 overlaid on the global mixer vector 322 for all sets.

The grouping of the multiplexing of the RX elements may take several forms in different embodiments. As an example, the RX elements may be read in successive groups of 16 starting from one end of the RX array to the other, such as [0, 1, 2 . . . 13, 14, 15], [16, 17, 18 . . . 29, 30, 31], etc. Other embodiments may read serial groups from each end to the middle or from the middle to both ends. In other embodiments, the RX elements are read in groups of interleaved individual RX elements, e.g. [0, 16 . . . 112] or groups of interleaved grouped RX elements. Other groupings of individual RX elements are used in other embodiments, including different grouping sizes for different size multiplexers.

Figure 38:
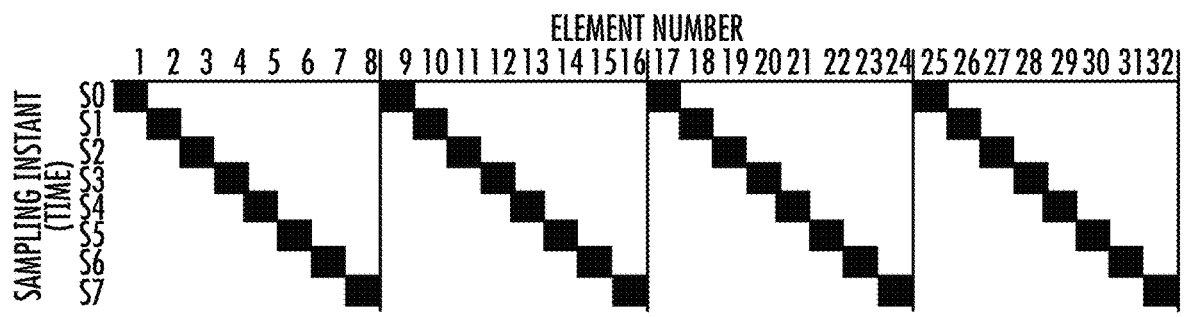
FIG. 38 is a sampling timing by RX element illustration showing the grouping of the multiplexing of the RX elements in one embodiment of the present invention.

The selection and ordering of the multiplexed signals from the RX elements is important in preventing certain distortions that may otherwise appear on the sonar display and would need to be filtered out or otherwise dealt with in order to provide a display that accurately only shows only the desired target returns. Indeed, as shown in the polar plot of the spatial spectrum plot of FIG. 39 when the sampling set is selected to be in successive order, which includes 16 elements spaced by every $8^{th}$ element for consecutive time slots as shown in FIG. 38, and its associated sonar display in FIG. 40, the peaks 324 in the beam pattern of the multiplexed sampling match the "spokes" 326 in the sonar image.

Figure 40:
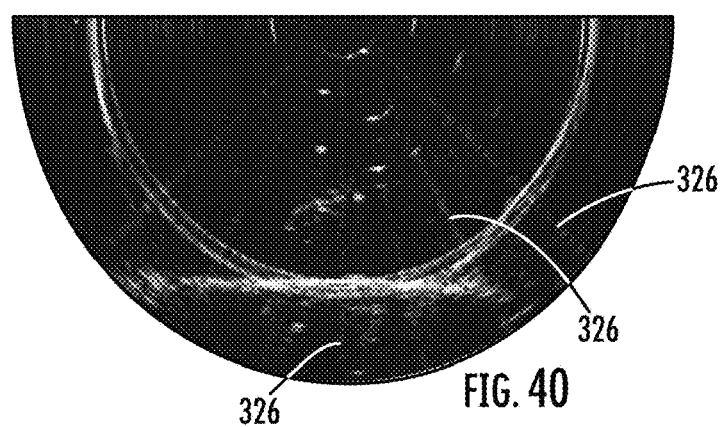
FIG. 40 is an exemplary sonar display associated with the polar plot of FIG. 39.

Ideally, in the absence of noise, it would be possible to perfectly reconstruct the signal using the multiplexed samples in successive order for consecutive time slots without the spokes 326. However, due to noise, each set of multiplexed samples contain elements that cannot be cancelled. If the multiplexing pattern is repetitive, that is if the pattern includes a time sliced portion of each of the RX element's received signals in successive order for consecutive time slots as shown in FIG. 38 (to be discussed more fully below), the noise will show up as "spokes" 326 according to the beam pattern of the set of sampled elements as shown in FIG. 40.

To better understand this issue, it is instructive to note that, in order to sample 128 input signals with a 16-channel AFE, a multiplexing system using sixteen 8:1 multiplexers is required. The configuration of these multiplexers and the channel switching sequence implemented can affect the quality of the multibeam image as just demonstrated. The multiplexers used in one embodiment are controlled with a three-bit binary channel select that selects the output channel based on Table 1. In this table, 'A' is the most significant bit (MSB), and 'C' is the least significant bit (LSB).

TABLE 1

| Select Lines | | | Output Channel |
|---|---|---|---|
| A | B | C | Selected |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

In order to sample all of the input elements, the multiplexer must cycle through all eight channels, sampling each input at a separate instant in time. With sixteen multiplexers, each sampling instant captures sixteen inputs, and over the course of the multiplexing cycle, all 128 input elements are sampled. If the multiplexer channels are selected in successive order (0-7) as introduced above, the timing will look like that shown in FIG. 38 for the first 32 elements or four multiplexers. At each sampling instant (S0-S7), one input per multiplexer is selected. The timing pattern is the same for every multiplexer, and the elements sampled at a given instant are spaced evenly at every eight elements. This even spacing and repetitive pattern of the multiplexing pattern that includes a time sliced portion of each of the RX element's received signals in successive order for consecutive time slots combined with the inherent sampling noise results in artifacts (spokes 326) showing up in the image of FIG. 40.

Figure 39:
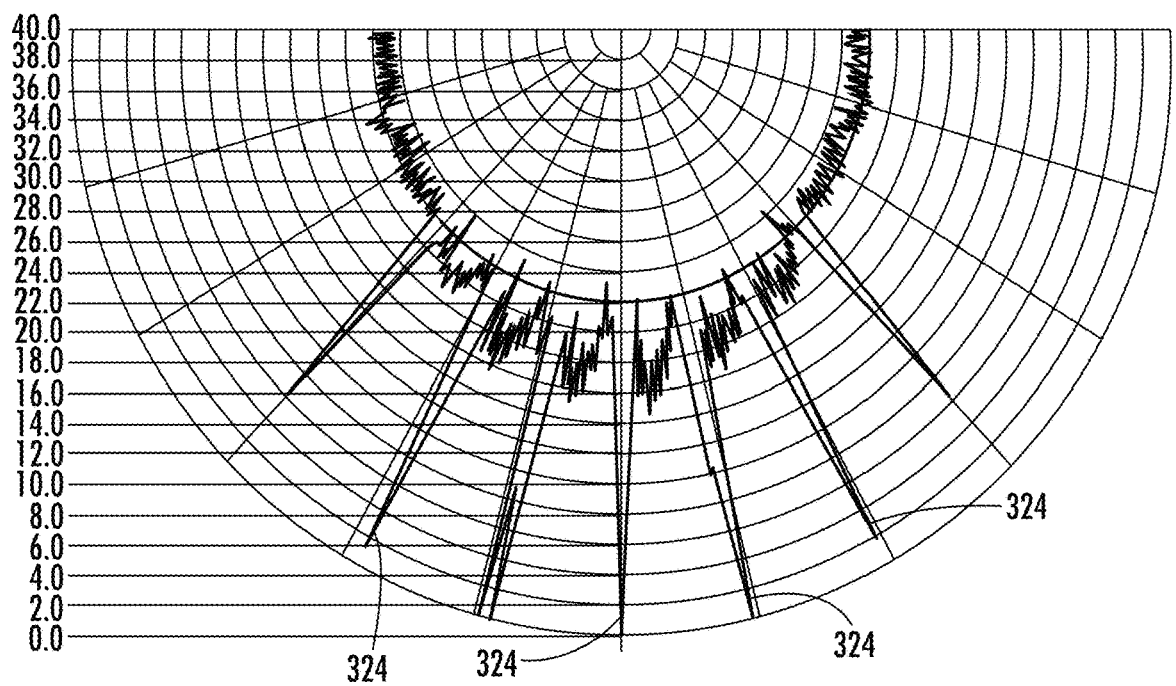
FIG. 39 is a polar plot of the spatial spectrum plot when the sampling set is selected to be in successive order, which includes 16 elements spaced by every $8^{th}$ element for consecutive time slots.
Figure 41:
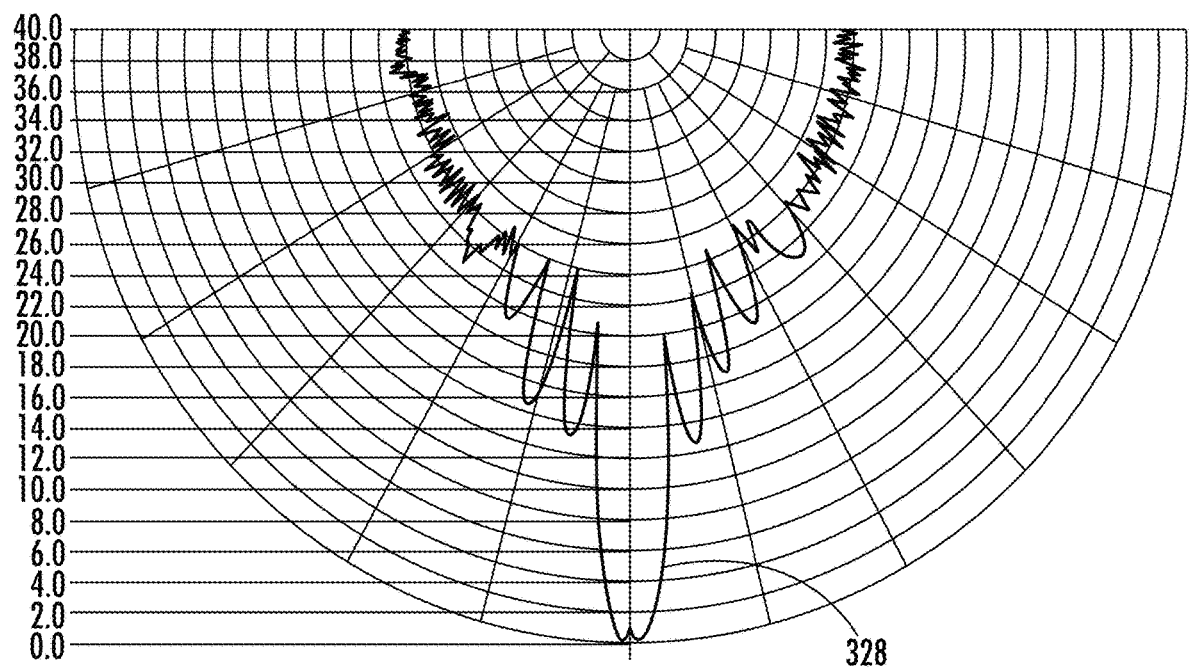
FIG. 41 is a special spectrum plot of the spatial spectrum when the sampling set includes 16 contiguous RX elements in successive order for consecutive time slots.
Figure 42:
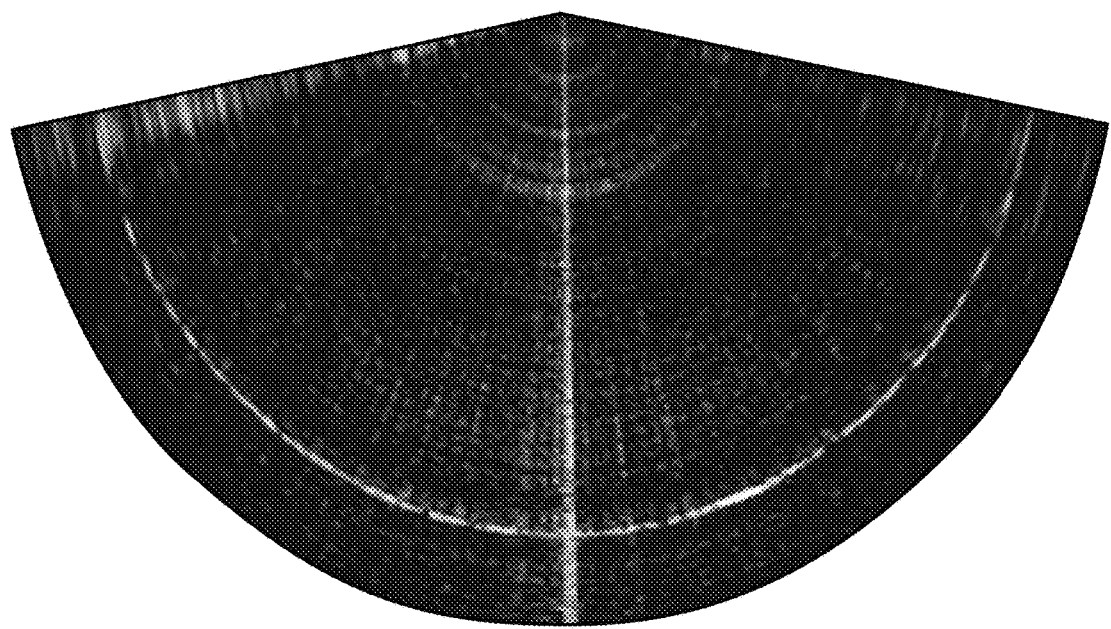
FIG. 42 is an exemplary sonar display associated with the polar plot of FIG. 41.

Similarly, the spatial spectrum when the sampling set includes 16 contiguous RX elements in successive order for consecutive time slots, as shown in the spatial spectrum plot of FIG. 41, merges the seven obvious "spokes" 324 from FIG. 39 into a single noise spoke 328 that is much wider. This multiplexing pattern results in the sonar image shown in FIG. 42.

While the filtering of such multiplexing noise is possible, the computational resources, cost, and complexity would be prohibitive, particularly when it is realized that manipulation and judicious selection of the element sampling sequencing can effectively eliminate the perception of any such noise spoke on the sonar display. Indeed, by pseudo-randomizing the multiplexing pattern, i.e., sampling the RX elements in pseudo-random order for consecutive time slots, the perceptible display of the noise spokes is minimized.

Figure 43:
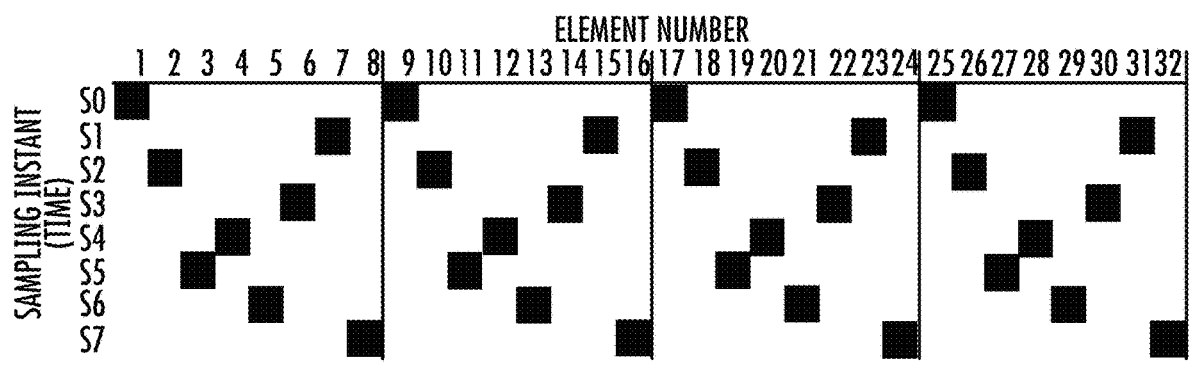
FIGS. 43-47 are multiplexer connection order timing diagrams used in various embodiments of the present invention.

That is, for these multiplexers any channel order can be chosen. For example, if the channels in a multiplexer are sampled in the order [0 6 1 5 3 2 4 7] instead of 0-7, the timing will look like FIG. 43. In this case, the elements are not sampled in successive order, but they still have a periodic pattern across the multiplexers with eight-element spacing between elements sampled at a given instant. Every multiplexer is being driven by the same channel-select lines, so the order of the outputs is the same for each multiplexer. Because of this, the noise spokes will be visible for any multiplexer switching order.

In one embodiment of the present invention, to eliminate this periodicity in the data across multiplexers the channel-select lines are independently controlled for each multiplexer. However, this adds complexity to the FPGA design and the PCB layout. Some amount of pseudo-randomness can be achieved without adding extra lines by connecting the existing channel-select lines in a different order for different multiplexers. The binary select lines would still cycle through the channels 0-7, but the order for that multiplexer would be different. Table 2 lists the possible combinations where 'A', 'B', and 'C' represent the channel select lines in the given connection order.

TABLE 2

| Select Lines | | | Multiplexer Connection Order | | | | | |
|---|---|---|---|---|---|---|---|---|
| A | B | C | ABC | ACB | BAC | BCA | CAB | CBA |
| 0 | 0 | 0 | 0 | 0 | 0 | 0 | 0 | 0 |
| 0 | 0 | 1 | 1 | 2 | 1 | 2 | 4 | 4 |
| 0 | 1 | 0 | 2 | 1 | 4 | 4 | 1 | 2 |
| 0 | 1 | 1 | 3 | 3 | 5 | 6 | 5 | 6 |
| 1 | 0 | 0 | 4 | 4 | 2 | 1 | 2 | 1 |
| 1 | 0 | 1 | 5 | 6 | 3 | 3 | 6 | 5 |
| 1 | 1 | 0 | 6 | 5 | 6 | 5 | 3 | 3 |
| 1 | 1 | 1 | 7 | 7 | 7 | 7 | 7 | 7 |

Figure 44:
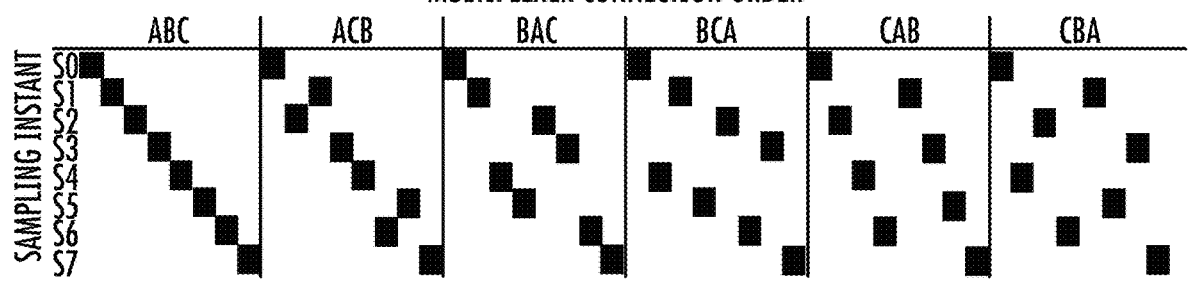

Using just the three lines, there are a total of six possible channel-select orders that can be used to break up the patterns in the multiplexer outputs, including the consecutive output described above. The timing diagrams for those options are shown in FIG. 44. However, even with these extra options, there will still be several patterns repeated across the elements, and there may not be enough variation to remove the noise spokes and artifacts. In addition, channels 0 and 7 are still sampled at the same instances across all multiplexers (S0 and S7 respectively), creating the familiar 8 element spacing between the sampled elements at those times.

Figure 45:
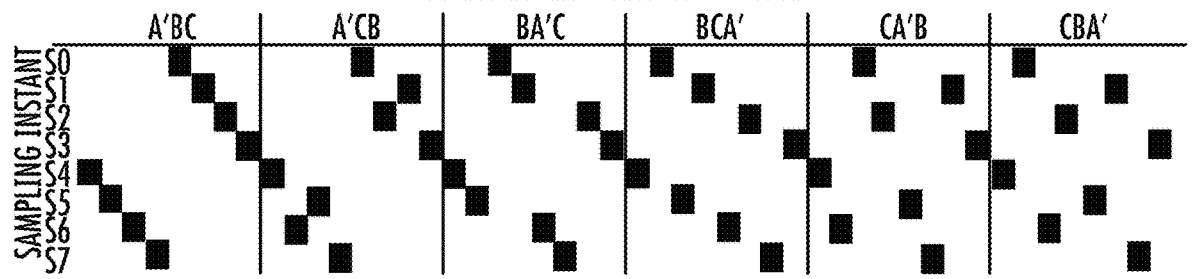

If more variation is desired, in other embodiments additional multiplexing patterns can be created by inverting one or more of the signals. For example, by inverting the 'A' channel-select signal and using the inverted signal in place of the A signal for some of the multiplexers, six more patterns can be obtained. Those patterns are shown in FIG. 45, where the inverted signal is represented by A'. In this case, the outputs of the multiplexer still cycle through all eight inputs during the multiplexing period, but the patterns are different from the six described above. Channels 0 and 7 are still sampled at the same times across all six options here, but they are not the same instances as in the six original options. If all twelve options are combined, some spacing variation can be added to those channels.

Using one inverted signal creates 12 total unique timing patterns from which to choose. Adding a second inverted line doubles that to 24 unique patterns, and a third inverted line results in 48 unique patterns that can be applied to the 16 multiplexers. Using various combinations of these patterns, there will be multiple options to keep the spacing between elements sampled at a given instant pseudo-random.

Figure 46:
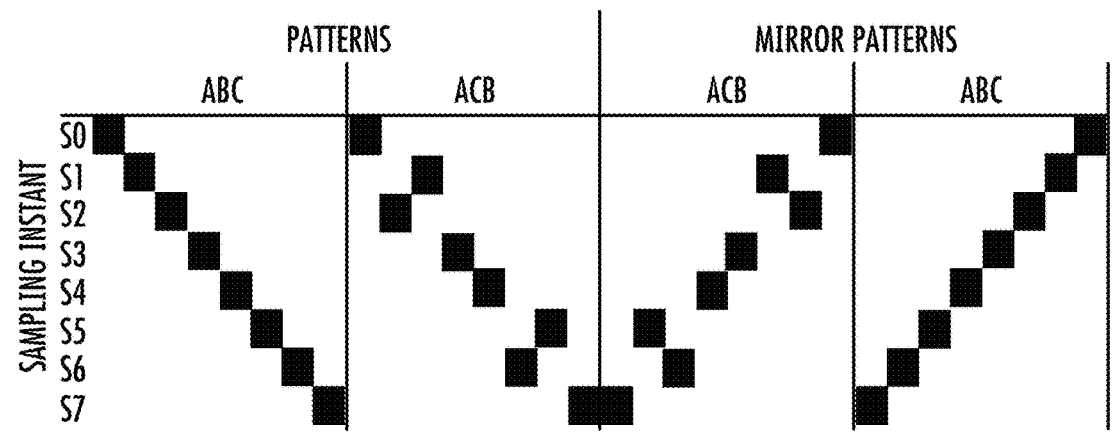

With this technique in this embodiment, a minimum of two inverted signals are required to get 16 unique timing patterns. However, similar results can be obtained with a single inverter if the timing pattern from the first half of the array is mirrored onto the second half. As shown in Table 3 below, this means that if the first eight multiplexers have the unique switching patterns A-H, the final eight multiplexers should have the patterns H'-A', where H' is the mirror of the pattern H. Two timing patterns and their mirrors are shown in FIG. 46 to demonstrate the concept. In another embodiment a similar result is obtained by randomizing the order of the transducer signals going into the multiplexer.

TABLE 3

| Multiplexer | Switching Pattern |
|---|---|
| MUX0 | A |
| MUX1 | B |
| MUX2 | C |
| MUX3 | D |
| MUX4 | E |
| MUX5 | F |
| MUX6 | G |
| MUX7 | H |
| MUX8 | H' |
| MUX9 | G' |
| MUX10 | F' |
| MUX11 | E' |
| MUX12 | D' |
| MUX13 | C' |
| MUX14 | B' |
| MUX15 | A' |

In an alternant embodiment, variation in the multiplexing output can also be added by changing the order that the transducer signals are connected to the multiplexer inputs. Randomizing the order of the transducer signals into the multiplexers mentioned above does create a truly random output, but it also complicates the routing of the signals on the PCB. There are simpler changes that can add variation without overly complicating the PCB layout. Specifically, in this embodiment the input lines of some of the multiplexers are connected in reverse order, which effectively doubles the number of unique multiplexing patterns without additional inverters or channel-select lines. An example of this is shown in Table 4 below.

TABLE 4

| Select Lines | | | Selected Line Normal Order | Selected Line Reverse Order |
|---|---|---|---|---|
| A | B | C | | |
| 0 | 0 | 0 | 0 | 7 |
| 0 | 0 | 1 | 1 | 6 |
| 0 | 1 | 0 | 2 | 5 |
| 0 | 1 | 1 | 3 | 4 |
| 1 | 0 | 0 | 4 | 3 |
| 1 | 0 | 1 | 5 | 2 |
| 1 | 1 | 0 | 6 | 1 |
| 1 | 1 | 1 | 7 | 0 |

These individual switching techniques in each of the preceding embodiments will reduce the overall number of noise spokes and artifacts in the image, but they do not eliminate the noise in the system that caused those spokes.

Instead of forming distinct lines/spokes, the noise will be spread throughout the image, slightly raising the noise floor of the data. In addition, a single noise spoke at 0° (the center of the image) will still be present. This is a result of common mode noise across all the channels, not the multiplexing scheme. Because of these effects, filtering and noise reduction in the front end are necessary even with these improvements. Despite this tradeoff, the spokes are the most noticeable points of noise in the image and minimizing them is an important step to getting a clean and uniform image.

In a further embodiment, and recognizing that the strategies employed in the above embodiments should help reduce the noise spokes and artifacts in the image, they may not be able to completely remove the problems. However, combining multiple strategies can help visibly to reduce some of the spokes in the image. For example, in one embodiment the multiplexer channel-select lines are connected differently to individual multiplexers as described above. Then, the order in which the select-lines are switched by the FPGA is also changed.

While the connections to the multiplexers are fixed in hardware, in one embodiment the digital switching order can be changed as needed, even during a receive session. If the switching order is changed between every multiplexer cycle, the timing pattern will be different each time as well. If the spokes are in different places on the screen for different patterns, changing these patterns each time will prevent those lines from appearing in the image at a consistent angle. Instead, the effect of the spokes will be spread around the image and appear as noise in the image. While this would not eliminate the effect of the spokes, it would greatly reduce the appearance of lines on the screen.

Figure 47:
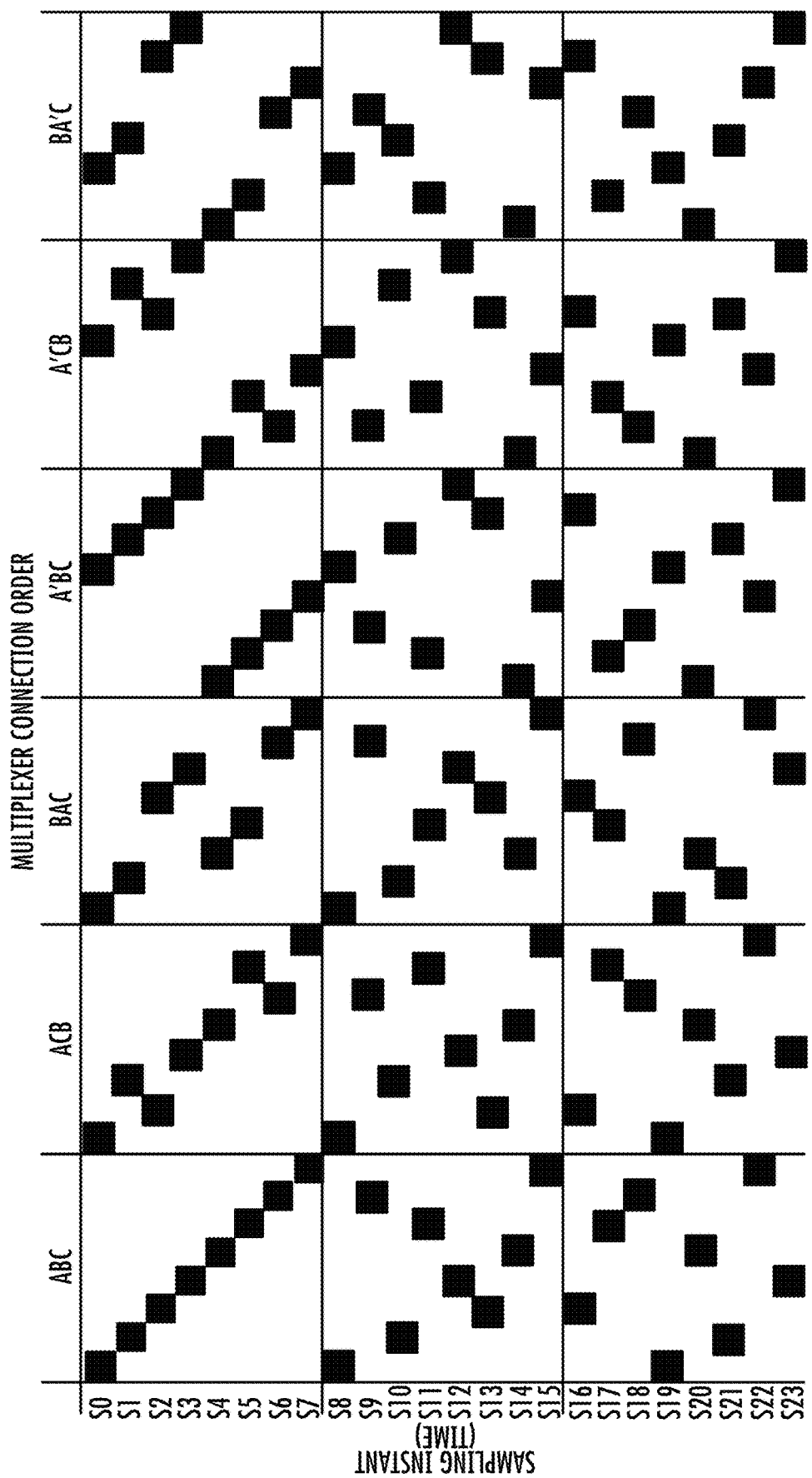
Figure 54:
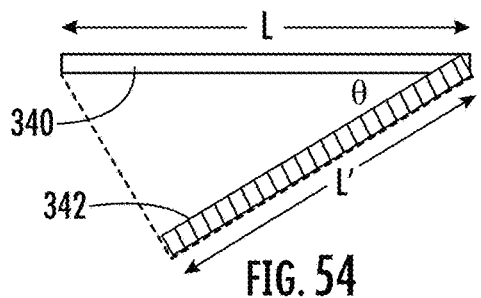
FIG. 54 is a graphical representation of the virtual rotation or a RX array element during beamforming.
Figure 55:
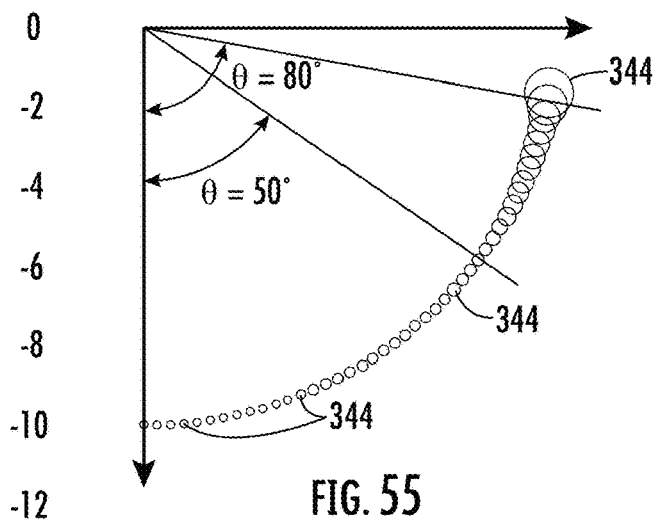
FIGS. 55 and 56 are graphical illustrations of the beamwidth versus angle for an embodiment of the present invention utilizing 96 RX elements having a beam spacing of ~1.9°.
Figure 56:
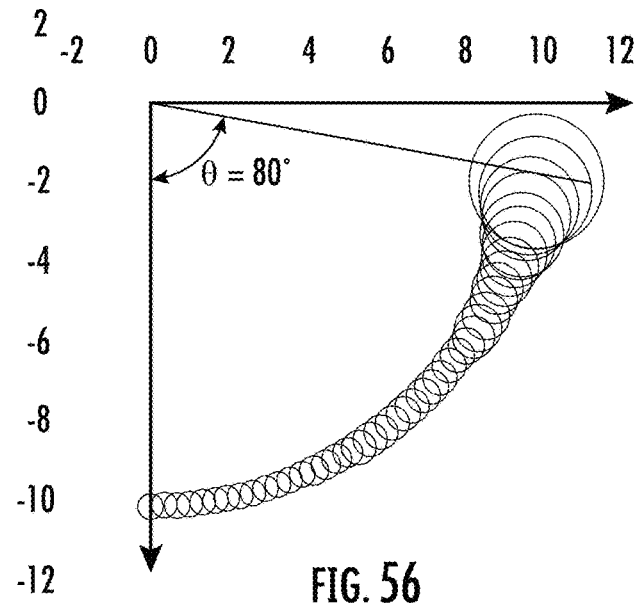

FIG. 47 shows how different switching orders can be combined with different multiplexer connections to get several unique timing patterns. There are three switching orders and six multiplexer connection options shown. The combination of the two strategies results in several pseudo-random timing patterns that can be implemented as needed to reduce the visibility of spokes in the image.

The embodiments discussed above are all viable ways to change the multiplexer output order and remove the noise spokes from the image. In a preferred embodiment, two additional multiplexer channel-select lines are used to assign every multiplexer a unique connection order. Instead of using a separate inverter chip as in one embodiment, the lines are routed from and controlled by the FPGA. The transducer input lines to alternating multiplexers are also reversed in a preferred embodiment to increase variation in the multiplexer output order. This method ensures a pseudo-random multiplexing order that minimizes the noise spokes in the image. It also provides the best performance without overly complicating the layout.

Having now discussed the various embodiments, attention is now returned to the mixing implemented in certain embodiments of the present invention. In one embodiment the mixer is implemented as a circular table in the FPGA to reduce computation complexity required if the mixer vectors for each multiplexed set were calculated each time. After mixing, the complex data of the 128 RX elements carry the phase and amplitude data of the wave fronts at the RX transducer array. As should now be apparent, the mixer effective frequency is $8*f_{c\_virt}$, where 8 is the multiplexer factor and $f_{c\_virt}$ is the transducer virtual frequency after undersampling.

Of course, the reflected acoustic signal is typically not received by only one of the RX elements of the RX array, and so understanding how this reflected acoustic wave front is seen by the RX array is important. For phased arrays of various embodiments of the present invention it is useful to consider a frequency to direction analogy as will be discussed relative to FIG. 48 showing the high/low pressure convention 330 relative to the frequency 332, and the graphs of FIGS. 49-53 showing receipt of reflected waves 334 from various directions and the corresponding pressure level pattern 336 for each element of the RX array 338.

In a transducer RX array 338, elements are all sampled at single instant t (actually or virtually if multiplexed and compensated as discussed above). The pressure level at each element at that instant in time depends on the direction of the wavefront 334, and the pressure pattern 336 in the array 338 is analogous to frequency in time domain sample arrays. The phase between the elements eliminates ambiguity and spacing the elements by $\lambda/2$ is analogous to the Nyquist limit in time domain sampling. The number of cycles in the pressure pattern's "frequency" is proportional to the beam width (or resolution as discussed below) in that direction. Because the "spatial frequency" is analogous to direction as shown in the various examples of FIGS. 49-53 with the wavefronts 334 approaching from different directions and the corresponding pressure level patterns 336 show to the right, application of a fast Fourier transform (FFT) or a finite impulse response (FIR) bank on the array data (spatial samples) can determine the directions of the beams received at any sampling instant, also known as beamforming or spatial filtering.

Figure 57:
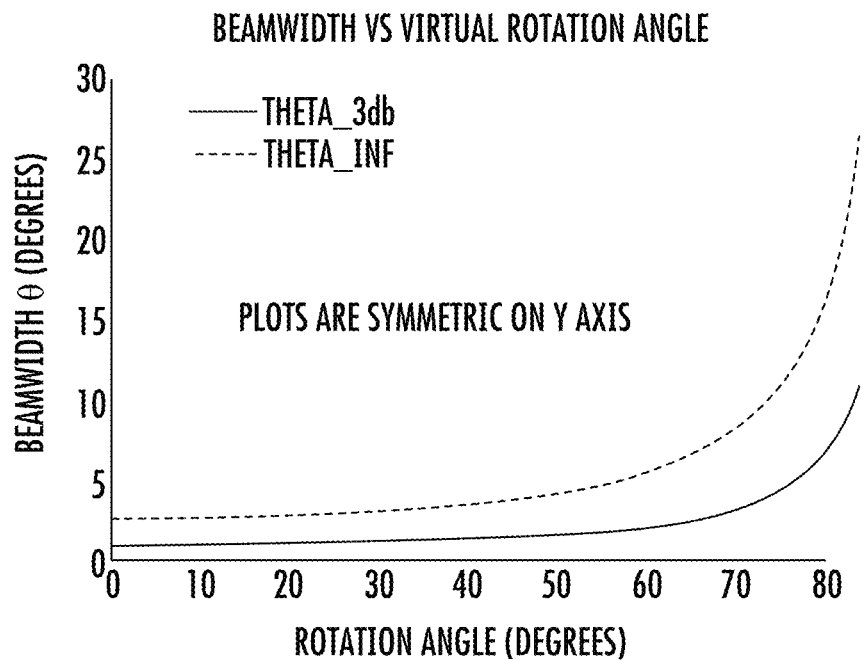
FIGS. 57 and 58 are graphical illustrations of plots of beamwidth versus virtual angle rotation.
Figure 58:
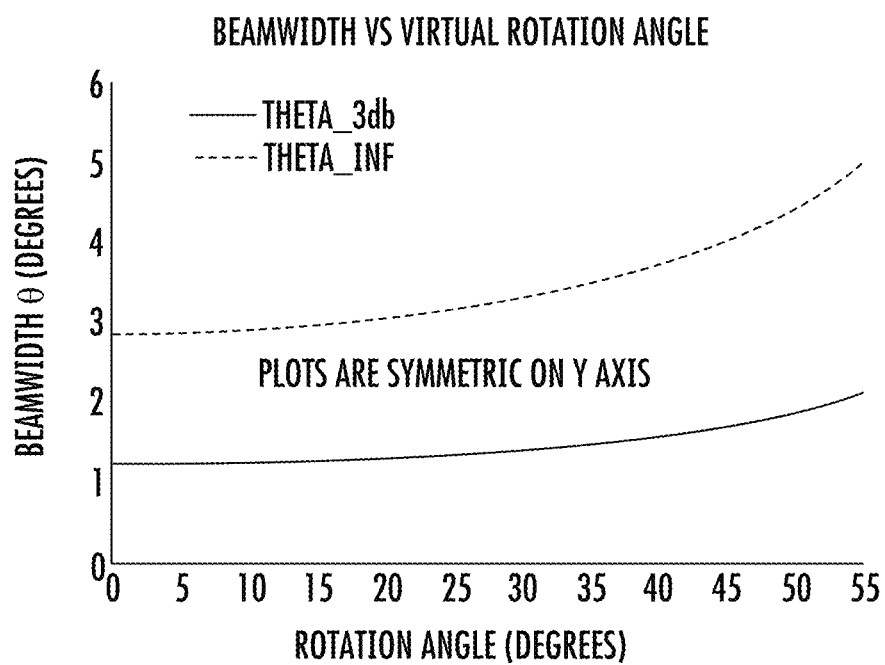

The beam resolution after beamforming may be understood with reference to FIGS. 54, 55, 56, 57, and 58. During beamforming data samples of the array elements are phased (time realigned) to virtually rotate the array 340 by θ shown in FIG. 54. This effectively reduces the length 342 of the array from L to L' and increases the beamwidth. As may be seen from FIGS. 55 and 56, from 0° to 45° the beamwidth 344 degradation is not significant. Indeed, using an array 340 of 96 elements (beam spacing of ~1.9°) in accordance with one embodiment, then it is possible to "phase rotate" the array 340 up to 50° without major beam overlapping (at −3 db) (with $\lambda\_1.05$ MHz=1.43 mm and L≈70 mm, then N=L 2/λ or nearly 50°) as shown in FIGS. 57 and 58.

Figure 59:
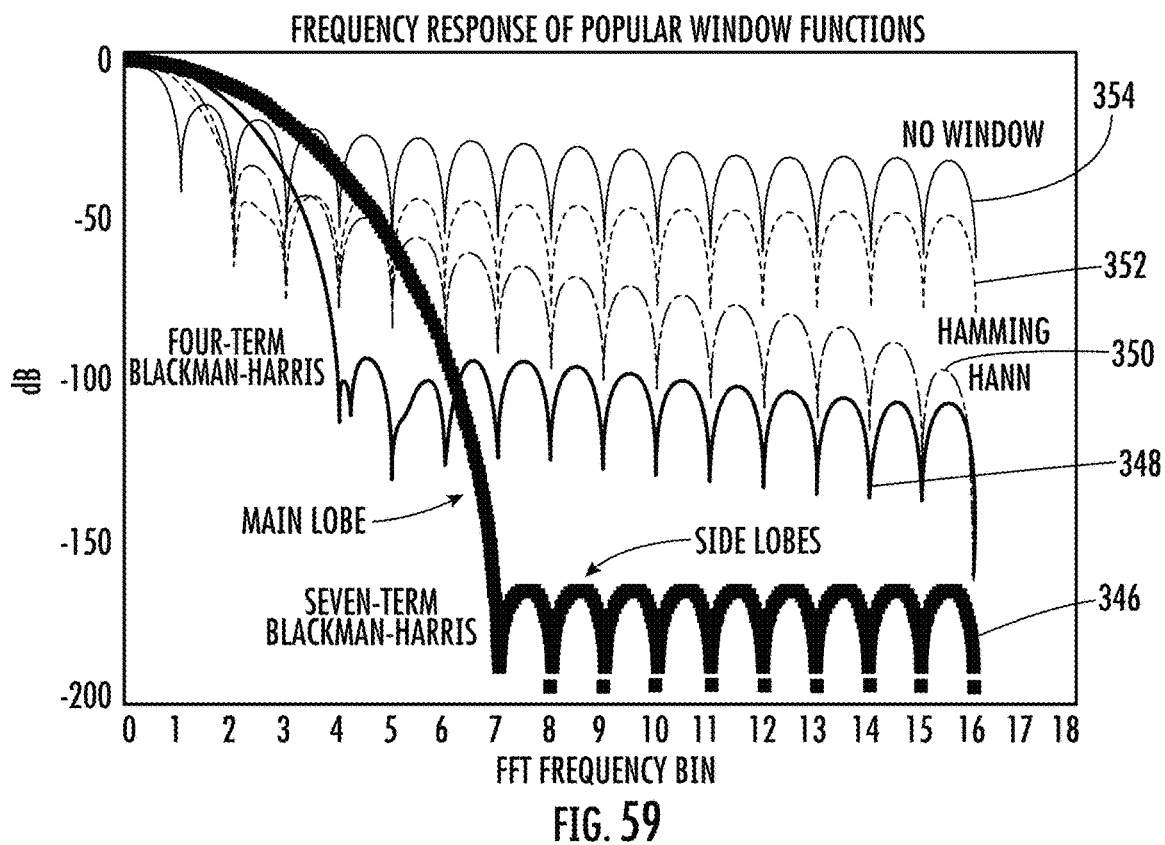
FIG. 59 is a graphical illustration of the frequency response of various finite impulse response (FIR) window functions.
Figure 60:
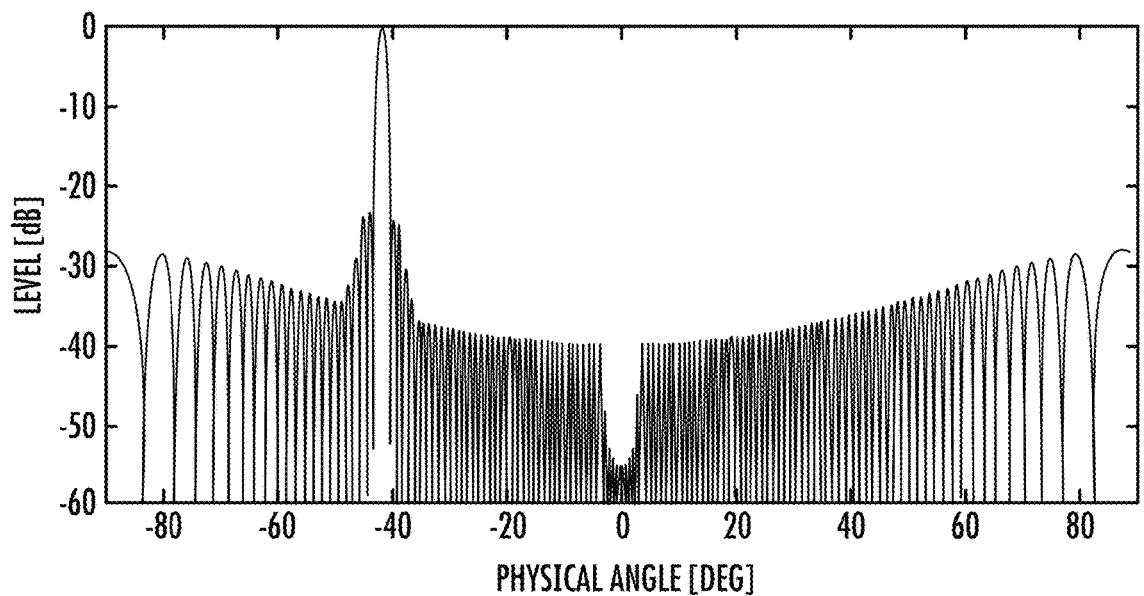
FIG. 60 is a graphical illustration of the FIR frequency response.

With an understanding now of beamforming in certain embodiments of the present invention, comparison will now be made to FFT with reference to FIG. 59 (which shows examples of FIR windows 346, 348, 350, 352, 354 to show the tradeoff between direction resolution and sidelobe height) and FIG. 60, which shows an example of the FIR frequency response. It is well known that direct FFT is economical to implement, however, FFT also produces the highest sidelobes of all time-to-frequency (or space-to-direction) transformations despite the fact that it has very good resolution. To compensate for this, finite impulse response (FIR) spatial filters with different windowing 346, 348, 350, 352, 354 are used to trade direction resolution by sidelobe height. In general, windowed FIRs have better control with to eliminate artifacts and ghosts that could otherwise be displayed due to such sidelobes.

Figure 61:
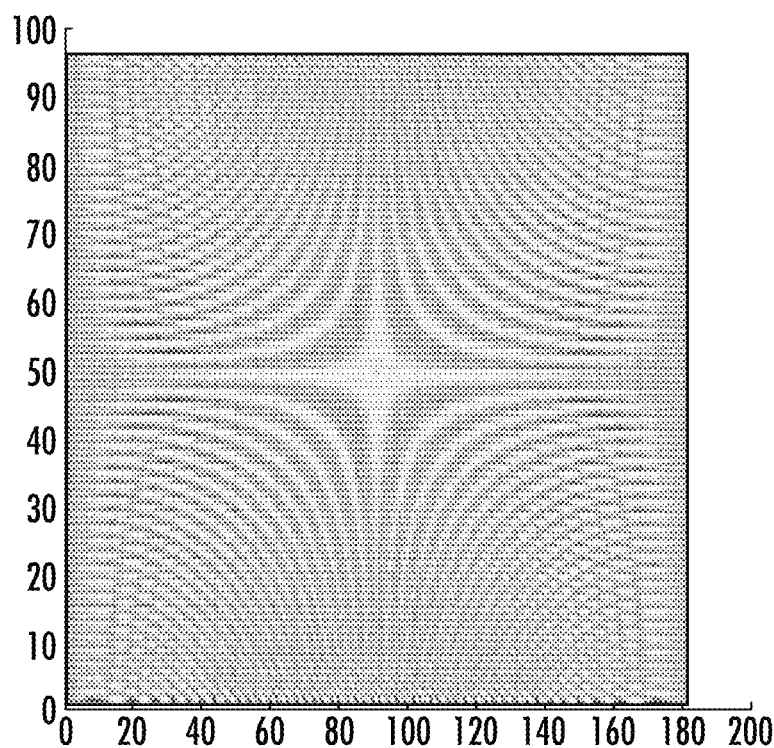
FIGS. 61 and 62 are graphical illustrations of the real and imaginary beamformer matrix of 128 elements allowing the beamformer of one embodiment of the present invention to discriminate 128 direction beams.
Figure 62:
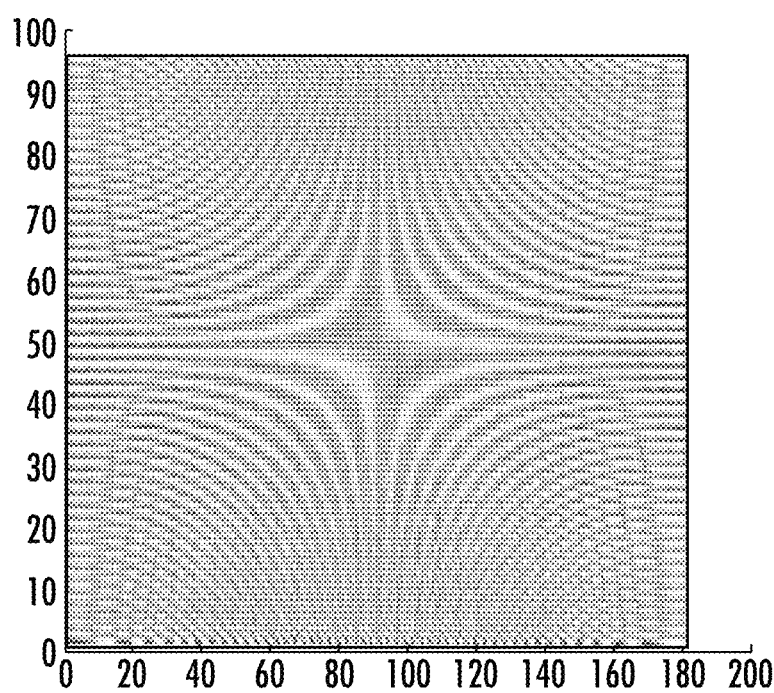

With the FFT issues in mind, one embodiment utilizes a beamformer matrix which is an array E of 128 elements that allows the beamformer to discriminate 128 direction beams (although it could discriminate more in embodiments with overlapping). Each direction to be discriminated requires a complex FIR of 128 elements. This produces a beamforming matrix M of 128×128 elements. Y(k) is the directivity pattern for that instant at each sampling instant k such that Y(k)=E(k)*M. As may be seen from FIGS. 61 (real) and 62 (imaginary), the complex matrix is symmetric which provides computational savings.

Figure 63:
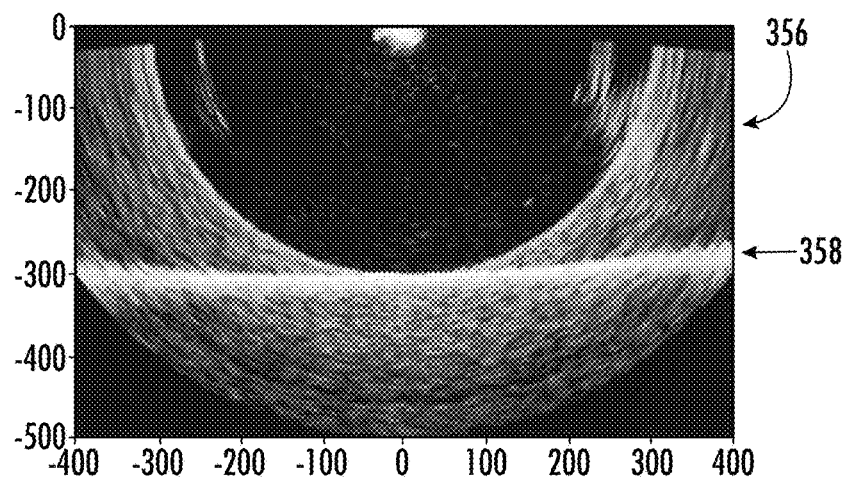
FIG. 63 illustrates a polar display of the control head of FIG. 1, where energy from the strong bottom returns has leaked into other beams, resulting in noise displayed as radial rings on the display.

This beamforming is a filter that is used to transform the multi-channel time sampled array data into spatial data, creating spatially targeted beams of data. The beamformer is designed to balance the beam width of the main beam versus the shape and level of side lobes. Because there will always be a non-zero side lobe level, energy from an actual target will leak into other beams. Those side lobes will appear as noise 356 in the display, such as shown in FIG. 63. This FIG. 63 shows a polar display, where energy from the strong bottom returns 358 has leaked into other beams. The result is noise 356 displayed as radial rings on the display.

Figure 64:
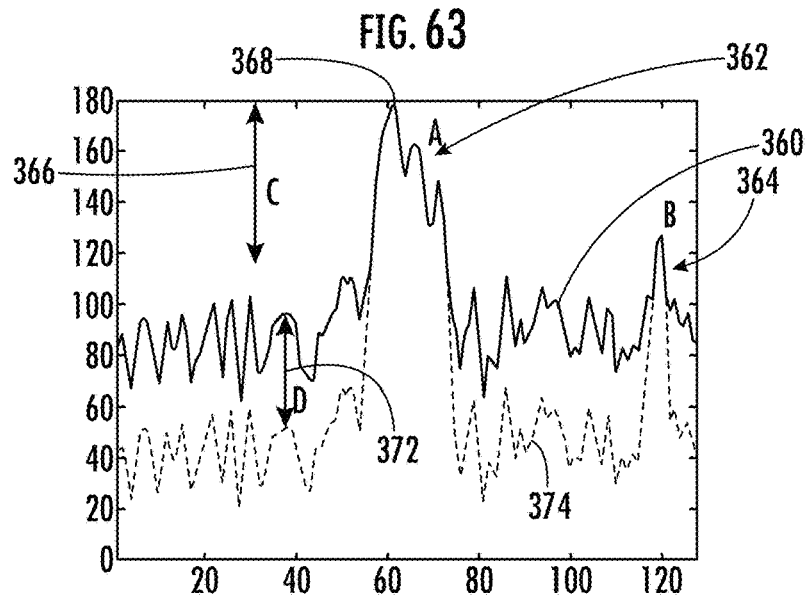
FIG. 64 is a beamforming filtering signal process diagram showing the beamformed data for a range sample from the bottom return and a target before and after beamforming.

To reduce the presence of these radial rings 356 on the display, beamforming is used as a filter, as will be discussed with reference to FIG. 64. This FIG. 64 shows the beam-formed data for a range sample from the bottom return of FIG. 63 (the solid line 360). This solid line 360 in FIG. 64 corresponds to a radial semi-circle in FIG. 63. As may be seen by the larger spikes, there is the main return from the bottom (A 362) present, as well as a small isolated weaker target (B 364).

The beamforming filtering of a preferred embodiment recognizes that, for any given range sample, there is a usable dynamic range (C 366). This usable dynamic range (C 366) is the range from the peak 368 of the strongest target 362 to the highest peak side lobes 370. Within this usable dynamic range 366, individual targets (e.g., B 364) will be seen on the display. Weaker targets outside of this usable dynamic range 366, however, will blend into the side lobes, constituting a noise floor for this range sample. Considering all range samples, such as the display in FIG. 63, there might be targets within a larger dynamic range than the usable dynamic range (C 366) in one isolated range sample.

Figure 65:
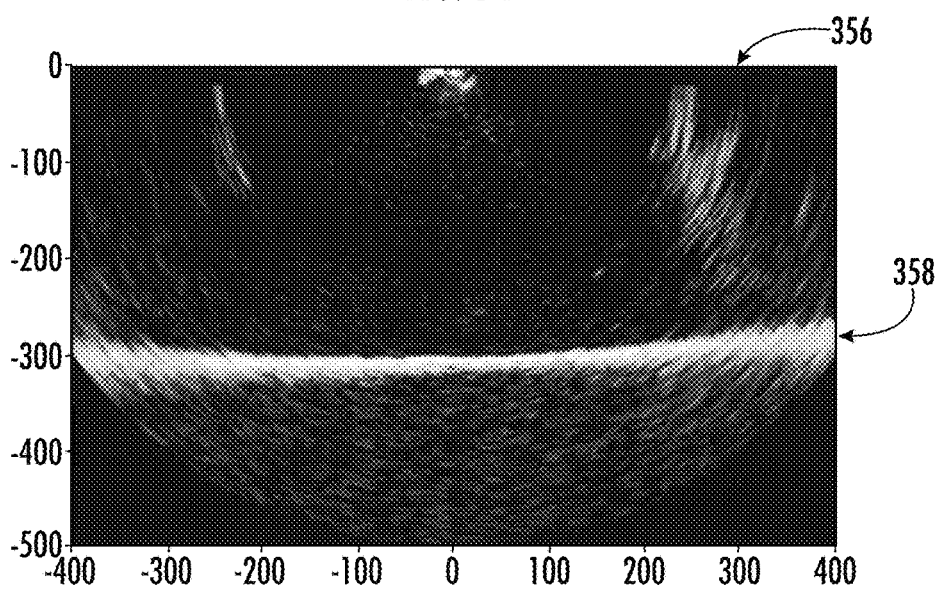
FIG. 65 illustrates a polar display of the control head of FIG. 1 after the beamforming filtering of FIG. 64.

To create a clean display, however, all range samples are processed to suppress the side lobe noise floor to a common background noise level. This suppression is illustrated at (D 372) by the dashed line 374 in FIG. 64, where side lobes below the usable dynamic range (C 366) are pulled down an amount (D 372) to a common system noise floor. The target signal (B 364), however, exists in the usable dynamic range (C 366), and therefore is not pulled down to the common system noise floor. As a result, this target (B 364) will be displayed along with the bottom (A 362) return. FIG. 65 is the polar display after beamforming filtering, which shows that the radial noise 356 (see FIG. 63) is now suppressed, while isolated targets (e.g., B 364) are still displayed.

Figure 66:
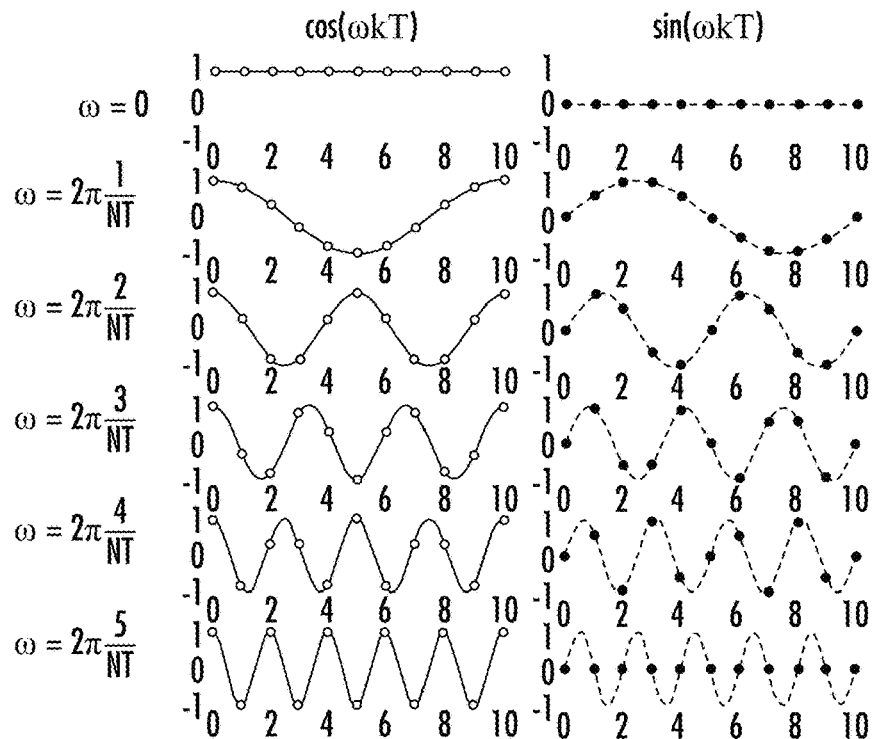
FIG. 66 is a graphical illustration of the N complex sinusoidals that form basis for the Discrete Fourier Transform (DFT) for a RX array of N samples.
Figure 67:
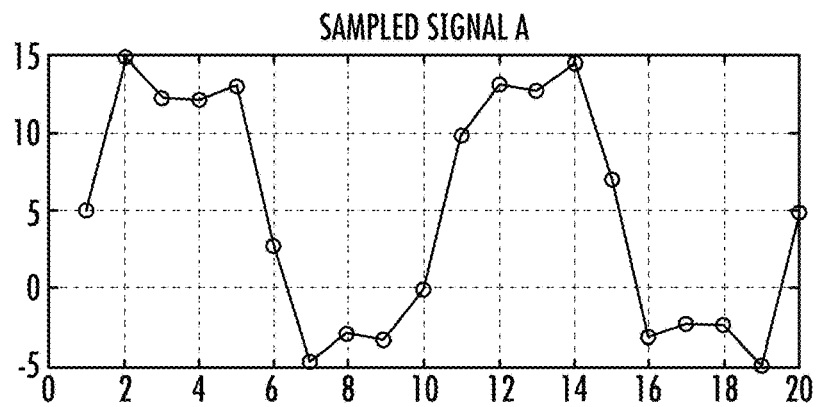
FIG. 67 is a graphical illustration of a sampled signal A having 20 samples.
Figure 68:
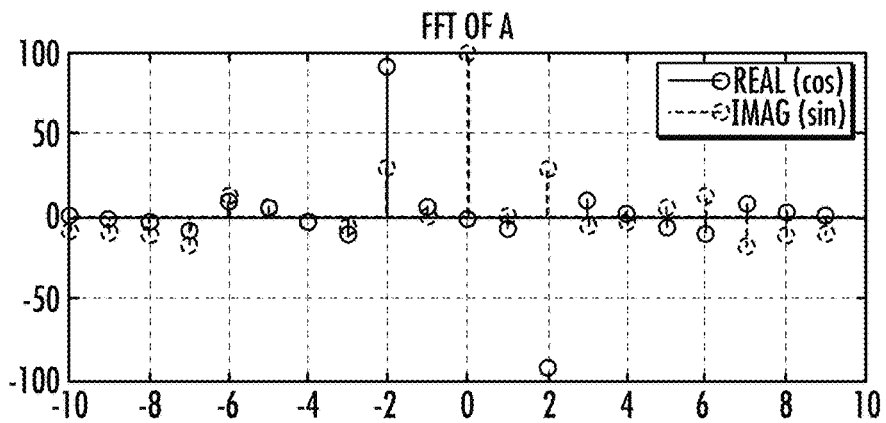
FIG. 68 is a graphical illustration of the frequency domain of the sampled signal A of FIG. 67.
Figure 69:
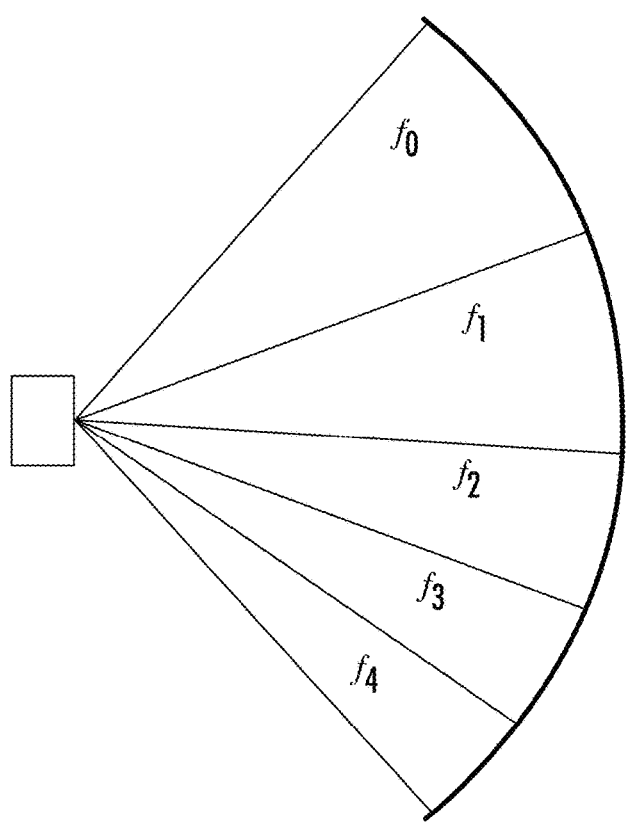
FIG. 69 illustrates the fanning of the transmit beams at angles proportional to frequency for a prior art frequency swept sonar system.
Figure 70:
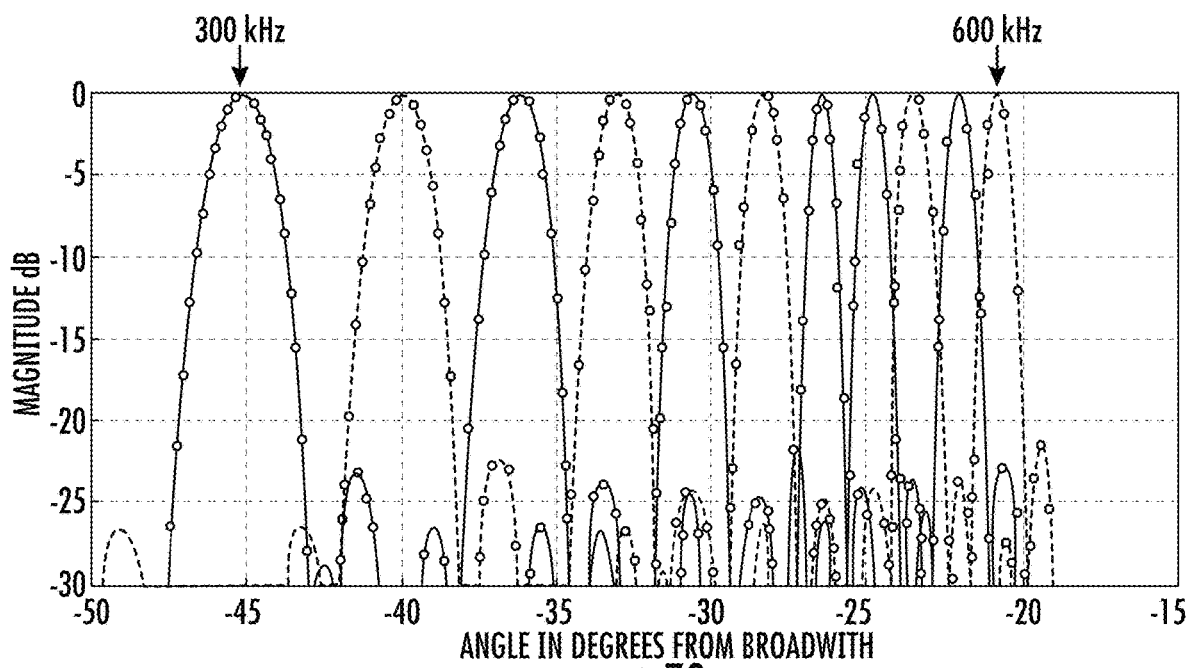
FIG. 70 is a graphical illustration of the filtering by frequency of the return echoes for the prior art system of FIG. 69.

To further illustrate the directionality discrimination ability of the various embodiments of the present invention, it is instructive to consider the RX transducer array in terms of the number of elements versus the number of beams. It is clear that an array of N samples will have a Discrete Fourier Transform (DFT) representation of N frequencies. N samples yield at most N/2 orthogonal sinusoidals (cosine and sine). These are combined into N complex sinusoidals to form the "basis" of the DFT as shown in FIG. 66, i.e. $\cos(\Omega\_n kT) \pm j\sin(\Omega\_n kT)$, for $n \{0 \ldots N/2\}$, $k:\{0 \ldots N-1\}$. The example shows a signal "A" of 20 samples in FIG. 67 and its frequency domain with 20 points in FIG. 68. Interpolating between these frequency points is possible but the result is always an approximation that depends on interpolator used. Continuing with the Frequency-Direction analogy, in the spatial domain an array of N samples will have a representation in the Directivity domain of N directions or beams. Similarly, then, direction interpolation is possible.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A transducer unit for use in a multiplexed phased array multibeam sonar system, comprising:
    a transmit (TX) element configured to generate a sonar ping to ensonify an ensonification cone of water;
    a receive (RX) array configured to receive sonar echoes resulting from the sonar ping contacting targets in the ensonification cone;
    wherein generation of the sonar ping by the TX element and receipt by the RX array of the sonar echoes resulting from the sonar ping defines a transmit-receive cycle;
    a digital signal processor (DSP) configured to process the sonar echoes into sonar display information;
    a plurality of multiplexers (MUXs) coupled between the RX array and the DSP, each of the MUXs configured to selectively couple a respective a first portion of the RX array to the DSP during a first time and a respective second portion of the RX array during a second time such that the plurality of MUXs couple an entirety of the RX array to the DSP during each transmit-receive cycle.

2. The transducer unit of claim 1, wherein each of the MUXs are coupled to different elements of the RX array than any other of the MUXs.

3. The transducer unit of claim 2, further comprising:
    a n-channel analog front end (AFE) configured to condition the sonar echoes and convert them to digital for processing by the DSP, the AFE being coupled between the MUXs and the DSP; and wherein the MUXs comprise a bank of n multiplexers to provide the sonar echoes from the each of the elements of the RX array to the n channels of the AFE.

4. The transducer unit of claim 3, wherein the n-channel AFE is a 16-channel AFE, wherein the bank of n multiplexers comprises sixteen 8:1 multiplexers, and wherein the RX array comprises 128 elements.

5. The transducer unit of claim 4, wherein each of the sixteen multiplexers are coupled to a unique eight of the 128 elements of the RX array such that sonar echoes from all elements of the RX array are provided to the DSP over eight sampling instants during each transmit-receive cycle.

6. The transducer unit of claim 5, wherein each of the MUXs selects the elements of the RX array to be sampled in accordance with a predetermined multiplexing pattern.

7. The transducer unit of claim 6, wherein the predetermined multiplexing pattern is pseudo-random.

8. The transducer unit of claim 6, wherein the predetermined multiplexing pattern is controlled by a connection order of a channel select line for each multiplexer of the bank.

9. The transducer unit of claim 8, wherein the predetermined multiplexing pattern is further controlled by changing a switching order of the channel select lines of the connection order.

10. The transducer unit of claim 1, wherein the TX element is configured to generate the sonar ping at 1.05 MHz carrier frequency ($f_c$), wherein the sonar ping is a compressed high intensity radiated pulse (CHIRP) having a bandwidth ($S_{BW}$) of less than 50 KHz, and wherein each of the MUXs has a sampling frequency $f_s > 2 S_{BW}$ and $f_s \ll f_c$.

11. The transducer unit of claim 10, wherein the sampling frequency $f_s$ is 720 KHz.

12. The transducer unit of claim 1, wherein the DSP is configured to perform base banding and down sampling of the sonar echoes to effectively reduce data rate without losing sonar information, and wherein a down sampling factor is configurable from 4 to more than 40.

13. The transducer unit of claim 12, wherein the down sampling factor is one of 4 or 5 to generate a low factor decimation signal, and wherein the DSP is configured to perform CHIRP correlation on the low factor decimation signal to generate a bandlimited spectrum.

14. The transducer unit of claim 13, wherein the DSP is configured to perform high factor decimation on the bandlimited spectrum with a down sampling factor of 10.

15. The transducer unit of claim 1, wherein the DSP is configured to process the sonar echoes into sonar display information via beamforming filtering.

16. The transducer unit of claim 15, wherein the beamforming filtering pulls down sonar echo data that lies outside of a usable dynamic range into a common system noise floor to suppress side lobe noise.

17. The transducer unit of claim 1, wherein the TX element is configured to generate the sonar ping at 1.05 MHz, wherein the RX array includes 128 RX elements spaced at slightly less than λ/2 for the 1.05 MHz sonar ping to provide resolution of 128 beams having an angular resolution of 1.25°.

18. The transducer unit of claim 1, wherein the sonar ping is a continuous wave (CW) signal at 1.05 MHz carrier frequency ($f_c$) of a predetermined length.

19. The transducer unit of claim 1, wherein the DSP utilizes a mixer vector to compensate for phase shift of the sonar echoes that occurs between the first time and the second time.

20. A method of preventing distortions in sonar display information by a transducer unit in a multiplexed phased array multibeam sonar system having a transmit (TX) element configured to generate a sonar ping to ensonify an ensonification cone of water, a receive (RX) array configured to receive sonar echoes resulting from the sonar ping contacting targets in the ensonification cone, a digital signal processor (DSP) configured to process the sonar echoes into the sonar display information, and a plurality of multiplexers (MUXs) coupled between the RX array and the DSP, each of the MUXs coupled to different elements of the RX array so as to provide sonar echoes from each of the elements of the RX array to the DSP during each transmit-receive cycle, the method comprising the step of:

selecting the elements of the RX array to be sampled by the plurality of MUXs in accordance with a predetermined multiplexing pattern;

wherein the step of selecting the elements of the RX array to be sampled in accordance with the predetermined multiplexing pattern comprises the step of controlling a connection order of a channel select line for each multiplexer of the plurality of MUXs; and wherein the step of controlling the connection order of the channel select line for each multiplexer of the plurality of MUXs comprises the step of connecting the channel select lines in a different order for different multiplexers of the plurality of MUXs.

21. A method of preventing distortions in sonar display information by a transducer unit in a multiplexed phased array multibeam sonar system having a transmit (TX) element configured to generate a sonar ping to ensonify an ensonification cone of water, a receive (RX) array configured to receive sonar echoes resulting from the sonar ping contacting targets in the ensonification cone, a digital signal processor (DSP) configured to process the sonar echoes into the sonar display information, and a plurality of multiplexers (MUXs) coupled between the RX array and the DSP, each of the MUXs coupled to different elements of the RX array so as to provide sonar echoes from each of the elements of the RX array to the DSP during each transmit-receive cycle, the method comprising the step of:

selecting the elements of the RX array to be sampled by the plurality of MUXs in accordance with a predetermined multiplexing pattern;

wherein the step of selecting the elements of the RX array to be sampled in accordance with the predetermined multiplexing pattern comprises the step of controlling a connection order of a channel select line for each multiplexer of the plurality of MUXs; and wherein the step of controlling the connection order of the channel select line for each multiplexer of the plurality of MUXs comprises the step of inverting at least one of the channel select lines for at least one of the plurality of MUXs.

22. The method of claim 21, wherein the step of inverting at least one of the channel select lines for at least one of the plurality of MUXs comprises the step of inverting at least two of the channel select lines for at least one of the plurality of MUXs.

23. A method of preventing distortions in sonar display information by a transducer unit in a multiplexed phased array multibeam sonar system having a transmit (TX) element configured to generate a sonar ping to ensonify an ensonification cone of water, a receive (RX) array configured to receive sonar echoes resulting from the sonar ping contacting targets in the ensonification cone, a digital signal processor (DSP) configured to process the sonar echoes into the sonar display information, and a plurality of multiplexers (MUXs) coupled between the RX array and the DSP, each of the MUXs coupled to different elements of the RX array so as to provide sonar echoes from each of the elements of the RX array to the DSP during each transmit-receive cycle, the method comprising the step of:

selecting the elements of the RX array to be sampled by the plurality of MUXs in accordance with a predetermined multiplexing pattern;

wherein the step of selecting the elements of the RX array to be sampled in accordance with the predetermined multiplexing pattern comprises the step of controlling a connection order of a channel select line for each multiplexer of the plurality of MUXs; and wherein the step of controlling the connection order of the channel select line for each multiplexer of the plurality of MUXs comprises the steps of:

inverting at least one of the channel select lines for a first half of the plurality of MUXs to establish a first timing pattern A-H; and mirroring the first timing pattern for a second half of the plurality of MUXs to establish a second timing pattern H'-A'.

24. A method of preventing distortions in sonar display information by a transducer unit in a multiplexed phased array multibeam sonar system having a transmit (TX) element configured to generate a sonar ping to ensonify an ensonification cone of water, a receive (RX) array configured to receive sonar echoes resulting from the sonar ping contacting targets in the ensonification cone, a digital signal processor (DSP) configured to process the sonar echoes into the sonar display information, and a plurality of multiplexers (MUXs) coupled between the RX array and the DSP, each of the MUXs coupled to different elements of the RX array so as to provide sonar echoes from each of the elements of the RX array to the DSP during each transmit-receive cycle, the method comprising the step of:

selecting the elements of the RX array to be sampled by the plurality of MUXs in accordance with a predetermined multiplexing pattern;

wherein the step of selecting the elements of the RX array to be sampled in accordance with the predetermined multiplexing pattern comprises the step of controlling a connection order of a channel select line for each multiplexer of the plurality of MUXs; and wherein the step of controlling the connection order of the channel select line for each multiplexer of the plurality of MUXs comprises the step of assigning each of the plurality of MUXs a unique connection order.

25. The method of claim 24, further comprising the step of reversing a connection order of input lines from the RX array elements to alternating MUXs.

* * * * *